United States Patent
Wedig et al.

(10) Patent No.: US 11,893,876 B2
(45) Date of Patent: Feb. 6, 2024

(54) SYSTEM AND METHOD FOR MONITORING A BUILDING

(71) Applicant: ONEEVENT TECHNOLOGIES, INC., Mount Horeb, WI (US)

(72) Inventors: Kurt Joseph Wedig, Mount Horeb, WI (US); Daniel Ralph Parent, Mount Horeb, WI (US); Paul Robert Mullaly, Santa Monica, CA (US)

(73) Assignee: OneEvent Technologies, Inc., Mount Horeb, WI (US)

( * ) Notice: Subject to any disclaimer, the term of this patent is extended or adjusted under 35 U.S.C. 154(b) by 178 days.

(21) Appl. No.: 17/328,615

(22) Filed: May 24, 2021

(65) Prior Publication Data

US 2021/0280034 A1 Sep. 9, 2021

Related U.S. Application Data

(63) Continuation of application No. 16/514,473, filed on Jul. 17, 2019, now Pat. No. 11,030,871, which is a
(Continued)

(51) Int. Cl.
| | | |
|---|---|---|
| *G08B 25/08* | (2006.01) | |
| *G08B 19/00* | (2006.01) | |
| *G08B 13/22* | (2006.01) | |
| *G08B 17/06* | (2006.01) | |
| *G08B 21/18* | (2006.01) | |
| *G08B 25/14* | (2006.01) | |
| *G08B 29/18* | (2006.01) | |
| *G06N 5/045* | (2023.01) | |

(Continued)

(52) U.S. Cl.
CPC ............ *G08B 25/08* (2013.01); *G06F 18/29* (2023.01); *G06N 5/045* (2013.01); *G06N 7/01* (2023.01); *G08B 13/22* (2013.01); *G08B 17/06* (2013.01); *G08B 19/005* (2013.01); *G08B 21/182* (2013.01); *G08B 25/14* (2013.01); *G08B 29/186* (2013.01); *G08B 29/188* (2013.01); *G06N 3/02* (2013.01); *G06N 3/042* (2023.01); *G06N 5/01* (2023.01)

(58) Field of Classification Search
CPC ...... G08B 19/005; G08B 13/22; G08B 17/06; G08B 21/182; G08B 25/08; G08B 25/14; G08B 29/186; G08B 29/188; G06K 9/6296; G06N 5/045; G06N 7/005; G06N 3/02; G06N 3/0427; G06N 5/003
See application file for complete search history.

(56) References Cited

U.S. PATENT DOCUMENTS

| | | |
|---|---|---|
| 5,836,887 A | 11/1998 | Oka |
| 7,720,779 B1 | 5/2010 | Perry |

(Continued)

*Primary Examiner* — Joseph H Feild
*Assistant Examiner* — Rufus C Point
(74) *Attorney, Agent, or Firm* — Kenneth A. Smith

(57) ABSTRACT

A building monitoring system includes a sensor configured to sense a condition and collect sensor data related to the sensed condition. The building monitoring system also includes a server configured to receive the sensor data. The server is configured to analyze the sensor data to detect an undesirable condition and a threat from the undesirable condition within a structure and automatically issue a notification upon detection of the undesirable condition and the threat.

14 Claims, 34 Drawing Sheets

Related U.S. Application Data continuation of application No. 15/943,244, filed on Apr. 2, 2018, now Pat. No. 10,380,863.

(60) Provisional application No. 62/480,615, filed on Apr. 3, 2017, provisional application No. 62/480,576, filed on Apr. 3, 2017.

(51) Int. Cl.
*G06F 18/20* (2023.01)
*G06N 7/01* (2023.01)
*G06N 3/02* (2006.01)
*G06N 3/042* (2023.01)
*G06N 5/01* (2023.01)

(56) References Cited

U.S. PATENT DOCUMENTS

| | | | |
|---|---|---|---|
| 9,119,086 B1* | 8/2015 | Ouyang | H04L 41/5009 |
| 9,298,196 B2 | 3/2016 | Matsuoka | |
| 9,638,429 B2 | 5/2017 | O'Hayer | |
| 9,679,255 B1* | 6/2017 | Mullaly | G08B 17/10 |
| 10,161,612 B2 | 12/2018 | Chabot | |
| 10,165,228 B2 | 12/2018 | Stephanson | |
| 2005/0275528 A1 | 12/2005 | Kates | |
| 2006/0086172 A1* | 4/2006 | Lee | G01L 27/007 |
| | | | 73/1.88 |
| 2006/0184479 A1* | 8/2006 | Levine | G06N 7/01 |
| | | | 706/45 |
| 2007/0139183 A1 | 6/2007 | Kates | |
| 2008/0036593 A1 | 2/2008 | Rose-Pehrsson | |
| 2008/0161946 A1* | 7/2008 | Kubota | H04Q 9/00 |
| | | | 700/90 |
| 2008/0235172 A1 | 9/2008 | Rosenstein | |
| 2009/0072962 A1 | 3/2009 | Hitchin | |
| 2013/0099011 A1 | 4/2013 | Matsuoka | |
| 2013/0162813 A1 | 6/2013 | Stephanson | |
| 2013/0163619 A1 | 6/2013 | Stephanson | |
| 2013/0173202 A1* | 7/2013 | Boerhout | G05B 19/4065 |
| | | | 702/113 |
| 2013/0286830 A1 | 10/2013 | Xu | |
| 2014/0201126 A1* | 7/2014 | Zadeh | A61B 5/165 |
| | | | 706/52 |
| 2014/0244563 A1* | 8/2014 | Atomori | G06N 5/02 |
| | | | 706/46 |
| 2014/0268790 A1 | 9/2014 | Chobot | |
| 2014/0276165 A1* | 9/2014 | Addison | A61B 7/003 |
| | | | 600/529 |
| 2015/0015401 A1 | 1/2015 | Wedig | |
| 2015/0170503 A1 | 6/2015 | Wedig et al. | |
| 2015/0339594 A1 | 11/2015 | Gallo | |
| 2016/0116343 A1 | 4/2016 | Dixon | |
| 2016/0139067 A1 | 5/2016 | Grace | |
| 2016/0163179 A1 | 6/2016 | Matsumoto | |
| 2016/0290660 A1 | 10/2016 | O'Hayer | |
| 2016/0371957 A1 | 12/2016 | Ghaffari | |
| 2017/0074757 A1* | 3/2017 | Garcia | A61B 5/14532 |
| 2017/0076584 A1 | 3/2017 | Eskildsen et al. | |
| 2017/0207776 A1 | 7/2017 | Park | |
| 2017/0310498 A1 | 10/2017 | Brandman et al. | |
| 2017/0337485 A1 | 11/2017 | Mullaly | |
| 2018/0102572 A1 | 4/2018 | Wedig et al. | |
| 2018/0107025 A1 | 4/2018 | Smit | |
| 2018/0197393 A1 | 7/2018 | Gallo | |
| 2018/0350225 A1 | 12/2018 | Siminoff | |
| 2020/0035087 A1 | 1/2020 | Teki | |

* cited by examiner

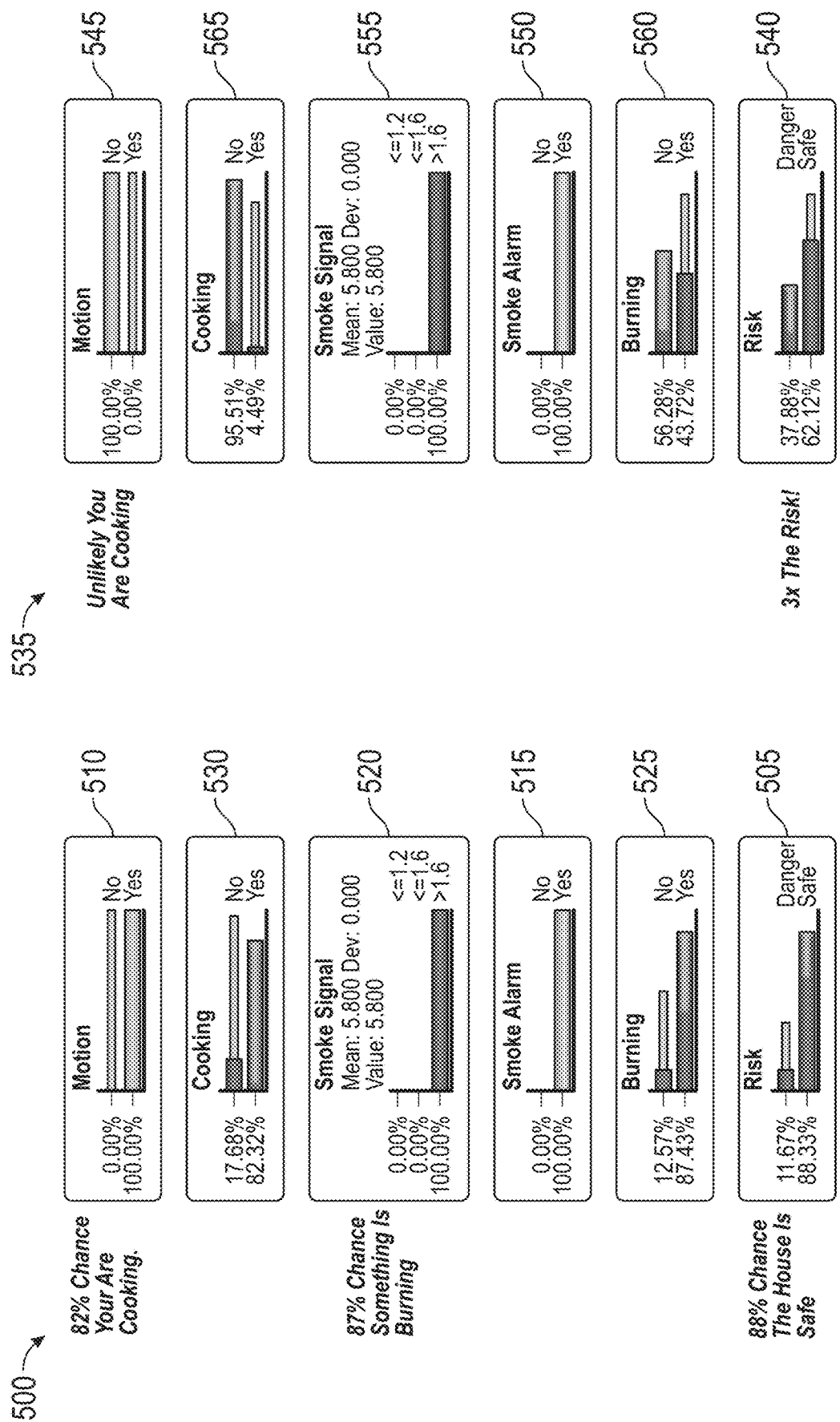

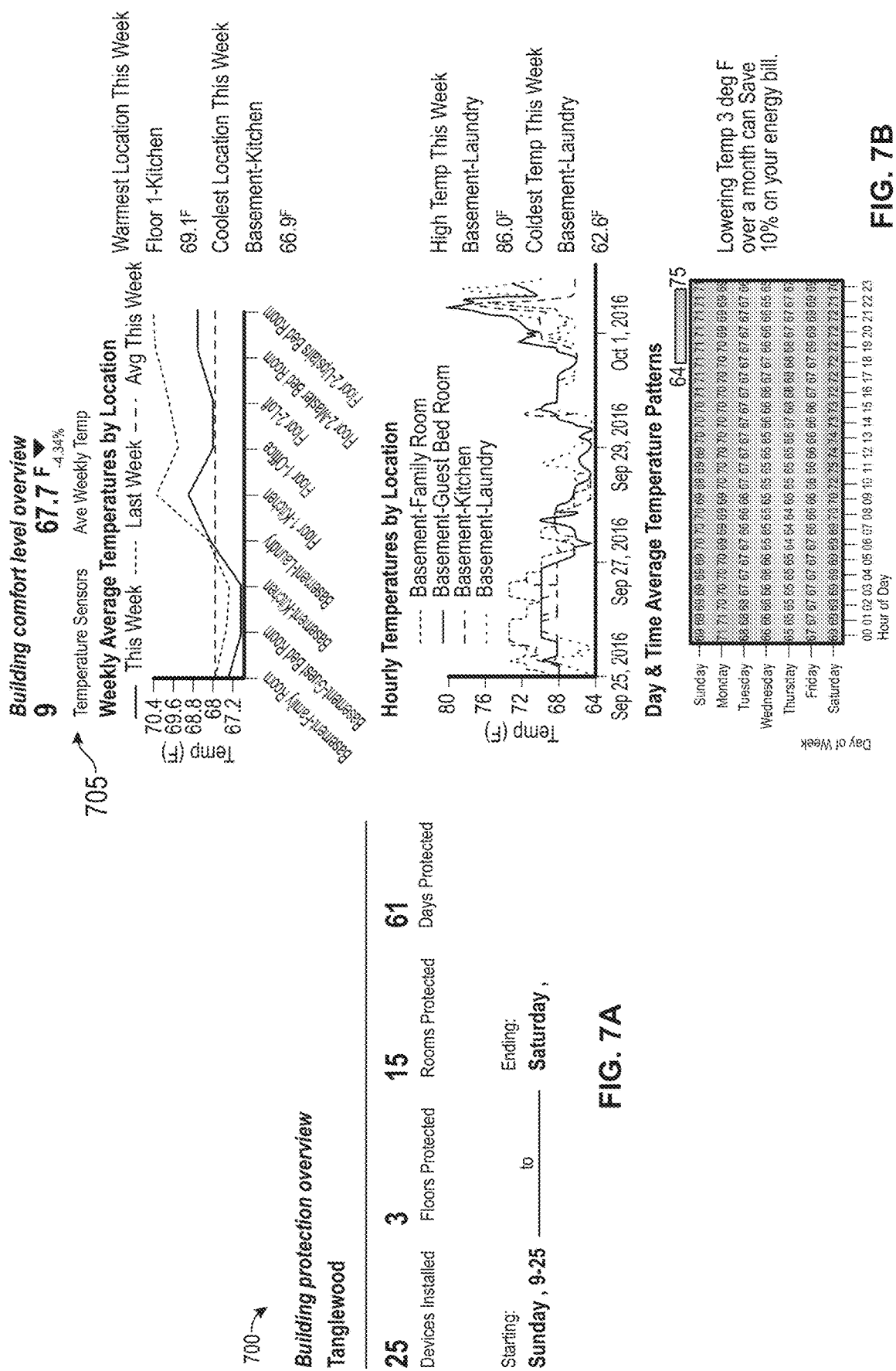

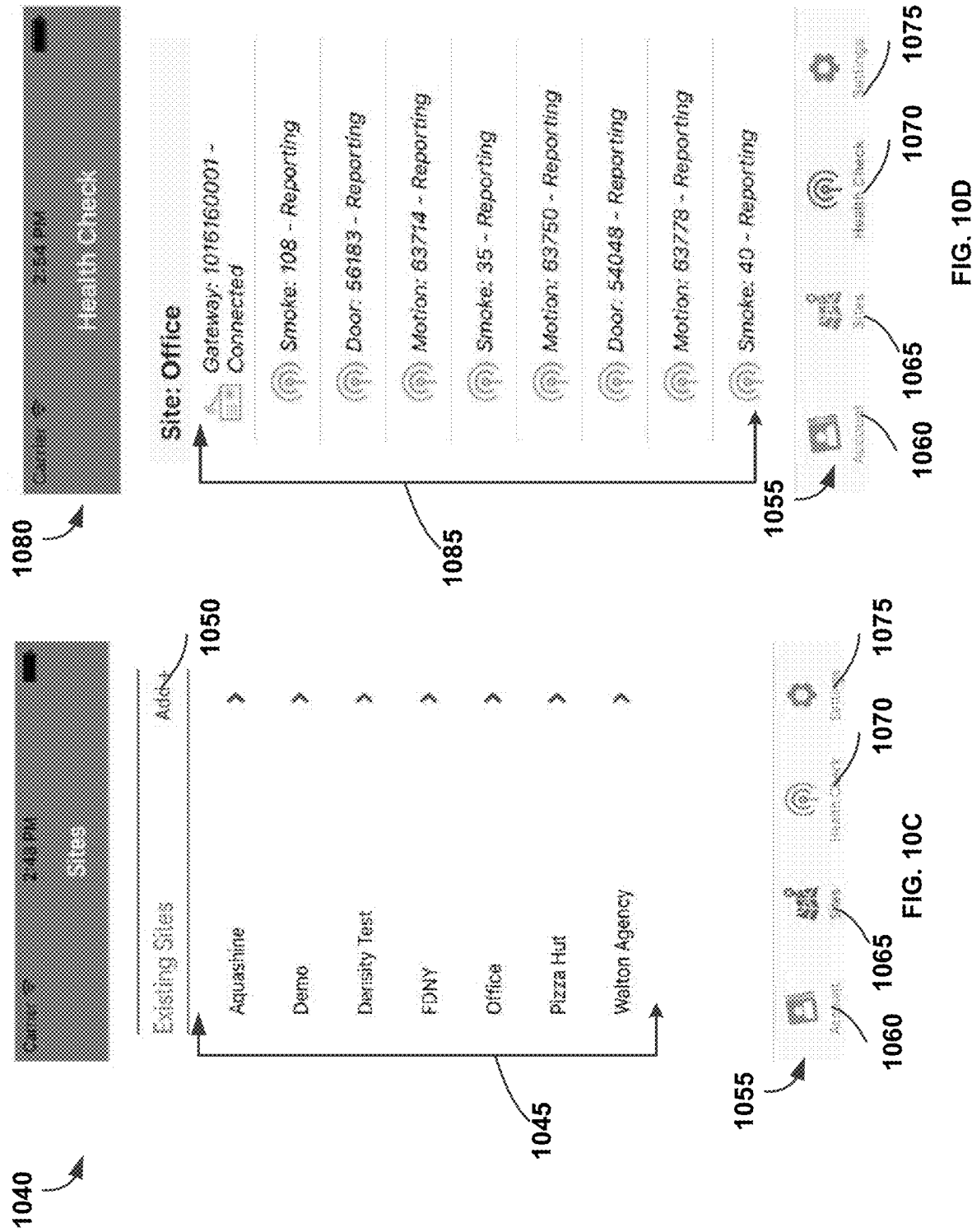

FIG. 10E

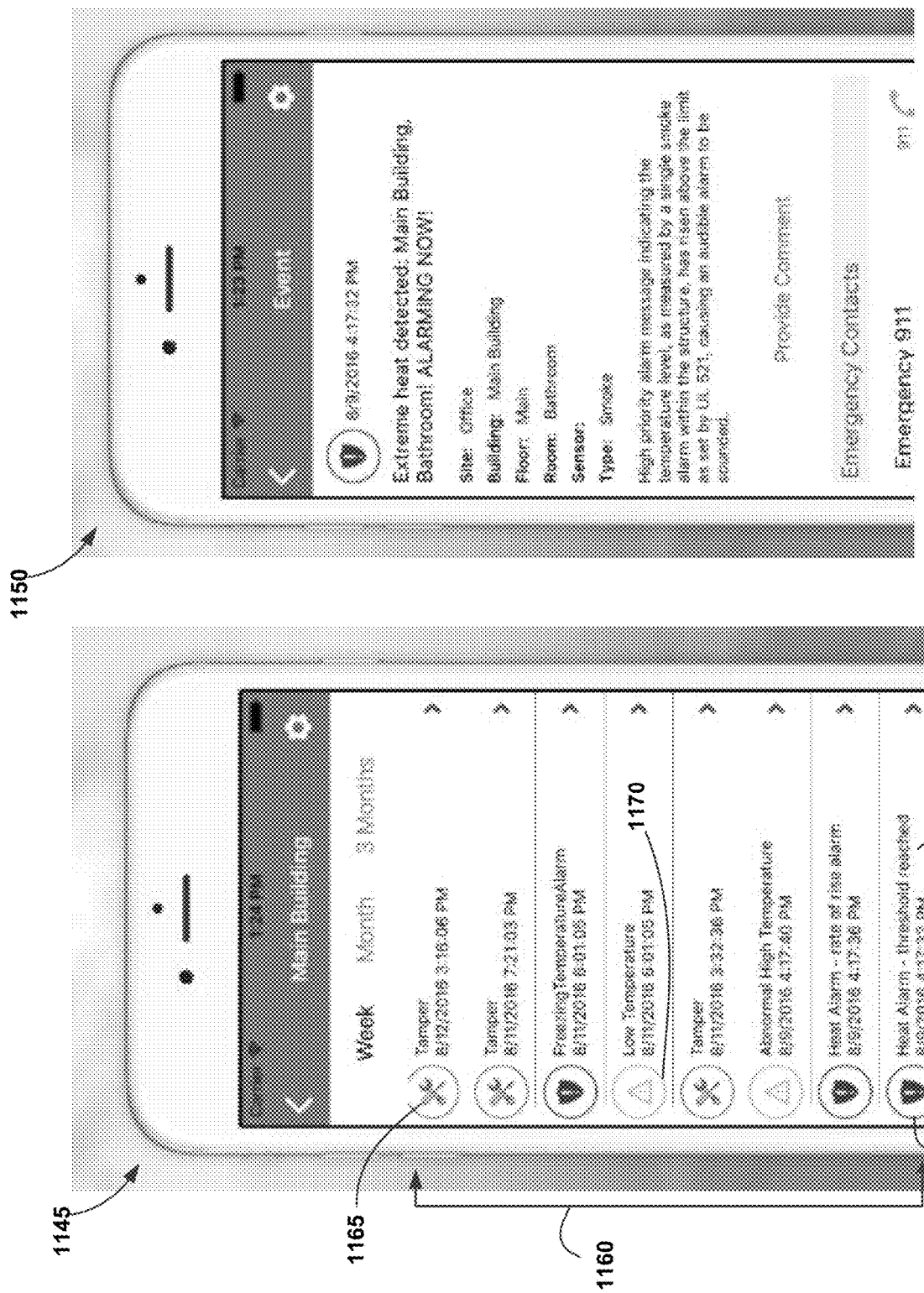

SYSTEM AND METHOD FOR MONITORING A BUILDING

CROSS REFERENCE TO RELATED APPLICATIONS

The present application is a continuation of U.S. Non-Provisional patent application Ser. No. 16/514,473, filed on Jul. 17, 2019, which claims the benefit of and priority to U.S. Non-Provisional patent application Ser. No. 15/943,244, filed on Apr. 2, 2018, now U.S. patent Ser. No. 10/380,863, which claims the benefit of and priority to U.S. Provisional Patent Application No. 62/480,576, filed on Apr. 3, 2017, and U.S. Provisional Patent Application No. 62/480,615, filed on Apr. 3, 2017, each of which is incorporated by reference in its respective entirety herein. The present application is also related to U.S. application Ser. No. 15/099,786, filed on Apr. 15, 2016, now U.S. Pat. No. 9,679,255, which is also incorporated by reference in its entirety herein.

BACKGROUND

The following description is provided to assist the understanding of the reader. None of the information provided or references cited is admitted to be prior art.

Monitoring of various conditions within a structure, such as an office building, a warehouse, or a home, may be desired under many circumstances. For example, it may be desired to sense smoke within the building. It may also be desired to sense temperature, humidity, levels of carbon monoxide, flooding, motion, and various other conditions within the building. The sensed condition may be indicative of a threat, such as a fire or burglary within the building. In many instances, by the time the threat is detected and emergency response personnel are called, severe damage has already occurred to the building and to people and property within the building.

SUMMARY

In accordance with some aspects of the present disclosure, a building monitoring system is disclosed. The building monitoring system includes a sensor configured to sense a condition and collect sensor data related to the sensed condition; and a server configured to receive the sensor data. The server is configured to analyze the sensor data to detect an undesirable condition and a threat from the undesirable condition within a structure and automatically issue a notification upon detection of the undesirable condition and the threat.

In accordance with some other aspects of the present disclosure, a method for using a building monitoring system is disclosed. The method includes receiving, by a gateway of the building monitoring system, sensor data from a sensor installed within a building, transmitting, by the gateway, the sensor data to a server of the building monitoring system, and analyzing, by the server, the sensor data to detect an undesirable condition and a threat from the undesirable condition. The method also includes automatically issuing, by the server, a notification to one or more users upon detecting the undesirable condition and the threat.

In accordance with yet other aspects of the present disclosure, a method for installing a building monitoring system is disclosed. The method includes receiving, by a server, an identification code of a sensor to be associated with the building monitoring system and programming, by the server, a gateway with the identification code. The gateway is installed in a building to be monitored by the building monitoring system. The method also includes creating, by the server, a building monitoring system account for the building and associating, by the server, the gateway with the building monitoring system account.

The foregoing summary is illustrative only and is not intended to be in any way limiting. In addition to the illustrative aspects, embodiments, and features described above, further aspects, embodiments, and features will become apparent.

BRIEF DESCRIPTION OF THE DRAWINGS

FIGS. 5A-5B are example charts illustrating determination of a probability of the risk of FIG. 4, in accordance with some embodiments of the present disclosure.

FIGS. 7A-7D are example reports generated by the building monitoring system of FIG. 1, in accordance with some embodiments of the present disclosure.

FIGS. 10A-10E are example interfaces of an installer mobile application of the building monitoring system of FIG. 1, in accordance with some embodiments of the present disclosure.

FIGS. 11A-11E are example interfaces of a customer mobile application of the building monitoring system of FIG. 1, in accordance with some embodiments of the present disclosure.

Figure 1:
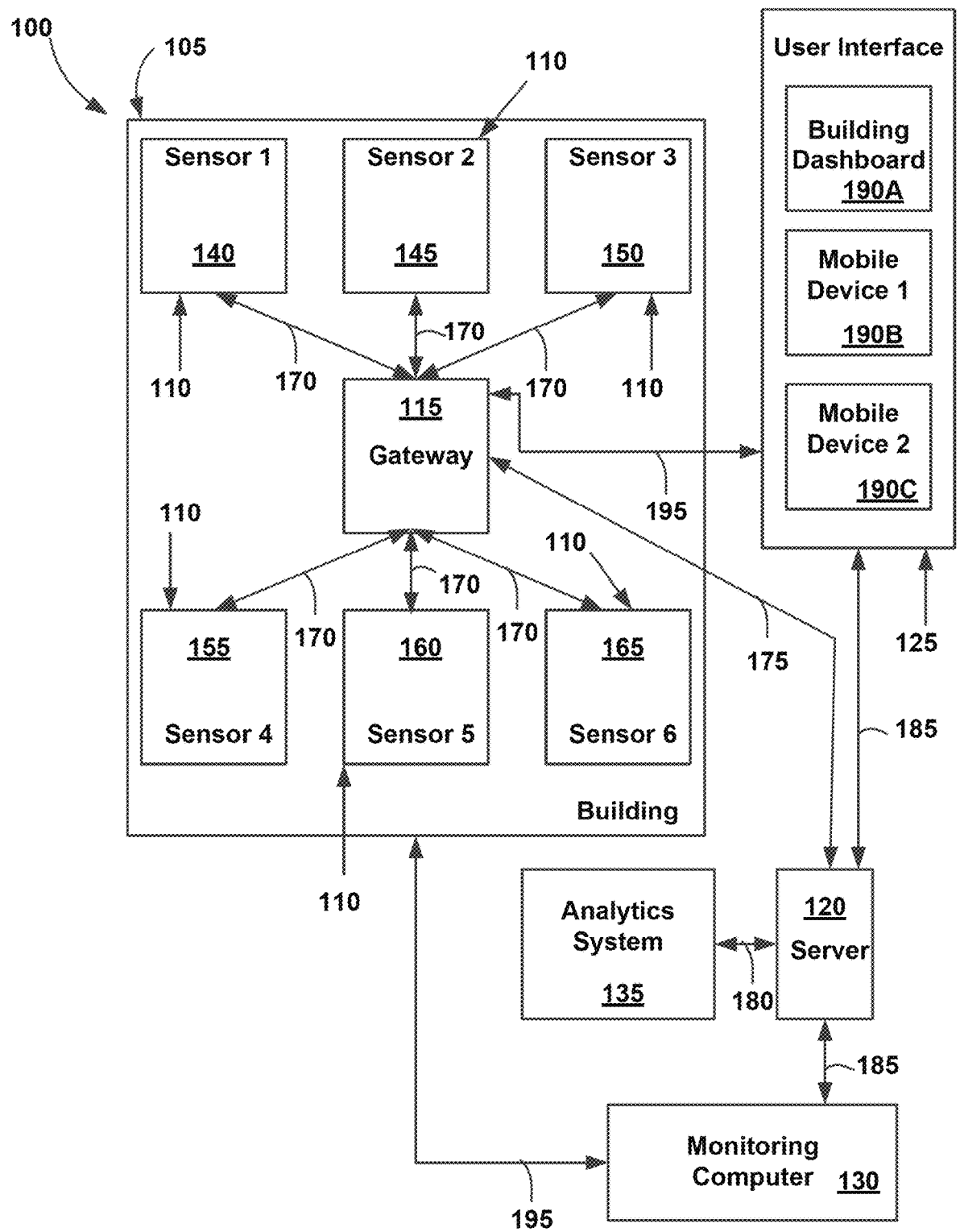
FIG. 1 is a block diagram of a building monitoring system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Buildings such as homes, schools, theatres, office buildings, warehouses, etc. often include devices that monitor one or more conditions of the building. For example, smoke detectors may be used to detect a level of smoke in a room, occupancy sensors may be used to detect the number of people in a space, temperature sensors may be used to detect the temperature of a room, etc. Data from such sensors may be collected and analyzed to detect threats such as fires, high levels of toxic or explosive gasses (e.g., carbon monoxide, methane, etc.), floods, high levels of humidity, etc. In some instances, the threat may be immediate (e.g., a fire). In other instances, the threat may be remote (e.g., leading to premature failure of a component). For example, the sensors may be configured to transmit data regarding their sensed conditions to a central processing system (e.g., a server) that may analyze the information to detect the threats.

Once the central processing system detects the threat, the central processing system may notify appropriate personnel. For example, the central processing system may notify a homeowner or an emergency response center (e.g., a police station or fire department) that the threat has occurred or is about to occur. The central processing system may continue to analyze the data from the sensors during the threat to detect patterns that the homeowner and/or the emergency response crew may use to devise and execute an emergency rescue plan. For example, the central processing system may predict fire spreading patterns within a burning building for fire fighters to use to rescue people, pets, and/or property from within the burning building, and otherwise to devise and execute a rescue plan.

The central processing system may also compile a variety of reports using the data from the sensors. The central processing system may make the reports available on a user interface for review.

FIG. 1 is a block diagram of a building monitoring system 100 is shown, in accordance with some embodiments of the present disclosure. The building monitoring system 100 includes a building 105, sensors 110, a gateway 115, a server 120, a user interface 125, a monitoring computer 130, and an analytics system 135. In alternative embodiments, additional, fewer, and/or different elements may be used. The sensors 110 sense a condition (a "sensed condition") and communicate information related to the sensed condition to the gateway 115. The gateway 115 sends the received information to the server 120, which collaborates with the analytics system 135 to detect undesirable conditions (e.g., smoke, abnormal temperatures, etc.) and a threat (e.g., fire) from those undesirable conditions. The server 120 also issues one or more notifications related to the undesirable conditions and the threat and can generates various reports, as discussed below.

To gather information related to the sensed conditions within the building 105, the building monitoring system 100 includes the sensors 110. In some embodiments, the sensors 110 are located throughout the building. For example, in some embodiments, the sensors 110 include sensors 140, 145, 150, 155, 160, and 165 that may be located at various points within the building 105. For example, the sensors 140, 145, 150, 155, 160, and 165 may be located in strategic locations within the building 105 based on the sensed condition. For example, a water level sensor configured to detect a sensed condition of flooding or excess water may be located in an area of the building 105 where flooding is more likely to occur (e.g., a basement). Likewise, a sensed condition may be smoke for which a smoke sensor may be located in a kitchen to monitor for smoke in the kitchen. Therefore, the location of the sensors 110 within the building 105 may vary based upon the sensed condition that those sensors are configured to detect, and the area within the building where the sensed conditions are more likely to occur.

In other embodiments, instead of locating the sensors 140, 145, 150, 155, 160, and 165 throughout the building 105, the sensors may be concentrated in one or more specific areas (e.g., floor, room, etc.) of the building where an undesirable event (e.g., smoke, abnormal temperature) or a threat (e.g., fire) is to be monitored.

Further, each of the sensors 140, 145, 150, 155, 160, and 165 is configured to communicate with the gateway 115 via a communication link 170 to transfer data collected by the sensors to the gateway. The sensors 140, 145, 150, 155, 160, and 165 may communicate any suitable information to the gateway 115 related to the sensed condition. In some embodiments, each of the sensors 140, 145, 150, 155, 160, and 165 may communicate an identification number of the respective sensor in addition to the information related to the sensed condition to the gateway 115. In alternative embodiments, the sensors 110 may communicate different or additional information to the gateway 115. The aggregate of the information conveyed by the sensors 140, 145, 150, 155, 160, and 165 to the gateway 115 is termed as "sensor data" herein.

The gateway 115, in turn, communicates with the server 120, via communication link 175, to transmit the sensor data received from the sensors 140, 145, 150, 155, 160, and 165 to the server for further processing and cataloguing. In the embodiment shown in FIG. 1, the server 120 is remote from the building 105. When remote, the server 120 may be implemented in a cloud-based computing system or located in a remote monitoring facility. In alternative embodiments, the server 120 may be located within the building 105. In some embodiments, the gateway 115 and the server 120 may be implemented in a single device that communicates with the sensors 140, 145, 150, 155, 160, and 165.

The server 120 may provide several functionalities. For example, in some embodiments, the server 120 provides a repository to store the sensor data received from the gateway 115. In other embodiments, the server 120 collaborates with the analytics system 135 (as indicated by communication link 180) to detect undesirable conditions and threats in the building 105. In yet other embodiments, the server 120 compiles various reports and makes those reports available for review. In alternative embodiments, the server 120 sends one or more notifications (e.g., alerts and alarms) on the user interface 125 and the monitoring computer 130 via communication links 185. In some embodiments, the server 120 automatically contacts an emergency response center (e.g., dial 911, call the police station, the fire department, etc.) upon detecting a threat. These functionalities of the server 120 are discussed in further detail below. In other embodiments, the server 120 may be programmed to perform other, fewer, or additional functionalities that may be deemed useful to incorporate in the building monitoring system 100.

The analytics system 135, in some embodiments, may perform the processing for the server 120 on the sensor data received from the gateway 115. Although the analytics system 135 has been shown separate from the server 120 in FIG. 1, in some embodiments, the analytics system may be integrated into the server 120.

The user interface 125 may be used by a user to receive notifications from the server 120, and take additional actions based upon those notifications. By monitoring the notifications from the server 120, the user may monitor the building 105 for undesirable conditions and threats. In some embodiments, the user interface 125 includes a building dashboard 190A that may be used, for example, by a building or property manager, to monitor undesirable conditions and threats in one or more buildings of a site (e.g., a university), multiple areas of one building, or a combination thereof. In some embodiments, the building dashboard 190A is stationary and fixed to the building 105 (e.g., on a wall, in a panel, etc.). The user interface 125 also includes a first mobile device 190B and a second mobile device 190C.

In some embodiments, the first mobile device 190B and the second mobile device 190C are portable devices associated with a user. For example, in some embodiments, either or both of the first mobile device 190B and the second mobile device 190C are smartphones or other cellular devices, wearable computing device (e.g., eyewear, a watch, bracelet, etc.), tablet, portable gaming device, laptop, etc. In other embodiments, the first mobile device 190B and the second mobile device 190C may be another type of portable computing device that is configured to exchange information with the server 120 via the communication link 185. To exchange information with the server 120, either or both of the first mobile device 190B and the second mobile device 190C may include one or more components structured to allow the first mobile device and the second mobile device to process and store information, as well as to exchange information with the server.

For example, although not shown, either or both of the first mobile device 190B and the second mobile device 190C, in some embodiments, include a controller and a memory. In other embodiments, either or both of the first mobile device 190B and the second mobile device 190C, may also include components such as, receivers, transmitters, cameras, keyboards, touchscreens, microphones, fingerprint scanners, displays, speakers, and other hardware, software, and associated logic that enable the first mobile device and the second mobile device to execute software applications, access websites, graphical user interfaces, and perform other operations described herein.

Additionally, both the first mobile device 190B and the second mobile device 190C may have mobile applications installed thereon that may be used to connect to the server 120, and for receiving the notifications for monitoring the undesirable conditions and threats within the building 105. For example, the mobile application on the first mobile device 190B may be an installer mobile application that may be used by an installer to install the building monitoring system 100 in the building 105, and to manage the building monitoring system after installation by monitoring the health (e.g., status of the sensors 110 and the gateway 115—whether operational or faulted) of the building monitoring system.

In contrast to the installer mobile application that is used by an installer, the mobile application on the second mobile device 190C may be a customer mobile application that is used by a customer (e.g., occupant/caretaker such as homeowner of the building 105) of the building monitoring system 100 to monitor the building after installation for any undesirable conditions and threats. In some embodiments, the customer mobile application may also be configured for use by one or more building or property managers.

In some embodiments, the installer mobile application used by an installer and the customer mobile application used by a customer may be provided as separate mobile applications. In other embodiments, the installer mobile application and the customer mobile application may be combined together into one overall mobile application having an installer mobile application component and a customer mobile application component. The overall mobile application may be configured such that the installer mobile application is accessible to the installer, but not the customer, and the customer mobile application is accessible to the customer, but not the installer. In yet other embodiments, the overall mobile application may include overlapping portions that may be accessed by both the installer and the customer.

Furthermore, in some embodiments, the installer mobile application and the customer mobile application are connected directly to the server 120 (e.g., via the communication link 185). In other embodiments, either or both of the installer mobile application and the customer mobile application are connected to the server 120 via the gateway 115. In those embodiments, the installer mobile application and the customer mobile application are connected to the gateway via communication link 195 and then to the server 120 via the communication link 175. In some embodiments, either or both of the installer mobile application and the customer mobile application may be connected to the server 120, both directly and indirectly through the gateway, to provide a redundant mechanism of connection to accommodate for any failures in the communication links 185 and 195.

Additionally, although the monitoring computer 130 is shown separate from the user interface 125, in some embodiments, the monitoring computer 130 is also a part of the user interface. For example, the monitoring computer 130 may be used by an emergency response crew (e.g., fire fighters, paramedics, police, other rescue operators, etc.) to devise and execute an emergency rescue plan. The monitoring computer 130 may receive sensor data, various reports, analysis, predictions, and other data compiled by the server 120 and the analytics system 135 via the communication link 185. The monitoring computer 130 may also receive, in some embodiments, notifications from the server 120 when undesirable conditions and threats are detected.

For example, when the server 120 detects a fire in the building 105, the server may automatically reach out (e.g., call) to an emergency response center (e.g., fire station) such that the emergency response crew (e.g., fire fighters) from that emergency response center may connect the monitoring computer 130 to the server 120 to receive further details about the fire in the building. By connecting the monitoring computer 130 to the server 120, the emergency response crew may start devising an emergency rescue plan as soon as the monitoring computer is connected to the server (e.g., even before the emergency response crew gets to the building 105).

In some embodiments, only some components of the building monitoring system 100 are shown herein, and several other components, such as routing mechanisms, wiring, processing units, installation units, imaging and video devices, etc. may be used within the building monitoring system. Likewise, although not shown, the building 105 may have walls, roof, windows, doors, foundation, and other features found in buildings. Furthermore, the building 105 may be any of a variety of structures such as residential houses, commercial buildings, warehouses, hospitals, stores, factories, hotels, arenas, stadiums, and any other suitable building. While the present disclosure has been described for the building 105, in other embodiments, the present disclosure may be implemented in any other structure that is substantially permanent or temporary, such as tunnels, caves, tents, stages, recreational vehicles, campers, or any structure that is monitored by the sensors 110.

The sensors 110 may be a variety of sensors. For example, in some embodiments, the sensor 140 is a smoke sensor that is used to detect smoke in the building 105, the sensor 145 is a motion sensor that is used to detect motion in the building, the sensor 150 is a door sensor to determine the status of doors (e.g., open, closed, locked, or unlocked), and the sensor 155 is a window sensor to determine the status of windows (e.g., open, closed, locked, or unlocked). Likewise, in some embodiments, the sensor 160 is a temperature sensor to detect the temperature of a room, and the sensor 165 is a wind sensor to determine the direction/strength of wind in and/or around the building. Notwithstanding that the sensors 140, 145, 150, 155, 160, and 165 have been described as being specific types of sensors, in other embodiments, other or additional types of sensors, such as, stair sensors, carbon monoxide sensors, location sensors, proximity sensors, pressure sensors, water sensors, humidity sensors, smoke obscuration sensors, and any other type of sensor to detect an undesirable condition in the building 105 may be used. Additionally, although only six of the sensors 110 are shown, in alternative embodiments, any suitable number of sensors may be used, including greater than six or fewer than six. For example, a building can have hundreds (or more) sensors 110 which can be all of the same type or of different types of sensors.

Furthermore, although only one instance of each of the sensors 140, 145, 150, 155, 160, and 165 is shown in the building 105, in some embodiments, multiple instances of one or more of those sensors may be used in the building. For example, the number and location of the sensors 140, 145, 150, 155, 160, and 165 within each area (e.g., floor, room, etc.) of the building 105 may depend upon the type of sensor, and/or the type of information that may be needed or considered desirable to have in detecting a specific undesirable condition and threat within the building 105. For example, if the sensor 150, which is a door sensor, is configured to detect the status of a single door, one instance of the sensor 150 may be installed on every (or selected) door(s) of an area of the building 105. In another example, if the sensor 150 is designed to determine the status of every door in an area of the building 105 (e.g., by detecting doors within a pre-defined range of the sensor), one only instance of that sensor may be needed in each area. Furthermore, if the door in an area of the building 105 is a closet door, then the location of that door may not be pertinent to detecting the undesirable conditions and threats within the building 105 and, therefore, the sensor 150 may not be needed on the closet door.

Likewise, window sensors (e.g., the sensor 155) may be installed on every (or selected) window(s) of the building 105 or only on windows that are on the outside walls of the building. Similarly, one instance of a smoke sensor (e.g., the sensor 140) may be sufficient for every room, in some embodiments. However, for bigger rooms, it may be desirable to have multiple smoke sensors. In some embodiments, multiple instances of a sensor may be installed to provide redundancy, such that, if one sensor malfunctions, another sensor may continue or take over sensing. Thus, the sensors 140, 145, 150, 155, 160, and 165 may be strategically placed throughout the building 105 to get sensed conditions from inside the building to effectively and efficiently detect undesirable conditions and threats within the building.

Furthermore, each of the sensors 140, 145, 150, 155, 160, and 165 may be configured to withstand temperatures and other conditions found inside buildings (e.g., the building 105) during an undesirable condition (e.g., smoke) or threat (e.g., fire) without being damaged for a specified period of time. For example, in some embodiments, the sensors 140, 145, 150, 155, 160, and 165 may be designed to withstand at least 500° Celsius for at least 30 minutes during a fire in the building 105. In other embodiments, the sensors 140, 145, 150, 155, 160, and 165 may be designed with different specifications for temperature and time. Likewise, the sensors 140, 145, 150, 155, 160, and 165 may be designed to withstand being submerged in water for a specific period of time, withstand low (e.g., a given percentage below room temperature) temperatures, etc.

In an illustrative embodiment, each of the sensors 140, 145, 150, 155, 160, and 165 may have an identification number or code to uniquely identify the sensor and distinguish that sensor from other types of sensors. The identification code may be transmitted along with the indication of the sensed condition, as part of the sensor data to the gateway 115. The identification codes may also be made available in a list or catalog form for users (e.g., installers, emergency response crew, customers, etc.) to review when needed.

In some embodiments, the identification codes may be dependent upon the type of sensor. For example, in some embodiments, all smoke sensor type of sensors may have one kind of identification code, all door sensors may have another type of identification codes, all temperature sensors may have yet another type of identification codes, and so on. Within each type of identification code, additional information may be provided to distinguish multiple instances of the same type of sensor. Thus, for example, two smoke sensors in the building 105 may each have an identification code with two parts—a first part identifying the sensor as a smoke sensor and a second part that distinguishes the first smoke sensor from the second sensor. By virtue of assigning specific identification codes to specific types of sensors, the server 120 and the users reviewing the sensor data may determine from the identification code the type of sensor and how to interpret the data being transmitted by that sensor. The users may also be able to sort and arrange sensor data based upon the type of sensor to most effectively and efficiently use the sensor data.

Furthermore, in some embodiments, the identification codes may also include information identifying the location of each of the sensors 140, 145, 150, 155, 160, and 165 within the building 105. In other embodiments, the location information of the sensors 140, 145, 150, 155, 160, and 165 may be provided separately from the identification codes. In some embodiments, the location may be global positioning system (GPS) coordinates. In other embodiments, if the floorplan of the building 105 is known, the location may be a description of the location of the sensors 140, 145, 150, 155, 160, and 165 within the building. For example, a location description of a door sensor (e.g., the sensor 150) may be "front entrance on the main floor" or "entrance into the basement," etc. By virtue of knowing the location of each sensor, the server 120 and the operators may be able to pin-point the location of an undesirable condition or threat within the building 105, as well as determine threat patterns (e.g., how a fire is spreading). The location of the sensors 140, 145, 150, 155, 160, and 165 may also be cataloged, either as part of the identification code or separately, whichever the case may be, and made available to the server 120 and the users for review when needed.

Furthermore, the identification codes of the sensors 140, 145, 150, 155, 160, and 165 may be configured in any of a variety of ways. For example, in some embodiments, the identification codes may be fixed digit numbers. In other embodiments, the identification codes may be fixed letter words, alphanumeric codes, codes with certain special characters, quick response codes, radio frequency codes, combination of one or more of the above, etc.

Thus, the sensors 140, 145, 150, 155, 160, and 165 may gather data on their respective sensed conditions, and transmit the gathered data to the gateway 115. In some embodiments, the sensors 140, 145, 150, 155, 160, and 165 may communicate with each other, in addition to communicating with the gateway 115. For example, if the sensors 140, 145, 150, 155, 160, and 165 sense periodically and if one smoke sensor detects smoke in a room, that smoke sensor may alert other smoke sensors in the building 105 to increase frequency of sensing. Likewise, if the communication link 170 between a particular one of the sensors 140, 145, 150, 155, 160, and 165 and the gateway 115 malfunctions, the sensor can transmit its gathered data to another sensor, which may then transmit the other's sensor's gathered data to the gateway. Thus, by enabling the sensors 140, 145, 150, 155, 160, and 165 to communicate with one another, the building monitoring system 100 provides redundancy to account for malfunctions in the building monitoring system.

Likewise, in some embodiments, in addition to or instead of transmitting the gathered data related to the sensed condition to the other sensors in case of a malfunction in the communication link 170, the impacted one of the sensors 140, 145, 150, 155, 160, and 165 may buffer the gathered data (e.g., along with a timecode) and may transmit the buffered data to the gateway 115 when communication is reestablished. In yet other embodiments, the sensors 140, 145, 150, 155, 160, and 165 may be programmed such that the sensors may bypass the gateway 115 and communicate directly with the server 120 in certain instances. Such a functionality may be used, for example, when the gateway 115 malfunctions. In such an example, the sensors 140, 145, 150, 155, 160, and 165 may transmit the sensor data directly to the server 120 via communication links that are similar to (or the same as) the communication link 175. Thus, the building monitoring system 100 may be designed with various degrees of redundancy to enable the server 120 to receive sensor data and detect undesirable conditions and threats even in instances of certain failures within one or more components of the building monitoring system. Such a system is, thus, a self-healing system.

As discussed above, the sensors 140, 145, 150, 155, 160, and 165 transmit sensor data (e.g., sensed data along with identification code and location information if not part of the identification code) to the gateway 115. In some embodiments, to transmit sensor data to the gateway 115, the sensors 140, 145, 150, 155, 160, and 165 first establish a communication link with the gateway via the communication link 170 before transmitting the sensor data. In other embodiments, the sensors 140, 145, 150, 155, 160, and 165 may transmit sensor data to the gateway 115 simultaneously while establishing a communication link with the gateway. Thus, the manner of communication of the sensors 140, 145, 150, 155, 160, and 165 with the gateway 115 may vary from one embodiment to another. Furthermore, the sensors 140, 145, 150, 155, 160, and 165 may be configured to either sense continuously or periodically, as programmed within the sensors. Likewise, the sensors 140, 145, 150, 155, 160, and 165 may be configured to either continuously or periodically transmit sensor data to the gateway 115. In some embodiments, each of the sensors 140, 145, 150, 155, 160, and 165 sense at a rate that is transmitted to the sensors 140, 145, 150, 155, 160, and 165 (e.g., by the server 120).

With respect to the gateway 115, in some embodiments, one instance of the gateway may be provided in each area (e.g., floor, room, etc.) of the building 105, while in other embodiments, one instance of the gateway may be sufficient for the entire building. In yet other embodiments, multiple instances of the gateway 115 may be desirable in each area (e.g., floor, room, etc.) of the building 105. The number of the gateways (e.g., the gateway 115), as well as the positioning of the gateways within the building 105 may vary based upon the operating range of the gateway and its ability to collect sensor data from the sensors 140, 145, 150, 155, 160, and 165. In some embodiments, for example similar to the description above of the sensors 140, 145, 150, 155, 160, and 165, the gateway 115 may be configured to withstand high temperatures and other conditions within the building 105 for a specified period of time to enable the gateway to keep collecting sensor data from the sensors 140, 145, 150, 155, 160, and 165, and transmitting the collected sensor data to the server 120 in case of an undesirable condition or threat.

Furthermore, in some embodiments, the gateway 115 is configured to transmit the sensor data from the sensors 140, 145, 150, 155, 160, and 165 instantaneously (or substantially instantaneously) to the server 120 as the sensor data is received from the sensors. In other embodiments, the gateway is configured to transmit the sensor data periodically. In some embodiments, the gateway 115 may be configured to direct the sensors 140, 145, 150, 155, 160, and 165 to collect sensor data on-demand and transmit that data to the server 120 (e.g., when those sensors are configured to receive commands from the gateway).

To receive sensor data from the sensors 140, 145, 150, 155, 160, and 165, the gateway 115 may be programmed with the identification codes of those sensors. Thus, in some embodiments, the gateway 115 may be configured to receive sensor data from only those sensors (e.g., the sensors 140, 145, 150, 155, 160, and 165) whose identification codes match the identification codes programmed within the gateway. By virtue of programming the gateway 115 with the identification codes of the sensors 140, 145, 150, 155, 160, and 165 for receiving sensor data from those sensors, the sensors may be easily and conveniently replaced by re-programming the gateway with different identification codes.

Also similar to the sensors 140, 145, 150, 155, 160, and 165, in some embodiments, the gateway 115 may transmit the received sensor data to the server 120 while in communication with the server via the communication link 175. In other embodiments, the gateway 115 may first establish a communication link between the gateway and the server before transmitting the sensor data. Also, in some embodiments, if the communication link is interrupted, the gateway 115 may be configured to buffer the sensor data until the communication link is reestablished.

Additionally, in some embodiments, the gateway 115 may also be configured to include an identification code and a location code. The identification and location codes of the gateway 115 may be particularly useful when multiple instances of the gateway 115 are installed within the building 105. The identification code may also be used to associate the gateway 115 with a specific building monitoring system account, such that when the server 120 receives sensor data from the gateway 115, the server may be able to associate the sensor data with the building monitoring system account and identify the building 105. In some embodiments, the location code of the gateway 115 may be part of the identification code. In some embodiments, the gateway 115 may transmit the identification code (and the location code if not part of the identification code) to the server 120 along with each transmission of the sensor data. Alternatively or additionally, the identification code and the location code may be catalogued and made available to the server 120 and users (e.g., installers, customers, emergency response crew). Again, the identification code of the gateway 115 may be configured in a variety of ways, including a quick response code.

Moreover, in some embodiments, in addition to transmitting the sensor data to the server 120, the gateway 115 may be programmed to automatically communicate with an emergency response center if the gateway receives certain type of information from the sensors 140, 145, 150, 155, 160, and 165. Conditions that may cause the gateway 115 to contact the emergency response center may be programmed within the gateway. The emergency response center may include a 911 call center, a fire department, police department, other emergency response service, or a combination thereof. In an alternative embodiment, the gateway 115 may not include such programming, and the server 120 may analyze the information (e.g., with the help of the analytics system 135) and automatically contact the emergency response center when needed.

Thus, the gateway 115 is also intended to be configured in a variety of ways depending upon the embodiment and the requirements of the building monitoring system 100.

The sensors 140, 145, 150, 155, 160, and 165 and the gateway 115 communicate with each other via the communication links 170, and the gateway and the server 120 communicate via the communication link 175. Likewise, the server 120 communicates with the user interface 125, the monitoring computer 130, and the analytics system 135 via the communication links 180 and 185. The communication links 170, 175, 180, and 185 may be any of a variety of communication channels or interfaces. For example, the communication links 170 may be of any type that is suitable for facilitating communication between the sensors 140, 145, 150, 155, 160, and 165 and the gateway 115. Likewise, the communication link 175 may be of any type that is suitable to facilitate communication between the gateway 115 and the server 120, and the communication links 180, 185 may be of any type that are suitable to facilitate communication with the server. In some embodiments, one or more of the communication links 170, 175, 180, and 185 may be wired communication links (e.g., jacks, antennas, transmitters, receivers, transceivers, wire terminals, electrical cables and connectors, etc.) that communicate via wired communication protocols, such as TCP/IP, BACnet IP, BACnet MSTP, CAN, Modbus, USB, Firewire, UART, SPI, RS-485, a public switched telephone network (PSTN), or other wired protocols.

In other embodiments, one or more of the communication links 170, 175, 180, and 185 may instead be wireless and communicate via one or more wireless communication protocols, such as Wi-Fi (including TCP/IP), Wi-Max, Bluetooth, LoRa, NFC, Zigbee, and the like. In some embodiments, one or more of the communication links 170, 175, 180, and 185 may include cellular or mobile phone communications, wireless radio channels, local area network (LAN), metropolitan area network (MAN), wide area network (WAN), world wide web (WWW) or the Internet, and the like. A combination of one or more communication interfaces discussed above may be used for the communication links 170, 175, 180, and 185 as well, in some embodiments. The communication links 170, 175, 180, and 185 may also be a distributed intelligent network, in some embodiments. Further and similar to the sensors 140, 145, 150, 155, 160, and 165 and the gateway 115, the communication links 170, 175, 180, and 185 may be designed to withstand various operating conditions for a specified period of time.

The server 120 may be configured in a variety of ways and may include a variety of components. For example, as mentioned above, the server 120 may be located in a remote location or within the building 105. In some embodiments, sensor data transmitted to the server 120 may be stored in cloud storage, or other type of memory. In other embodiments, various mechanisms to store, manage, and back-up data may be used by the server 120. Further, the server 120 may be configured to store data related to more than one building monitoring system (e.g., the building monitoring system 100).

The server 120 also includes a variety of computing elements. For example, the server 120 may include memory having one or more devices (e.g., memory units, memory devices, storage devices, etc.) for storing data and/or computer code for completing and/or facilitating various processes described in the present disclosure. Such memory may include volatile and/or non-volatile memory including, random access memory (RAM), read-only memory (ROM), dynamic random access memory (DRAM), programmable read only memory (PROM), erasable programmable read only memory (EPROM), electrically erasable programmable read only memory (EEPROM), flash memory, hard drive storage, optical memory, or any other suitable memory for storing data, software objects and/or computer instructions. Memory may also include database components, object code components, script components, or any other type of information structure for supporting the various activities and information structures described in the present disclosure. Other types of storage media, for example, compact disc (CD), digital video disc (DVD), floppy discs, Blu-ray discs, magnetic storage, computer readable media, or other electronic storage media, may be used within or in conjunction with the memory of the server 120.

The server 120 also includes a processing unit capable of executing computer code for running one or more processes described herein. In some embodiments, the processing unit may include a digital signal processor (DSP), such as, a general-purpose stand alone or embedded processor, or a specialized processing unit. In general, processing unit of the server 120 may be of any type that is suitable for a server system. Additionally, in at least some embodiments, multiple instances of the processing unit may be connected together at least indirectly and utilized in combination with one another to perform various functions described herein. Multiple server units in communication with one another may also be used in other embodiments.

The processing unit(s) of the server 120 may be configured to process a variety of program instructions and data, in accordance with the embodiments of the present disclosure. These program instructions and data need not always be digital or composed in any high-level programming language. Rather, the program instructions may be any set of signal-producing or signal-altering circuitry or media that may be capable of performing functions, described in the present disclosure. Additionally, the server 120 may include other hardware, software, and firmware components that are commonly present in devices configured as servers and communicating with devices, such as the gateway 115.

Figure 2:
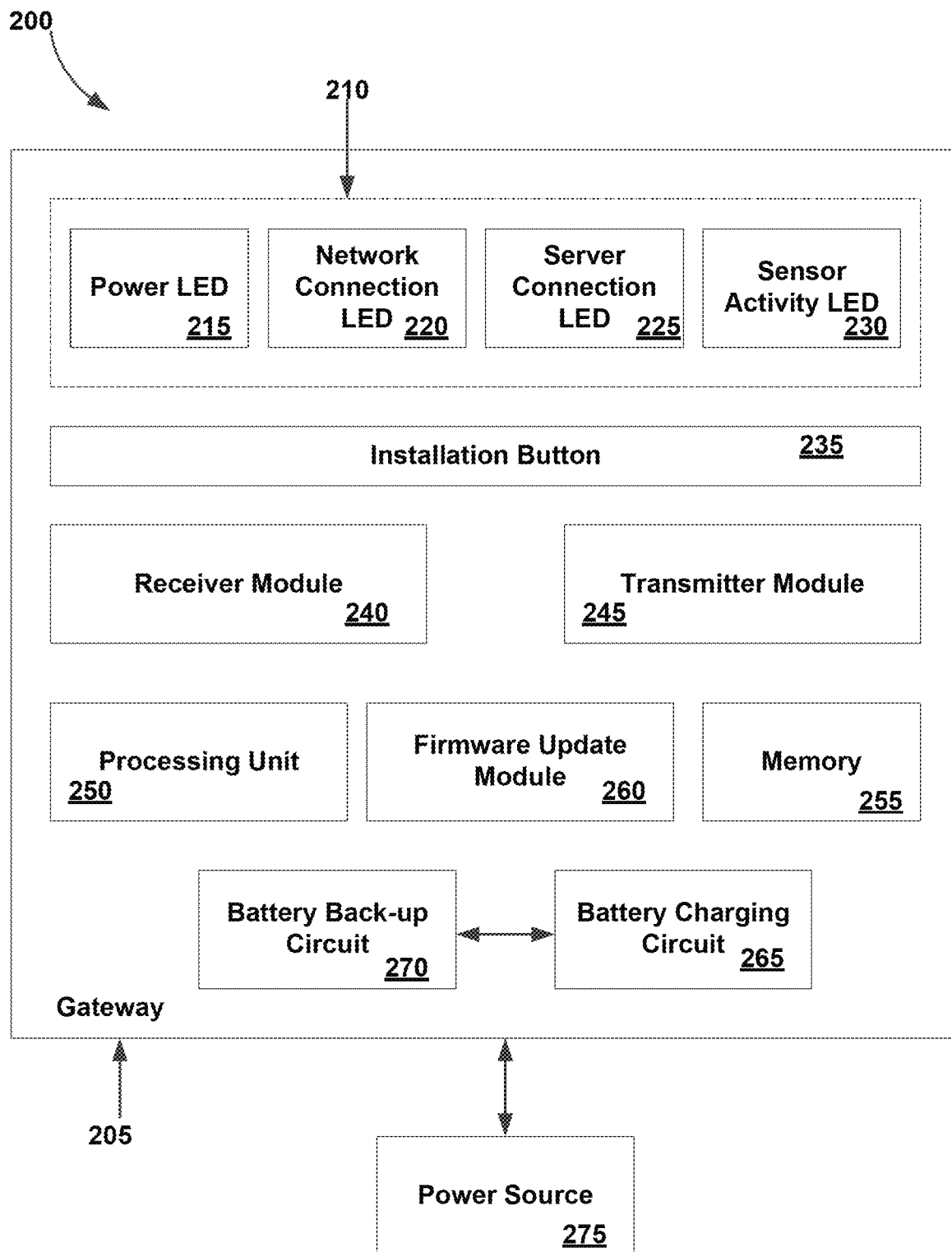
FIG. 2 is a block diagram of a gateway of the building monitoring system of FIG. 1, in accordance with some embodiments of the present disclosure.

A block diagram of a gateway 200 is shown in FIG. 2, in accordance with some embodiments of the present disclosure. The gateway 200 is similar to the gateway 115 in that the gateway 200 receives sensor data from the sensors 140, 145, 150, 155, 160, and 165 and transmits that sensor data to the server 120. The gateway 200 is configured to be installed within the building 105. Although not shown, the gateway 200 may be provided with various mounting mechanisms on a housing 205 of the gateway. For example, a back surface of the housing 205 may be provided with mounting holes that may be used to mount the gateway 200 on a wall or other structure of the building 105. In other embodiments, other or additional mounting or safety mechanisms, such as a wall tamper switch, may be provided on the housing 205. Furthermore, the housing may be designed to enclose and protect the components of the gateway 200 from various environmental and physical hazards. The housing 205 may be constructed in one or more pieces from one or more materials that may be deemed suitable for the gateway 200.

The housing 205 may also include one or more light emitting diodes (LEDs) 210 on a front and/or the back surface thereof to provide indication of one or more gateway conditions. For example, in some embodiments, the LEDs 210 may include a power LED 215, a network connection LED 220, a server connection LED 225, and a sensor activity LED 230. The power LED 215 may indicate whether the gateway 200 is turned on or off. For example, a green indication on the power LED 215 may indicate that the gateway 200 is turned on and a red indication on the power LED may indicate that the gateway is turned off. In other embodiments, instead of using different color indications to indicate the turn on and turn off condition, the power LED 215 may be configured to turn on (e.g., light up) when the gateway 200 is turned on and to turn off (e.g., not light up) when the gateway is turned off.

Likewise, the network connection LED 220 may be used to indicate when the gateway 200 is connected to a network (e.g., cellular network) for receiving sensor data from the sensors 140, 145, 150, 155, 160, and 165, and/or for transmitting the sensor data to the server 120. Thus, when the gateway 200 has an established communication link with the sensors 140, 145, 150, 155, 160, and 165 via the communication link 170, or with the server 120 via the communication link 175, the network connection LED 220 is turned on. In other embodiments, the network connection LED 220 may show a red indication when the gateway 200 has not established a communication link with the sensors 140, 145, 150, 155, 160, and 165, or the server 120, and a green indication when the communication link is established.

The server connection LED 225 indicates when the gateway 200 is connected to the server 120 and transmitting the sensor data to the server. Similarly, the sensor activity LED 230 indicates when the gateway 115 is receiving sensor data from the sensors 140, 145, 150, 155, 160, and 165. Again, the indication may be by changing colors (e.g., turning green when transmitting/receiving and turning red when not transmitting/not receiving) or by turning on and off (e.g., turning on when transmitting/receiving and turning off when not transmitting/not receiving).

By virtue of reviewing the status of the LEDs 210, the status of the gateway 200 may be determined (e.g., whether the gateway is receiving sensor data or whether the gateway is transmitting data). The LEDs 210 may also be used to determine certain malfunctions. For example, if a user (e.g., installer, customer, emergency response crew) is aware of a transmission from the sensors 140, 145, 150, 155, 160, and 165 to the gateway 200, or from the gateway to the server 120, and the appropriate ones of the LEDs 210 do not indicate the transmission, the user may determine that a component malfunction has occurred.

Notwithstanding the LEDs 210 that are shown and described in the gateway 200, in alternative embodiments, fewer, other, or additional LEDs may be used to provide status of other conditions. Further, the manner (e.g., color indicator or turning on/off) of indicating a condition by the LEDs 210 may vary from one embodiment to another. Although the colors green and red have been described for the color indicators of the LEDs 210, in other embodiments, different colors may be used. Furthermore, the shape, size, and arrangement of the LEDs 210 on the housing 205 may vary from one embodiment to another.

The housing 205 of the gateway 200 also includes an installation button 235. The installation button 235 may be actuated by any of a variety of ways, such as, by pushing, sliding, rocking, rotating, pulling, magnetizing, depressing, etc. The installation button 235 may be actuated during installation of the gateway 200. For example, after mounting the housing 205 of the gateway 200 within the building 105, an installer may actuate the installation button 235 to connect the gateway 200 to the sensors 140, 145, 150, 155, 160, and 165, and to the server 120. In some embodiments, the installation button 235 may also be used during troubleshooting, for example, to factory reset the gateway 200 to return the gateway settings to a factory default. In some embodiments and, particularly in the absence of a separate power button, the installation button 235 may also be used to restart the gateway 200. Similar to the LEDs 210, the shape, size, and arrangement of the installation button 235 on the housing 205 may vary from one embodiment to another.

Although only the LEDs 210 and the installation button 235 are described as being on the housing 205 (e.g., visible from outside) of the gateway 200, in other embodiments, other buttons, actuating mechanisms, or other components may be provided on the housing. For example, in some embodiments, the housing 205 may include external antennae, connection ports, battery compartments, etc. that may be needed or desirable to include on the housing 205 of the gateway 200.

Within the housing 205, the gateway 200 includes a receiver module 240, a transmitter module 245, a processing unit 250, a memory 255, a firmware update module 260, a battery charging circuit 265, and a battery back-up circuit 270. In other embodiments, other, fewer, or additional components and modules may be provided within the housing 205 of the gateway 200. With respect to the receiver module 240, in some embodiments, the receiver module is a radio frequency receiver that is configured to establish a wireless connection with the sensors 140, 145, 150, 155, 160, and 165, and with the server 120, as well as configured to receive sensor data from the sensors wirelessly. The receiver module 240 may be configured with a specific protocol, such as, Zigbee, Bluetooth, Wi-Fi, cellular, or other protocol to communicate with the sensors 140, 145, 150, 155, 160, and 165, and the server 120.

Furthermore, in some embodiments, the receiver module 240 may be configured to operate at various radio frequencies. For example, in some embodiments, the receiver module 240 may be configured to receive communications at or between 319 to 433 MHz. In other embodiments, the receiver module 240 may be configured to operate at other or additional frequencies. The receiver module 240 may also include various antennae (both external and internal (whether vertical and/or horizontal)), external communication ports (e.g., UART serial communication, bi-directional communication ports, universal serial bus ports, etc.) to communicate with an embedded processing unit, network matching components, encoding protocols (e.g., Manchester encoding protocols), on the fly antenna switching, signal strength indicators, and other features that may be needed or considered desirable to have in the receiver module 240 to facilitate receiving sensor data as modulated signals from the sensors 140, 145, 150, 155, 160, and 165, and demodulating the received signals for transmission by the transmitter module 245.

The transmitter module 245 is similar to the receiver module 240, but designed to transmit the sensor data received by the receiver module to the server 120. Similar to the receiver module 240, the transmitter module 245, in some embodiments, may be a radio frequency transmitter that is configured with a variety of features that are suitable for a radio frequency transmitter. In some embodiments, the receiver module 240 and the transmitter module 245 may be integrated together in a single transceiver module or a system-on-chip (SOC) module that is configured to both receive and transmit sensor data.

The processing unit 250 is capable of executing computer code for running one or more processes described herein. In some embodiments, the processing unit 250 includes a SA1100 module from the NovAtel, Inc. company headquartered in Calgary, Canada. In other embodiments, the processing unit 250 may be based on other or additional hardware modules. In general, the processing unit 250 may be of any type that is suitable to perform operations of a gateway device (e.g., the gateway 200). In some embodiments, the processing unit 250 may include multiple processing units in communication with one another.

The memory 255 may be used for storing sensor data from the sensors 140, 145, 150, 155, 160, and 165 and/or computer code for completing and/or facilitating various processes described in the present disclosure. Such memory may include volatile and/or non-volatile memory including, random access memory (RAM), read-only memory (ROM), dynamic random access memory (DRAM), programmable read only memory (PROM), erasable programmable read only memory (EPROM), electrically erasable programmable read only memory (EEPROM), flash memory, hard drive storage, optical memory, or any other suitable memory for storing data, software objects and/or computer instructions. In some embodiments, the memory 255 may be configured to buffer data for a period of time. For example, in some embodiments, the memory 255 may be configured to store sensor data received from the sensors 140, 145, 150, 155, 160, and 165 for a given period of time (e.g., four hours in a RAM memory and an additional forty eight hours in a non-volatile memory) in the event of a loss of communication between the gateway 200 and the server 120.

The gateway 200 also includes a firmware update module 260. The firmware update module 260 may be used to receive firmware updates to the gateway 200. In some embodiments, the firmware update module 260 may be configured for firmware-over-the-air (FOTA) updates. In other embodiments, the firmware update module 260 may be configured to receive firmware updates via other mechanisms. To receive updates, the firmware update module 260 may be configured to check for new updates periodically. For example, in some embodiments, the firmware update module 260 may be configured to check for updates every night at a specified time. In other embodiments, the firmware update module 260 may be configured to check for updates more or less frequently, and at varying times of the day.

To check for updates, the firmware update module 260 may be configured to establish a connection (e.g., a wireless connection) with the server 120. In other embodiments, instead of periodically checking for firmware updates, the firmware update module 260 may be configured to merely receive updates pushed to the firmware update module by the server 120. If the firmware update module 260 detects a firmware update, the firmware update module may download the firmware update and apply the firmware update to the appropriate modules. In some embodiments, applying the firmware update to a module may require rebooting of that module. The firmware update module 260 may be configured to automatically reboot a module after applying the firmware update.

Furthermore, in some embodiments, the firmware update module 260 may be configured such that the operation of the gateway 200 is not obstructed during the download and installation of the firmware updates. Thus, the gateway 200 may continue normal operation (e.g., receiving sensor data from the sensors 110 and transmitting sensor data to the server 120) while the firmware update module 260 is downloading and applying the firmware updates.

Although the firmware update module 260 is shown as a separate module, in some embodiments, the firmware update module may be integrated with one or more of the processing unit 250 and the memory 255. Likewise, the processing unit 250 and the memory 255, in some embodiments, may be integrated together. Further, in some embodiments, one or both of the receiver module 240 and the transmitter module 245 may be integrated with the processing unit 250 and/or the memory 255. Further, although only the receiver module 240, the transmitter module 245, the processing unit 250, the memory 255, and the firmware update module 260 are shown in the gateway 200 (in addition to the battery charging circuit 265 and the battery back-up circuit 270, discussed below), in alternative embodiments, other, fewer, or additional components may be included within the gateway 200.

To power the gateway 200, the gateway includes the battery charging circuit 265 and the battery back-up circuit 270. In some embodiments, the gateway 200 may be configured to draw power from a power source 275. The power source 275 may be an external power supply (e.g., a conventional AC power connection) that is connected to the gateway 200 via an adaptor (e.g., an alternating current adaptor). The power source 275 may be configured to supply power to the various components of the gateway 200. In other embodiments, the gateway 200 may also include a battery back-up that provides power to the gateway 200 via the battery back-up circuit 270. The gateway 200 may be configured to operate with a variety of batteries. For example, in some embodiments, the batteries may be nickel-metal hydride (NiMH) batteries, lithium-ion batteries, nickel cadmium batteries, lithium polymer batteries, etc. The batteries may be inserted in a battery compartment provided in the housing 205 of the gateway 200. The batteries may be used in case of disruption of power supply from the power source 275.

Further, in some embodiments, the batteries may be configured to provide power to the gateway 200 for a specified period of time (e.g., for 24 hours). The batteries may be disposable batteries or rechargeable batteries. In some embodiments, the gateway 200 may have a built in battery charging unit (e.g., the battery charging circuit 265) that may be used to charge the batteries via the battery back-up circuit 270 when the batteries are discharged or reach below a certain level of power. In some embodiments, the gateway 200 may also include indications (e.g., LED indications) of battery status (e.g., when disposable batteries are used and need to be changed). Furthermore, in some embodiments, the gateway 200 may be configured to operate in a variety of power modes. For example, in some embodiments, the gateway 200 may be configured to operate in a regular power mode when the gateway 200 is connected to and receiving power from the power source 275, and in a power saver mode when the gateway is powered using the back-up batteries via the battery back-up circuit 270.

In other embodiments, the gateway 200 may be configured to draw power from and operate from other types of power sources. For example, the gateway 200 may be configured to use solar power, wind power, geothermal power, or other types of renewable and non-renewable energy sources. Furthermore, in some embodiments, the gateway 200 may be configured such that certain components of the gateway are powered from the power source 275 and operate on battery back-up from the battery back-up circuit 270 only when power from the power source is disrupted, while other components of the gateway are only powered by either the battery back-up or the power source.

Thus, the gateway 200 is configured with a variety of features to perform a variety of functions. For example, the gateway 200 provides a flexible design that may be modified to fit a variety of needs. In addition to the features of the gateway 200 described above, in some embodiments, the gateway may be configured to receive time data information from the server 120, may include a variety of security features (e.g., transport layer security features), internal logging features to store gateway activity and sensor data in log files, ability to transmit log files to the server, and access point mode features. Other features that may be needed or considered desirable to have in the gateway 200 may be provided in other embodiments.

Figure 3:
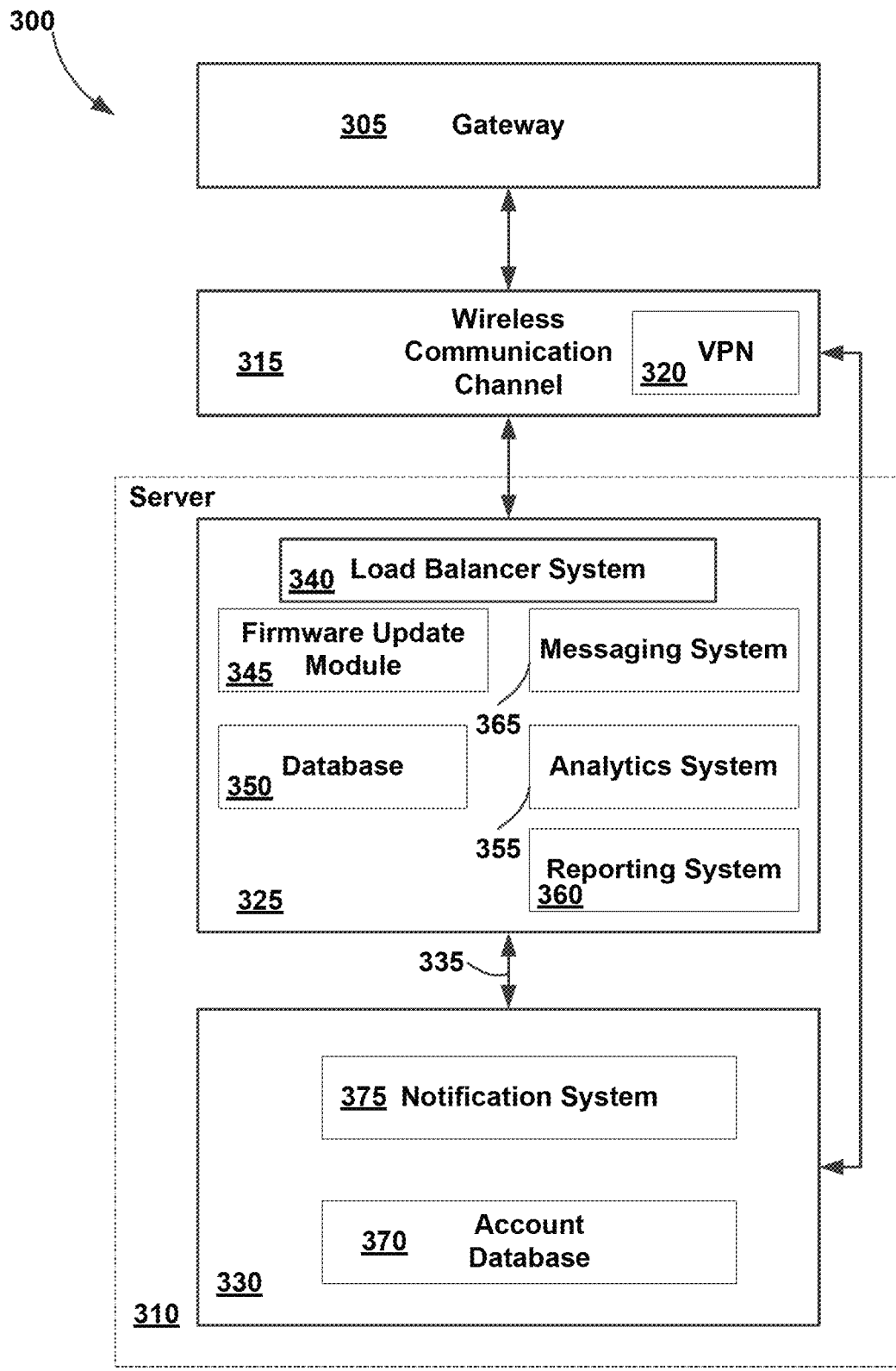
FIG. 3 is another block diagram illustrating communication between the gateway and a server of the building monitoring system of FIG. 1, in accordance with some embodiments of the present disclosure.

A block diagram 300 illustrating communication between a gateway 305 and server 310 is shown in FIG. 3, in accordance with some embodiments of the present disclosure. The gateway 305 is similar to the gateway 115 of FIG. 1 and the gateway 200 of FIG. 2, and is, therefore, not described here again. The gateway 305 and the server 310 communicate with each other via a communication channel 315. The communication channel 315 is similar to the communication link 175. In at least some embodiments, the communication channel 315 is a wireless communication channel, for example, a cellular network. In other embodiments, the communication channel 315 may assume any of the configurations described above with respect to the communication link 175. Although not shown, the communication channel 315 may include a variety of hardware, software, and firmware modules, including, for example, tools, routines, and protocols of an application program interface (API) to facilitate communication between the gateway 305 and the server 310.

The gateway 305 may establish a secure communication link to the server 310 via the communication channel 315. For example, in some embodiments, the gateway 305 may establish a dedicated and reliable virtual private network (VPN) communication link to the server 310 via the communication channel 315 using a VPN module 320. In other embodiments, the gateway 305 may use other techniques of establishing a secure communication link with the server 310 via the communication channel 315. Furthermore, in some embodiments, after establishing a secure communication link to the server 310 via the communication channel 315, the gateway 305 and the server may periodically check the established communication link to ensure that the communication link is still secure. If the communication link is no longer secure, the gateway 305 and/or the server 310 (whichever one detects that the communication link is not secure) may break the communication and retry to establish another secure communication link via the VPN module 320.

Once the communication link between the gateway 305 and the server 310 is disrupted, the gateway may buffer the unsent sensor data until the communication link is reestablished. In some embodiments, reestablishing the secure communication link between the gateway 305 and the server 310 may involve rebooting of the gateway. For example, in some embodiments, if the gateway 305 is unable to establish a secure communication link with the server 310 via the communication channel 315 within a specific period of time, the gateway may be configured to automatically reboot. In some embodiments, the gateway 305 and/or the server 310 may be configured to issue alert notifications to installers to alert them of the failure to establish a secure communication link between the gateway and the server.

Upon receiving the sensor data from the gateway 305, the server 310 may store that sensor data, as well as perform a variety of analytics on the sensor data. In some embodiments, the server 310 may include a first server 325 and a second server 330, each of which may be used for different purposes. In some embodiments, either or both of the first server 325 and the second server 330 may be cloud based server systems. For example, in some embodiments, the first server 325 may be an Amazon Web Services (AWS) secure cloud based platform, while the second server 330 may be a Microsoft Azure cloud computing platform. In other embodiments, different cloud based servers may be used. In yet other embodiments, either or both of the first server 325 and the second server 330 may be physical (e.g., non-cloud based) servers. In general, the first server 325 and the second server 330 may be any type of server systems that provide computing power, content delivery, and storage to facilitate the functions described herein.

In some embodiments, it is preferable for the first server 325 and the second server 330 to be different (e.g., of different providers) for security reasons, such that a first type of information is stored on one of the servers and a second type of information is stored on the other one of the servers. For example, in some embodiments, any user related information or account information of the building monitoring system 100 may be stored on the second server 330 and sensor data, as well as analytics performed on that sensor data, may be stored on the first server 325. By virtue of storing different information on different servers, a server may be immune or at least somewhat resistant to security breaches that may impact the other server. Further, in some embodiments, the first server 325 and the second server 330 may be configured to communicate with each other via communication link 335. The communication link 335 may be of any kind that is suitable for facilitating communication between two servers.

The first server 325 may include, in some embodiments, a load balancer system 340, a firmware update module 345, a database 350, an analytics system 355, a reporting system 360, and a messaging system 365. It is to be understood that in other embodiments, other, fewer, or additional components that may be needed or considered desirable to include in the first server 325 may be provided. The load balancer system 340 may be used by the first server 325 to receive the sensor data from the gateway 305 via the communication channel 315, and distribute the sensor data to various components of the first server 325 for further processing and storage. For example, the load balancer system 340 may pass the data on to the database 350 for storing the sensor data within the database, as well as transmit the data to the analytics system 355 to perform analytics on. By virtue of distributing the sensor data amongst various components of the first server 325, the load balancer system 340 optimizes resource use, maximizes throughout, and minimizes response time.

The firmware update module 345 is similar to the firmware update module 260 in functionality, insofar as the firmware update module 345 is configured to receive firmware updates and apply those updates to the appropriate components. In some embodiments, the firmware update module 345 is configured to receive firmware updates over the air (FOTA), while in other embodiments, the firmware update module may be configured to use other methods to receive firmware updates.

The database 350 may be used to store sensor data that is received from the gateway 305 via the communication channel 315. In some embodiments, the first server 325 may timestamp the sensor data before storing within the database 350. Furthermore, the database 350 may be configured such that the sensor data may be easily and quickly retrieved from the database and transmitted for further processing. Additionally, in some embodiments, the database 350 may also be used to store the processing results of processing performed on the sensor data by the analytics system 355, as well as any reports that are generated from that sensor data. The database 350 may be used to further store any computer instructions, protocols, routines, or other information that the first server 325 may need to operate as intended, as well as to store, and process sensor data.

The database 350 may be configured in a variety of ways to perform the functions described herein. For example, in some embodiments, the database 350 may be configured as multiple database components, with each database component configured to store a specific type of information. Additionally, in some embodiments, the database 350 may be configured to avoid single point of failures. In other embodiments, the database 350 may be configured to be scalable or expandable to accommodate increased storage needs.

The analytics system 355 continuously monitors and processes incoming sensor data to detect undesirable conditions and threats based on past and current sensor data. The analytics system 355 may also be configured to establish and continuously update "normal" environmental conditions within the building 105 to detect the undesirable conditions and threats. The analytics system 355 may use a variety of techniques to detect the undesirable conditions and threats from the sensor data. For example, in some embodiments, the analytics system 355 may use an average of averages technique to detect the undesirable conditions and threats. Using this technique, the analytics system 355 may determine a short term moving average, a midterm moving average, and a long term moving average, of the sensor data. The analytics system 355 may further average the short term moving average, the midterm moving average, and the long term moving average into a combined average, which may then be used to detect the undesirable conditions and threats. Thus, the combined average is an average of averages.

For example, in some embodiments, the short term average of the sensor data may be determined by averaging sensor data received in the past three minutes. In alternative embodiments, the short term moving average may correspond to any suitable time frame, which can be less than or greater than three minutes. Further, the analytics system 355 may use any suitable average technique. For example, in some embodiments, the analytics system 355 may use a weighted average technique. In such embodiments, more recent sensor data may be weighted more than older sensor data. In other embodiments, the analytics system 355 may use a mathematical or arithmetic average technique of averaging the sensor data.

Likewise, the midterm moving average may be an average value of sensor data received in the past thirty minutes, and the long term moving average may be an average of sensor data received in the past three hours. In other embodiments, other time frames for determining the midterm moving average and the long term moving average may be used. Furthermore, any suitable averaging technique can be used. For example, a weighted average, a mathematical average, or arithmetic average technique of averaging the sensor data may be used.

The analytics system combines the short term moving average, the midterm moving average, and the long term moving average using any of a variety of averaging techniques (e.g., weighted, mathematical, or arithmetic) described above to obtain the combined average. The analytics system 355 may compute multiple such combined averages, one or more of which may then be fit to a distribution. For example, in some embodiments, the combined averages for the past thirty days may be fit to a distribution. In other embodiments, combined averages of more than or less than thirty days may be fit to a distribution. The distribution may be any of a variety of graphical, tabular, combination of graphical and tabular, or any other type of distribution that may be considered suitable. The distribution may be used to learn various normal behavioral patterns of the building 105 from the sensor data, as well as to detect the undesirable conditions and threats. By determining the normal behavioral patterns, the analytics system 355 may determine upper and lower set-points that may be used to detect threats.

For example, in some embodiments, the analytics system 355 may compare the sensor data to the determined set-points. If a sensor measurement is outside of the determined set-points (e.g., greater than the upper set-point or lower than the lower set-point), the analytics system may determine that a threat exists. Upon detecting the threat, the analytics system 355 may take any suitable action, such as sounding an alarm, notifying occupants, notifying users, notifying emergency personnel, etc.

Furthermore, in some embodiments, what is considered a normal behavioral pattern of the building 105 may change over time. For example, some measurements fluctuate over time and what is considered "normal" fluctuates over time. For example, from July through December, the average indoor temperature may change from 75° F. in July to 65° F. in December. In July the normal indoor temperature may be 75° F.±7° F., and in December the normal indoor temperature may be 65° F.±10° F. Thus, in some embodiments, pre-determined static set-points that don't change with changing normal behavioral patterns of the building 105 may be either too sensitive or not sensitive enough, and may not accurately predict threat conditions. For example, an upper set-point of 82° F. may be appropriate in July, but may be too high in December. Similarly, an upper set-point of 75° F. may be appropriate in December, but may be too low in July. Thus, in some instances, the analytics system 355 may determine moving set-point values using the combined average technique described above, such that what is considered "normal" changes with time.

In other embodiments, instead or in addition to using the average of averages technique, the analytics system 355 may combine sensor data from multiple sensors to determine whether the undesirable conditions and threats exist. For example, in some embodiments, the analytics system 355 may use Bayesian Networks or Neural Networks to make inferences to detect the undesirable conditions and threats. Examples of using the set-point technique and the Bayesian network technique are described below in FIGS. 4-6B. Furthermore, additional details on how the analytics system 355 analyzes the sensor data to detect the undesirable events and threats are found in U.S. patent application Ser. No. 15/099,786, filed on Apr. 15, 2016, the entirety of which is incorporated by reference herein.

In addition to analyzing the sensor data, the analytics system 355 may generate a variety of reports from the analyzed sensor data. For example, in some embodiments, the analytics system 355 may generate a comfort level report detailing temperature trends in the building 105. The analytics system 355 may also generate activity pattern reports, safety level reports, overall overview reports, etc. Some of the reports generated by the analytics system 355 are described below in FIGS. 7A-8E. In some embodiments, the analytics system 355 may also update the reports after they are generated when new and relevant sensor data becomes available.

In some embodiments, the analytics system 355 may not generate and/or update the reports. In those embodiments, the reporting system 360 may generate and/or update the reports. For example, in those embodiments, the analytics system 355 may transmit the analyzed (and/or non-analyzed) sensor data to the reporting system 360, which may then use that sensor data to compile and/or update reports. In yet other embodiments, the analytics system 355 may generate and/or update some reports, while the reporting system 360 may generate and/or update other reports. Thus, various configurations of generating and/or updating reports are contemplated and considered within the scope of the present disclosure.

Furthermore, in some embodiments, the reports that are generated by the analytics system 355 and/or by the reporting system 360 may be stored within the database 350. In some embodiments, instead of, or in addition to, storing the reports within the database 350, one or more of the reports may be stored within either or both of the analytics system 355 and the reporting system 360.

The messaging system 365 may be used to support a variety of messaging applications and communication patterns. In some embodiments, the messaging system, 365 may be based on an Advanced Messaging Queuing Protocol (AMQP). In other embodiments, the messaging system 365 may be configured to use other or additional protocols. The messaging system 365 may be used to store messages (e.g., alerts, alarms, status notifications, etc.) that are to be communicated to various users (e.g., installers, emergency personnel, and customers). In other embodiments, the messaging system 365 may be used to store other types of notifications that the first server 325 may deem appropriate to send to the users. The messaging system 365 may receive messages to be conveyed to the users from the analytics system 355 and/or the reporting system 360, and store those messages until those messages are transmitted to the users.

Although not shown, it is to be understood that the various components of the first server 325 (e.g., the load balancer system 340, the firmware update module 345, the database 350, the analytics system 355, the reporting system 360, and the messaging system 365) may be configured to communicate with one another to receive and/or transmit information to those components.

With respect to the second server 330, in some embodiments, it may include an account database 370 and a notification system 375. The account database 370 may be used to securely store personal and installation data related to the building monitoring system 100. For example, in some embodiments, the account database 370 may store personal information (e.g., name, address, contact information, etc.) related to the customer (e.g., homeowner) where the building monitoring system 100 is installed. In other embodiments, the account database 370 may also be used to store identification codes of the sensors 110 and the gateway 115. In other embodiments, other personal, installation, or other account data may be stored within the account database 370. Furthermore, similar to the database 350, the account database 370 may be configured in a variety of ways, and may include various security features (e.g., encryption) to protect the information stored within the account database.

The notification system 375 may be used by the second server 330 to communicate the messages stored within the messaging system 365. For example, the notification system 375 may receive the messages from the messaging system 365 and transmit those messages to the users (e.g., installers, emergency response crew, and customers) using one or more communication modes (e.g., e-mail, short messaging, service, social media messages, etc.) specified by those users. For example, the notification system 375 may be configured to retrieve the contact information of the users from the account database 370, and communicate the messages to the users using that contact information. In some embodiments, preferred modes of communication may be stored within the notification system 375, such that the notification system may communicate with the users without first having to retrieve contact information from the account database 370.

Notwithstanding the components of the first server 325 and the second server 330 that are shown and described herein, it is to be understood that in other embodiments, other, fewer, or different components that may be needed or considered desirable to have may be provided within either or both of the first server and the second server. Furthermore, the first server 325, the second server 330, and the components of those servers may be configured in a variety of ways to perform the functions described herein.

Furthermore, either or both of the first server 325 and the second server 330 may include functionalities, not described here, but that may be considered useful to include. For example, either or both of the first server 325 and the second server 330 may include various security and authentication features (e.g., OAuth 2.0, OpenId Connect Service, etc.) to secure various services, applications, and other information stored on those servers. Either or both of the first server 325 and the second server 330 may also use encrypted passwords stored in a secure database (e.g., the database 350 and the account database 370). Information stored on the first server 325 and the second server 330 may be encrypted as well, in some embodiments.

Moreover, in some embodiments, all virtual machines, web services, and databases within the first server 325 and the second server 330 may be securely hosted to protect those servers from security breaches. Fewer, additional, or different security measures may be implemented in either or both of the first server 325 and the second server 330. Moreover, in some embodiments, either or both of the first server 325 and the second server 330 and components thereof may be configured for scalability. For example, various components of either or both of the first server 325 and the second server 330 may be configured to accommodate increased data volumes. In some embodiments, either or both of the first server 325 and the second server 330 may also include various redundancy and resilience features to reduce impact of failures. For example, in some embodiments, load balancers (e.g., the load balancer system 340) may be used in the second server 330 as well to distribute and manage information between various components of the second server. In some embodiments, load balancers may be provided in individual components as well. Either or both of the first server 325 and the second server 330, including, various components of those servers, may be configured to use various techniques, such as parallel processing, database integrity, database geolocation, etc., that may improve throughout and use of resources.

Figure 4:
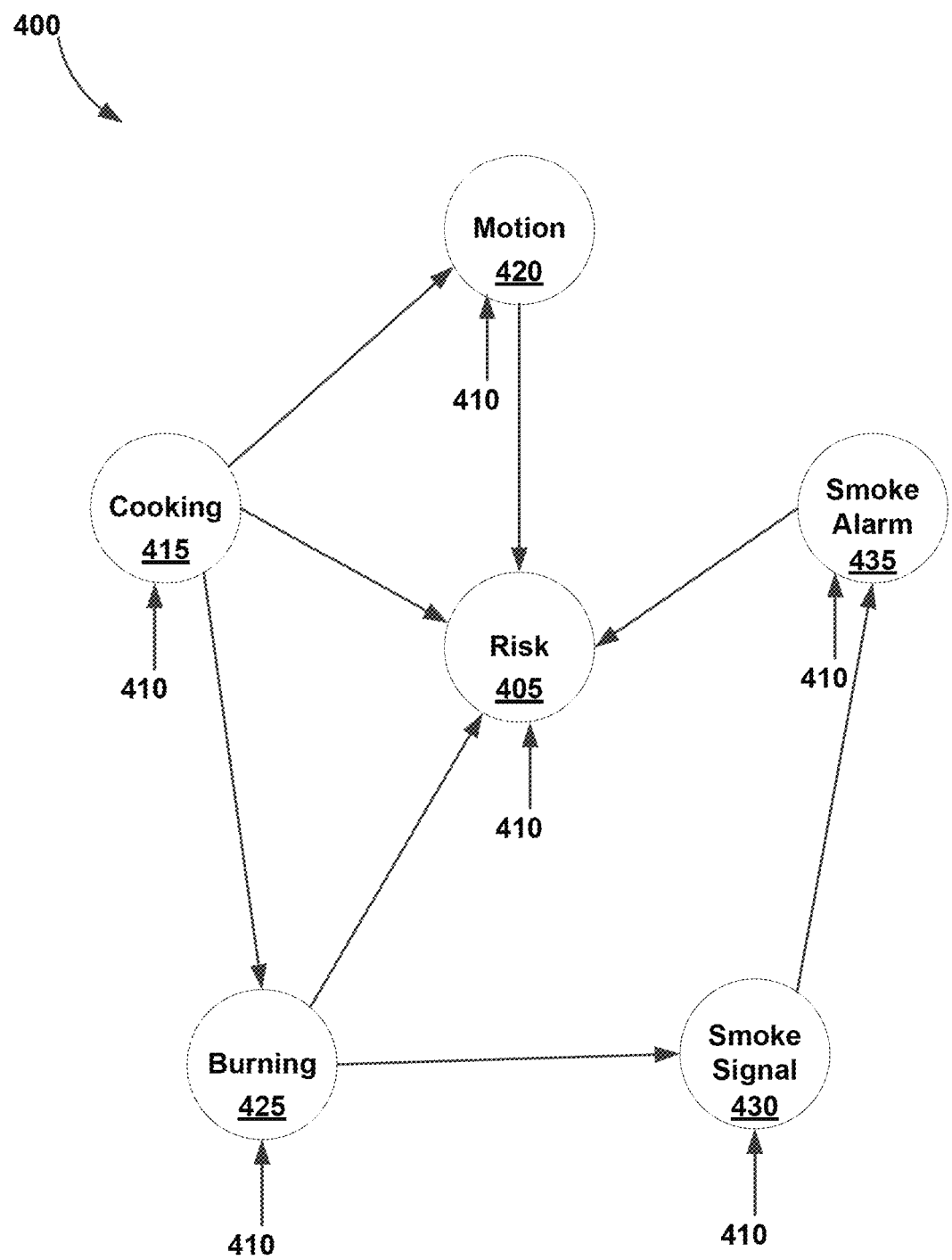
FIG. 4 is a network diagram illustrating detection of a risk of a threat using the building monitoring system of FIG. 1, in accordance with some embodiments of the present disclosure.

An example of a threat detection is shown in FIGS. 4-5B, in accordance with some embodiments of the present disclosure. For example, FIG. 4 shows a network diagram 400 for determining a risk 405 that a particular threat may occur based upon various factors, while FIGS. 5A-5B illustrate how the risk 405 may vary based upon variations in those factors. The network diagram 400 of FIG. 4 is a Bayesian network diagram that utilizes sensor data from multiple sensors to determine whether a threat (e.g., fire) exits. Bayesian networks may be used to make inferences based upon information that is known or possibly unknown. Threat detection using Bayesian networks is disclosed in more detail in U.S. patent application Ser. No. 15/099,786, filed on Apr. 15, 2016, the entirety of which is incorporated by reference herein.

For example, the network diagram 400 uses dependent relationships between variables 410 to calculate the risk 405 that a particular threat (e.g., fire) may occur. For example, the network diagram 400 may determine the risk 405 of fire within an area (e.g., kitchen) of the building 105 based upon whether someone is cooking, whether some food is burning, whether the smoke alarm has gone off (e.g., activated), and the amount of smoke detected by a smoke sensor. Thus, the network diagram 400 includes a cooking variable 415, a motion variable 420, a burning variable 425, a smoke signal variable 430, and a smoke alarm variable 435. Utilizing information from one or more of the cooking variable 415, the motion variable 420, the burning variable 425, the smoke signal variable 430, and the smoke alarm variable 435, the analytics system 355 may determine the risk 405.

In some embodiments, the analytics system 355 may include a baseline (e.g., set-point) for each variable. In some embodiments, the baseline may be a programmed value within the analytics system. In other embodiments, the baseline may be a moving value that may vary based upon past information collected and analyzed from sensor data. Thus, the analytics system 355 may compare a value of each of the variables 410 with the variables' respective baseline and determine the impact of that variable on the risk 405. For example, if the value of one of the variables 410 is greater than the variable's respective baseline, the risk 405 of the threat (e.g., fire) occurring may increase. The analytics system 355 may also use the variables 410 for which values are known to predict or make inferences for those variables whose values are unknown, and determine the impact of the risk 405 from the inferences. Thus, based upon known and unknown values of the variables 410, the analytics system 355 may calculate the risk 405.

For example, the analytics system 355 may receive information from a motion sensor in the area (e.g., kitchen) of the building 105 indicating whether there is motion in that area or not. This motion information may be reflected by the motion variable 420. The analytics system 355 may also receive information from a smoke sensor in that area (e.g., kitchen) indicating presence or absence of smoke in that area, and whether the smoke alarm has gone off or not. Smoke may be represented by the smoke signal variable 430 and the activation of the smoke alarm may be represented by the smoke alarm variable 435. Based upon the values of the motion variable 420, the smoke signal variable 430, and the smoke alarm variable 435, the analytics system 355 may infer the probability that someone is cooking (represented by the cooking variable 415) and whether some food is burning (represented by the burning variable 425). Using the values of the cooking variable 415, the motion variable 420, the burning variable 425, the smoke signal variable 430, and the smoke alarm variable 435, the analytics system 355 determines the risk 405 of a threat (e.g., fire) in the area (e.g., kitchen) of the building 105.

Referring to FIG. 5A in conjunction with FIG. 4, a risk chart 500 is shown, in accordance with some embodiments of the present disclosure. The risk chart 500 calculates a risk probability 505 that determines the risk 405 of whether a threat (e.g., fire) has occurred or is likely to occur within an area (e.g., kitchen) of the building 105. For example, indication of motion by the motion variable 420 is represented by motion probability 510. The motion variable 420 either indicates there is motion or no motion within the area (e.g., kitchen) of the building 105. Thus, the motion probability 510 is either 100% when there is indication of motion by the motion variable 420, or 0% when there is indication of no motion by the motion variable. Similarly, the smoke alarm variable 435 either indicates activation of the smoke alarm or no activation of the smoke alarm. Thus, a smoke alarm activation probability 515 is either 100% when the smoke alarm variable 435 indicates activation of the smoke alarm, or 0% when the smoke alarm variables indicates no activation of the smoke alarm.

Furthermore, in some embodiments, the analytics system 355 may be programmed such that if the smoke signal variable 430 is indicating an obscuration above 1.6%, the smoke alarm is activated. Thus, if the smoke alarm has been activated (as indicated by the smoke alarm variable 435) or if the smoke signal variable 430 is indicating an obscuration of greater than 1.6%, the analytics system 355 may determine that a smoke probability 520 is 100%. A value of greater than 1.6% obscuration for the smoke signal variable 430 may be indicative of a threat (e.g., fire). Thus, the 1.6% value is used as a baseline that may be programmed within the analytics system 355, or that the analytics system may have calculated from past sensor data. When programmed, it is to be understood that the 1.6% value is merely an example. In other embodiments, other values to indicate dangerous levels of smoke in an area (e.g., kitchen) may be used.

Furthermore, in some embodiments, smoke alarms may have three attributes that may be used for analysis. The attributes may be absolute temperature, as measured by a thermistor of the smoke alarm, obscuration, as measured by a plastic chamber of the smoke alarm, and relative temperature that is internal to a radio board processor of the smoke alarm. The data and alarm status as monitored across multiple smoke alarms inside a structure (e.g., the building 105) may be used to indicate the probability of a fire that may be located by the initiating alarm. The probability calculation offered by multiple sensor analysis may provide future monitoring stations the ability to discern a "false alarm" from a real fire scenario in real time.

Thus, based upon the smoke alarm being activated (based on the smoke alarm activation probability 515 being 100%), and detection of smoke in the area (e.g. kitchen) (based on the smoke probability 520 of smoke above 1.6% obscuration being 100%), the analytics system 355 may infer that some food is burning. The analytics system 355 may, therefore, increase a burning probability 525 by a certain value. For example, as illustrated in FIG. 5A, the analytics system 355 may determine that there is about 87% chance that some food (or something else) is burning in the area (e.g., kitchen). Again, the value by which the burning probability 525 is increased or decreased may vary from one embodiment to another. For example, in some embodiments, the burning probability 525 may be dependent upon the amount of smoke detected within the area (e.g., kitchen). Thus, for a given level of smoke, the burning probability 525 may be a specific value. These levels of smoke and corresponding values of the burning probability 525 may be programmed within the analytics system 355. In other embodiments, other mechanisms of determining the burning probability 525 may be used.

The analytics system 355 may also determine a cooking probability 530. For example, the analytics system 355 may increase the cooking probability 530 when the analytics system determines that there is motion in the area (e.g., kitchen) of the building 105, as indicated by the motion probability 510. Based on the aggregate of the motion probability 510, the smoke alarm activation probability 515, the smoke probability 520, the burning probability 525, and the cooking probability 530, the analytics system 355 may determine the risk probability 505. For example, as illustrated in FIG. 5A, the analytics system 355 may determine from the motion probability 510, the smoke alarm activation probability 515, the smoke probability 520, the burning probability 525, and the cooking probability 530 that the risk probability 505 is about 88% that the area (e.g., kitchen) is not on fire.

Thus, based upon a variety of variables, the analytics system 355 may determine risk of a threat (e.g., fire) occurring within an area (e.g., kitchen) of the building 105. It is to be understood that the variables (e.g., the cooking variable 415, the motion variable 420, the burning variable 425, the smoke signal variable 430, and the smoke alarm variable 435) used by the analytics system 355 to determine the risk 405 may vary from one embodiment to another. For example, the variables may vary based upon the threat (e.g., fire) that the analytics system is calculating the risk for, the area (e.g., kitchen) within the building 105 for which the risk is calculated, and past normal values for that threat and area. In other embodiments, the analytics system 355 may take other factors into consideration in determining the risk of a threat. Again, the values of probabilities (e.g., the motion probability 510, the smoke alarm activation probability 515, the smoke probability 520, the burning probability 525, and the cooking probability 530) and the risk probability 505, and the values by which those probabilities are increased or decreased may vary.

With respect to FIGS. 4 and 5B, a risk chart 535 is shown, in accordance with some embodiments of the present disclosure. The risk chart 535 is similar to the risk chart 500 in that the risk chart also calculates a risk probability 540 based upon the cooking variable 415, the motion variable 420, the burning variable 425, the smoke signal variable 430, and the smoke alarm variable 435. Thus, the risk chart 535 uses the same variables as the risk chart 500, but comes up with a different outcome. For example, the risk probability 540 of the risk chart 535 predicts that there is a three times more risk of a threat (e.g., fire) within the area (e.g., kitchen) of the building 105.

For example, in the risk chart 535, the analytics system 355 determines a motion probability 545 to be 100% that there is no detected motion in an area (e.g., kitchen) of the building 105 based on a value of the motion variable 420, a smoke alarm probability 550 to be 100% that the smoke alarm has been activated based on a value of the smoke alarm variable 435, and a smoke signal probability 555 to be 100% that the smoke is greater than 1.6% of obscuration based upon a value of the smoke signal variable 430. The analytics system 355 also determines that a burning probability 560 indicates close to a 56% probability of no burning in the area (e.g., kitchen) and close to a 43% percent probability of burning in that area. The analytics system 355 may also infer that a cooking probability 565 indicates a much greater likelihood (e.g., ~95%) that there is no one cooking in the area (e.g., kitchen). Thus, based upon these probabilities, the analytics system 355 may conclude that the risk probability 540 indicates a three times more risk of a threat (e.g., fire).

The analytics system 355 (or another component of the server 310) may then use the analysis (e.g., the risk probability 505, 540) to determine whether any alerts and/or alarms need to be generated, and generate those alerts and/or alarms.

Figure 6A:
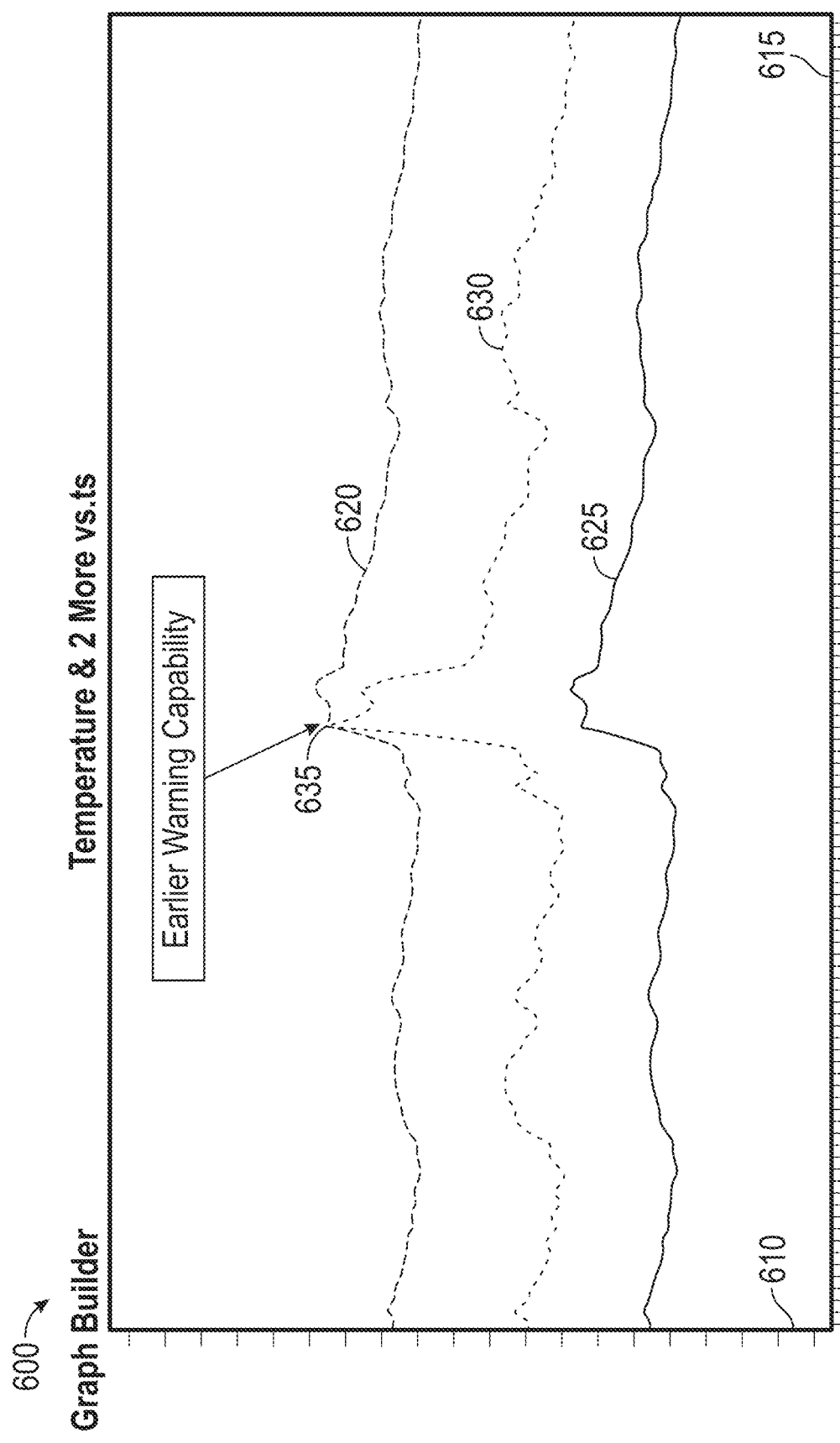
FIGS. 6A-6B are example graphs illustrating detection of a threat from undesirable conditions, in accordance with some embodiments of the present disclosure.
Figure 6B:
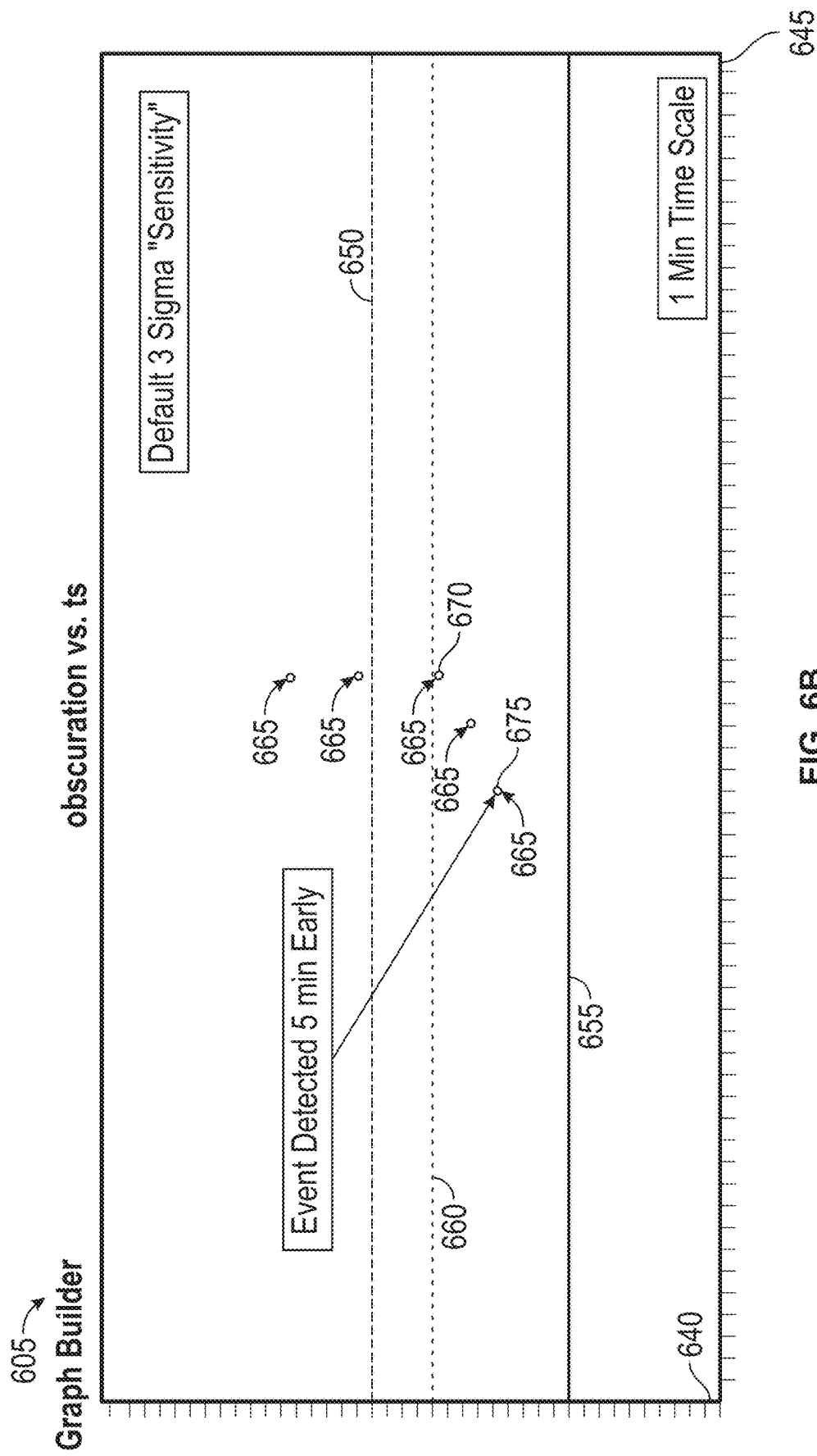
Figure 7C:
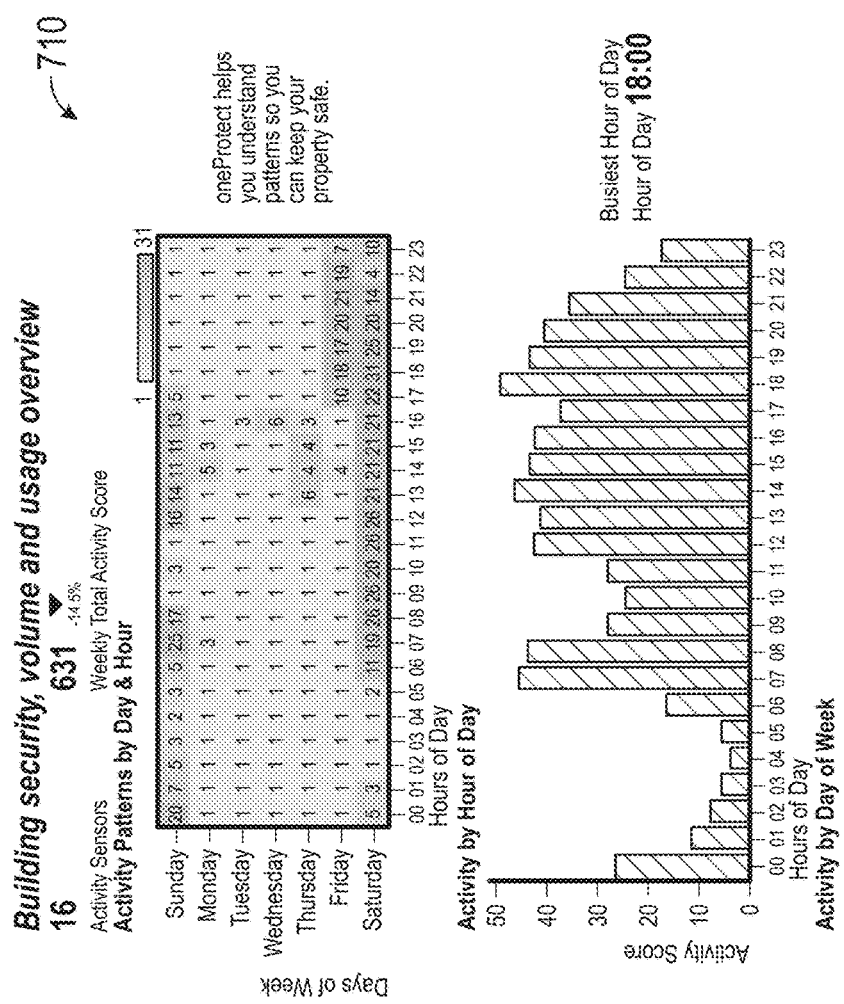
Figure 7D:
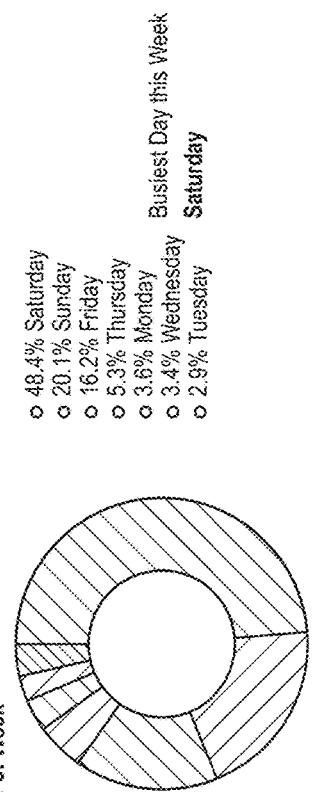

FIGS. 6A and 6B show graphs 600 and 605, respectively, in accordance with some embodiments of the present disclosure. The graphs 600 and 605 illustrate additional examples of how the analytics system 355 may detect a threat (e.g., fire) from sensor data. For example, the graph 600 plots temperature in a Kelvin temperature scale on y-axis 610 against time over a period of time on x-axis 615. It is to be understood that the values and units represented on the x-axis 615 and the y-axis 610 are an example and may vary in other embodiments.

For example, the graph 600 shows three plots, a first plot 620 representing an upper set-point, a second plot 625 representing a lower set-point, and a third plot 630 representing a real-time (or substantially real-time) temperature value. As discussed above, in some embodiments, the upper and the lower set-point points may be predetermined and preprogrammed into the analytics system 355. In other embodiments, the upper and the lower set-points may be adjustable (e.g., self-adjusting) values that may change based upon past and present sensor data (e.g., past and present temperature data). For example, in some embodiments, the upper and lower set-points may be calculated using a midterm average value, a long term average value, and the real-time (or substantially real-time) or short term average temperature value.

Thus, as shown by the graph 600, the upper and lower set-points represented by the first plot 620 and the second plot 625, respectively, are affected by the real-time temperature changes represented in the third plot 630. However, by virtue of using the average of averages technique discussed above, the fluctuations over time of the upper and lower set-points are not as large as the fluctuations of the real-time (or substantially real-time) temperature.

By comparing the real-time (or substantially real-time) temperature value in the third plot 630 with the upper and lower set-point values in the first and second plots 620 and 625, respectively, the analytics system 355 may determine an undesirable condition. For example, the analytics system 355 may determine that an undesirable condition exists when values in the third plot 630 deviate from the values in the first plot 620 and the second plot 625. Thus, at point 635, the analytics system 355 may determine that the real-time (or substantially real-time) temperature is deviating from the upper and lower set-points and is, therefore, indicative of a potential undesirable condition (e.g., abnormally high temperature). From the x-axis 615, the analytics system 355 may determine the exact time when the deviation in the temperature has occurred.

In FIG. 6B, the graph 605 plots smoke obscuration in percentage on y-axis 640 against time over a period of time on x-axis 645. Again, the values and units along the x-axis 645 and the y-axis 640 may vary from one embodiment to another. The graph 605 also illustrates three plots—a first plot 650 for an upper set-point, a second plot 655 for a lower set-point, and a third plot 660 for a threshold set-point. Again, the upper, lower, and threshold set-points may be predetermined and preprogrammed within the analytics system 355, or they may be adjustable values that may change over time. In some embodiments, the threshold set-point may be a value such that a smoke level beyond that value may be indicative of an undesirable event.

The analytics system 355 may receive sensor data from a smoke sensor indicating a smoke level in the area in which the smoke sensor is installed (e.g., from the sensor 140). The analytics system 355 may plot the sensor data on the graph 605 to compare that data with the upper set point, lower set-point, and the threshold set-point. For example, each point 665 on the graph may indicate one reading of sensor data (e.g., of the sensor 140, which in some embodiments is a smoke sensor). Thus, from the graph 605, the analytics system 355 may determine that at point 670, the smoke level has crossed the threshold set-point represented by the third plot 660, and therefore, an undesirable condition (e.g., smoke) exists in the area where the sensor 140 (which, as discussed above, is a smoke sensor in some embodiments) is located.

The analytics system 355 may also issue various alerts when the undesirable conditions of the graphs 600, 605 are detected. In some embodiments, the analytics system 355 may aggregate sensor data from multiple sensors to detect a threat (e.g., fire) from the detected undesirable conditions, and issue alarms. For example, the analytics system 355 may combine the temperature data from the graph 600 with the smoke level data from the graph 605 to predict a fire event at least 5 minutes before the fire actually breaks out.

For example, the analytics system 355 may determine that the temperature in a given area of the building 105 is rising at the same (or substantially same) time as the smoke level in that area is rising. Based on that information, the analytics system 355 may determine that a fire in the area is about to break out. In some embodiments, in the absence of temperature rise, the use of both smoke obscuration and carbon monoxide parts per million measurements may provide a strong probability of a fire within the building 105.

In some embodiments, a combination of a smoke alarm, having three criteria metrics discussed above, in addition to carbon monoxide measurements, may provide an excellent method of detecting smoldering fires within the building 105. The peak carbon monoxide levels may indicate fire intensity in any given area within the building 105. Changing carbon monoxide levels may indicate smoldering fires in advance of photo electric detection. In some embodiments, humidity readings may be used to prevent false alarms.

Thus, the analytics system 355 may use multiple mechanisms to detect a threat and to prevent false alarms. The analytics system 355 (or another component of the server 310) may dial 911 or contact an emergency response center directly to report the threat.

In some embodiments, the analytics system 355 may also predict threat patterns. For example, the analytics system 355 may determine fire patterns, such as how a fire is spreading, how fast it is spreading, which areas are more vulnerable to catching fire, etc. based upon sensor data received from various the sensors 110 within the building 105, and by aggregating and analyzing the information in that sensor data.

Thus, the analytics system 355 is configured to predict, detect, and possibly prevent undesirable conditions and threats. The analytics system 355 is also configured to learn the environment of the building 105 over a given period of time (e.g., over 35 days) to obtain normal operating conditions within the building. Upon determining the normal operating conditions, the analytics system 355 may analyze all newly acquired sensor data against known normal operating conditions to facilitate early detection of threats.

Example reports that may be generated by the server 310 are shown in FIGS. 7A-7D, in accordance with some embodiments of the present disclosure. In some embodiments, these reports may be generated by the reporting system 360. In other embodiments, these reports may be generated by the analytics system 355. In yet other embodiments, some reports may be generated by the analytics system 355 and other reports may be generated by the reporting system 360.

Example reports may include a protection overview report 700, a comfort overview report 705, an activity overview report 710, and a building safety report 715. Notwithstanding that only the protection overview report 700, the comfort overview report 705, the activity overview report 710, and the building safety report 715 are illustrated and described herein, a variety of other reports are contemplated and considered within the scope of the present disclosure. For example, in some embodiments, each of the protection overview report 700, the comfort overview report 705, the activity overview report 710, and the building safety report 715 may be further broken down into more detailed reports. In other embodiments, other types of reports may be generated as well. Further, the attributes that are listed on each of the reports may vary from one embodiment to another. In some embodiments, the attributes that are included in a report may be selected by a user (e.g., using filters).

Additionally, in some embodiments, different reports may be generated based upon the reviewer of a particular report. For example, reports that are generated for a customer may be different (albeit with some overlapping information) than the reports that are generated for an installer, and those reports may be different (again, with possibly some overlapping information) than the reports generated for use by the emergency response crew. Thus, a variety of reports for a variety of purposes may be generated by the server 310. These reports may provide valuable insights about various aspects of the building 105, such as whether a particular area of the building or any features within that area need immediate attention, or need attention to improve the safety and usability of that area.

The reports may be viewed using the user interface 125. In some embodiments, the server 310 may be configured to provide a notification to the user (e.g., customer, installer, emergency response crew) on the user interface 125 every time or periodically when one or more new reports directed for that user are generated. In other embodiments, the server 310 may not provide any report notifications to the user (e.g., customer, installer, emergency response crew), and may store these reports such that the user may access the reports from the server on-demand.

Furthermore, in some embodiments, these reports may be generated periodically. For example, a new report may be generated bi-weekly. In other embodiments, a new report may be generated at other time periods (e.g., daily, weekly, monthly, annually, semi-annually, etc.). In other embodiments, a new report may be generated from an older report any time information within the older report changes. Moreover, in some embodiments, the new report may over-write and replace the old report, or in other embodiments, the new report may co-exist with the old report within the server 310. In some embodiments, one or more of the reports may be configured to show data in real-time, and may, therefore, change, in real-time. In other embodiments, one or more of the reports may be passive reports that may report data collected over time. In yet other embodiments, the time frame in which a report is generated may vary based upon the information that the report is configured to convey. For example, a report configured to convey daily temperature within an area of the building 105 may be generated daily, while a report configured to convey average weekly or yearly temperature data may be generated weekly or yearly, respectively.

An example of the protection overview report 700 is shown in FIG. 7A, in accordance with some embodiments of the present disclosure. The protection overview report 700 provides an overall safety overview of the building monitoring system 100 in the entire building (e.g., the building 105). For example, the protection overview report 700 includes information such as, how many sensors (e.g., the sensors 110) are installed within the building, how many areas (e.g., floors, rooms, etc.) are protected, how long the building monitoring system 100 has been installed for, starting day and time when monitoring using the building monitoring system started, and an ending day and time when monitoring using the building monitoring system is to stop. Other information that may be considered useful may be provided within the protection overview report 700. In some embodiments, an instance of the protection overview report 700 may be generated for each area (e.g., floor or each room on a floor) of the building 105.

The comfort overview report 705 of FIG. 7B provides temperature patterns within the building 105. For example, the comfort overview report 705 provides temperature patterns by various areas (e.g., floors and/or rooms) within the building 105 over a period of time, such that a reviewer (e.g., customer, installer, emergency response crew) may determine the warmest and coolest areas within the building in a given period of time, warmest and coolest times of the day within a given area, etc. The comfort overview report 705 may also provide temperature averages within specific areas within the building 105, in specific periods of time. In other embodiments, the comfort overview report 705 may also include information other than temperature, such as humidity, air flow, air purity, and other attributes that may be needed or desired.

Similarly, the activity overview report 710 provides information related to activity (e.g., foot traffic) within the building 105. For example, the activity overview report 710 may include information such as busiest activity time within the building 105 (e.g., when the building is the most crowded), areas of the building that see the most activity, how the activity varies from one area of the building to another, other activity patterns, etc. By understanding the activity patterns within the building 105, users (e.g., customers, installers, emergency response crew) may determine when and where safety may be an issue in the building.

The building safety report 715 provides safety related information within the building 105. For example, in some embodiments, the building safety report 715 provides sensor data from the sensors 110 installed throughout the building 105. The building safety report 715 may also provide an analysis of the sensor data to include information, such as areas of the building 105 that are at a high risk for catching fire, any alerts and alarms generated in a given period of time, etc.

Again, the types of reports, and the information conveyed by those reports may vary from one embodiment to another based upon the information that is needed or desired, as well as who the reviewer of that report is.

Example reports that may be generated for a building information system are shown in FIGS. 8A-8E, in accordance with some embodiments of the present disclosure. For example, the reports of FIGS. 8A-8E may be used by one or more building or property managers to visually monitor various conditions in one or multiple buildings. The reports in FIGS. 8A-8E illustrate example conditions that may be monitored in one building. The reports of FIGS. 8A-8E may be expanded to include information for multiple buildings as well. Furthermore, as described below, one or more of the reports of FIGS. 8A-8E may have various report sections to provide varying types of information to a reviewer.

Figure 8A:
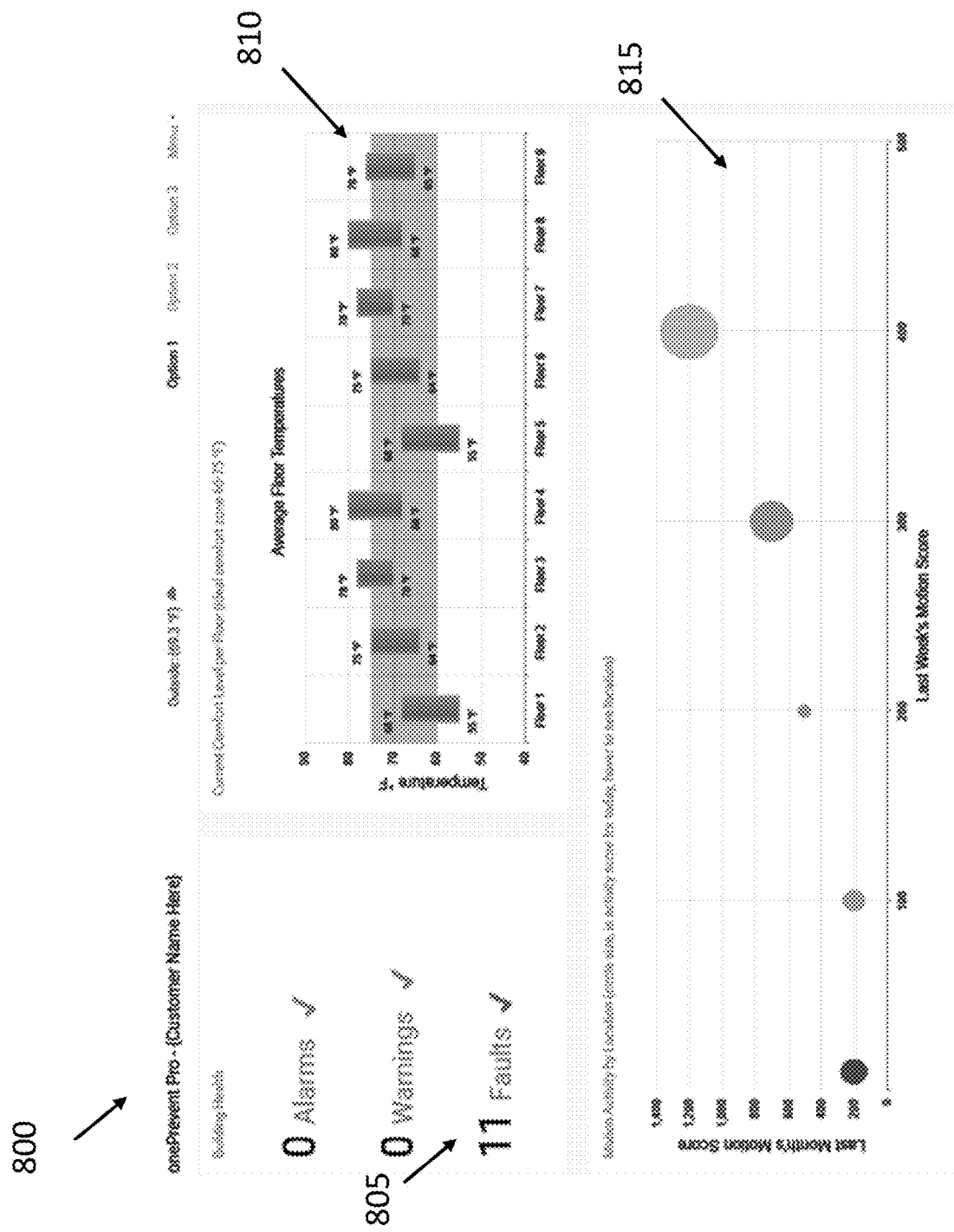
FIGS. 8A-8E are example reports of a building information system generated by the building monitoring system of FIG. 1, in accordance with some embodiments of the present disclosure.

For example, report 800 of FIG. 8A includes a first report section 805, a second report section 810, and a third report section 815. The first report section 805 provides a general overview of the status of the building 105 being monitored within a specific period of time. In some embodiments, the listings within a report section may be interactive. For example, within the first report section 805, a reviewer may be able to interact with (e.g., click, highlight, hover on, etc.) an attribute to receive further details of that attribute. In the second report section 810, the report 800 includes a graphical representation of average floor temperatures within a given period, while in the third report section 815, the report includes a graphical representation plotting a motion score associated with a motion activity within a given period.

It is to be understood that the time frame for which information is displayed within the first report section 805, the second report section 810, and the third report section 815, may vary from one embodiment to another, and need not be the same for each of the first, second, and third report sections. Additionally, the type of representation (e.g., graphical, tabular, list, etc.) within each of the first report section 805, the second report section 810, and the third report section 815 may vary from one embodiment to another. In some embodiments, each of the first report section 805, the second report section 810, and the third report section 815 may be individually configurable, such that a reviewer may be able to modify the parameters of a given section. For example, in some embodiments, the reviewer may be able to modify the type of representation, the period for which information is displayed, as well as the type of information (e.g., temperature report, motion score report, etc.) that is displayed within each report section.

Additionally, although three report sections (e.g., the first report section 805, the second report section 810, and the third report section 815) have been shown in the report 800, in other embodiments, fewer than or greater than three report sections may be displayed. The arrangement, size, color, and other configurations of each of the report sections (e.g., the first report section 805, the second report section 810, and the third report section 815) may also vary from one embodiment to another.

Figure 8B:
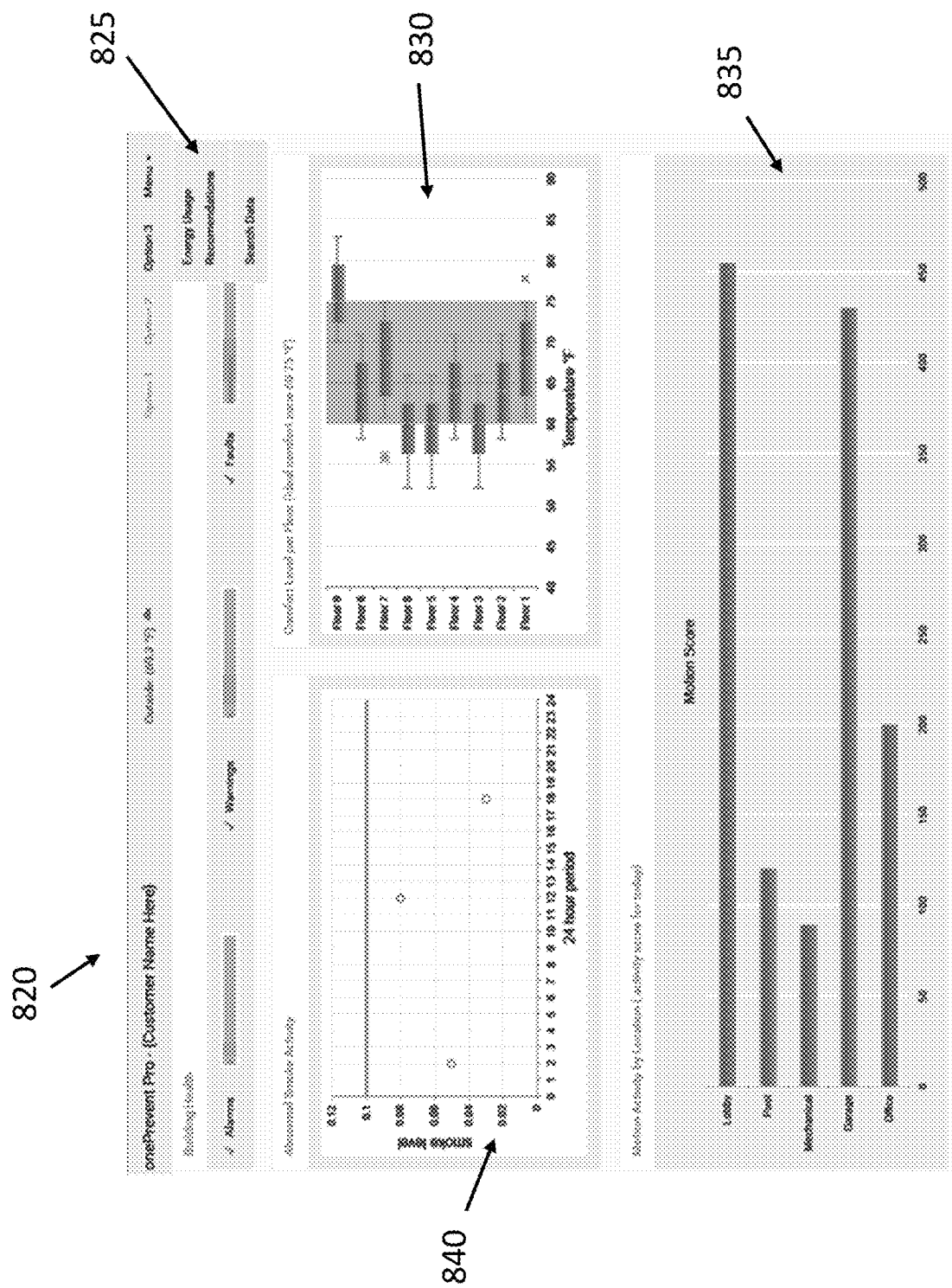

In FIG. 8B, a report 820 is shown, in accordance with some embodiments of the present disclosure. The report 820 is a variation of the report 800. For example, similar to the report 800, the report 820 includes various report sections. For example, the report 820 includes a first report section 825, a second report section 830, a third report section 835, and a fourth report section 840. The first report section 825 of the report 820 is similar to the first report section 805 of the report 800 in that both sections display the same (or similar) information, but in different formats.

Similarly, the second report section 830 of the report 820 is similar to the second report section 810 of the report 800, both of which show temperature measurements within the building 105 in different formats. The third report section 835 of the report 820 is similar to the third report section 815 of the report 800, both of which illustrate a motion score within various areas of the building 105 in different formats. The fourth report section 840 of the report 800 indicates abnormal smoke activity within various areas of the building 105 within a specific period of time. Thus, a reviewer of the reports of FIGS. 8A-8E may view same (or similar) information in varying formats, and may choose to arrange that information in varying ways.

Figure 8C:
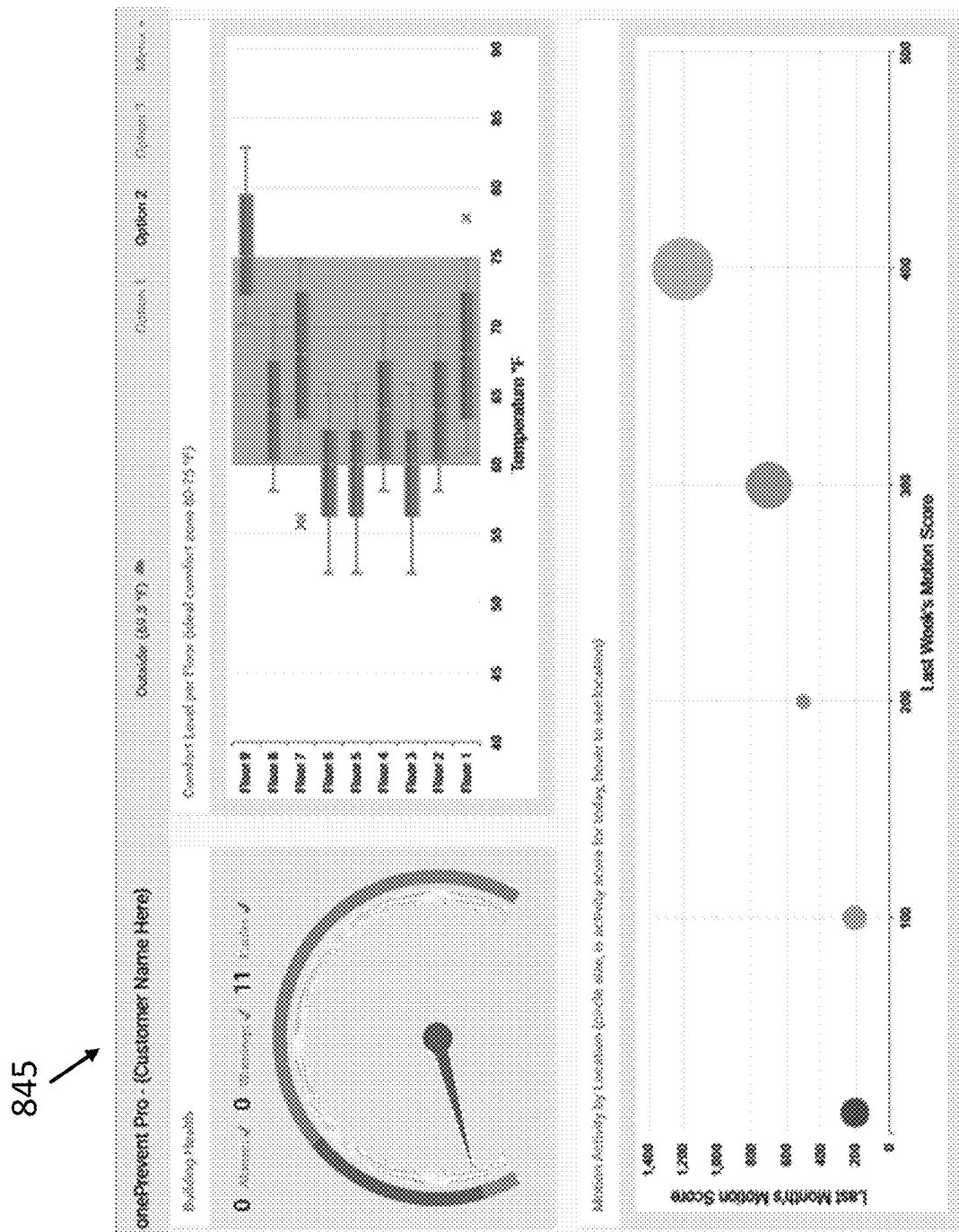
Figure 8D:
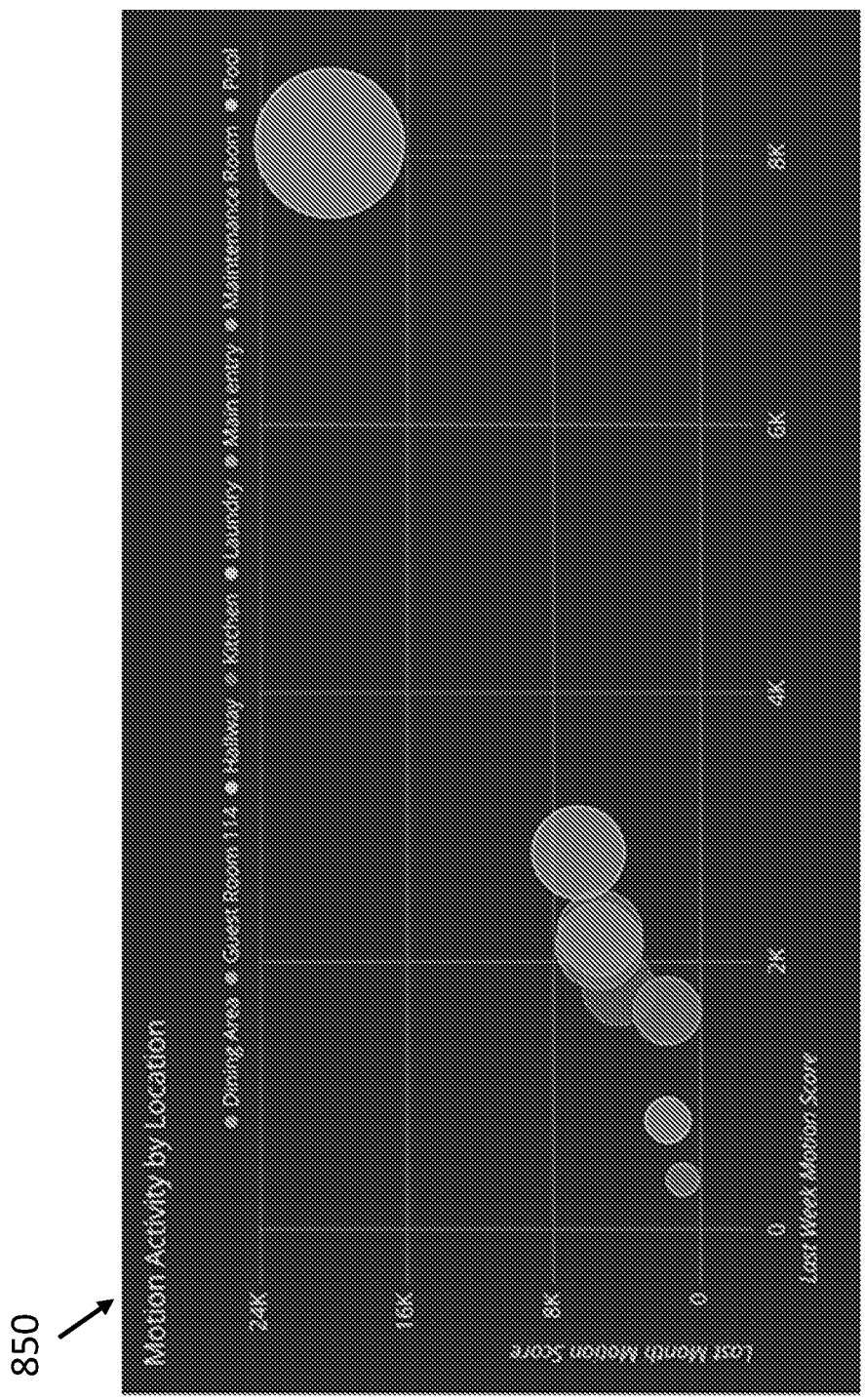
Figure 8E:
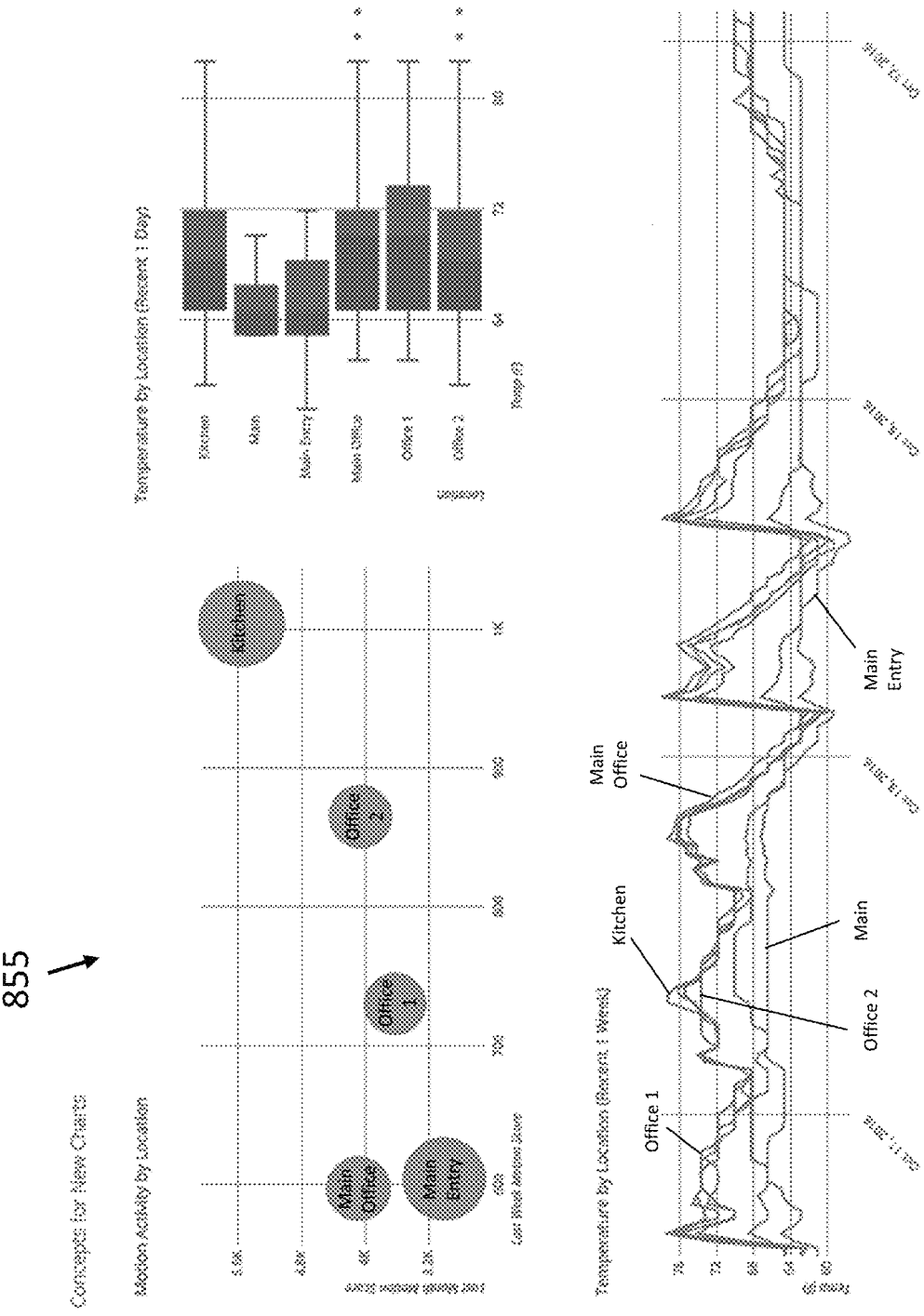
Figure 8E:
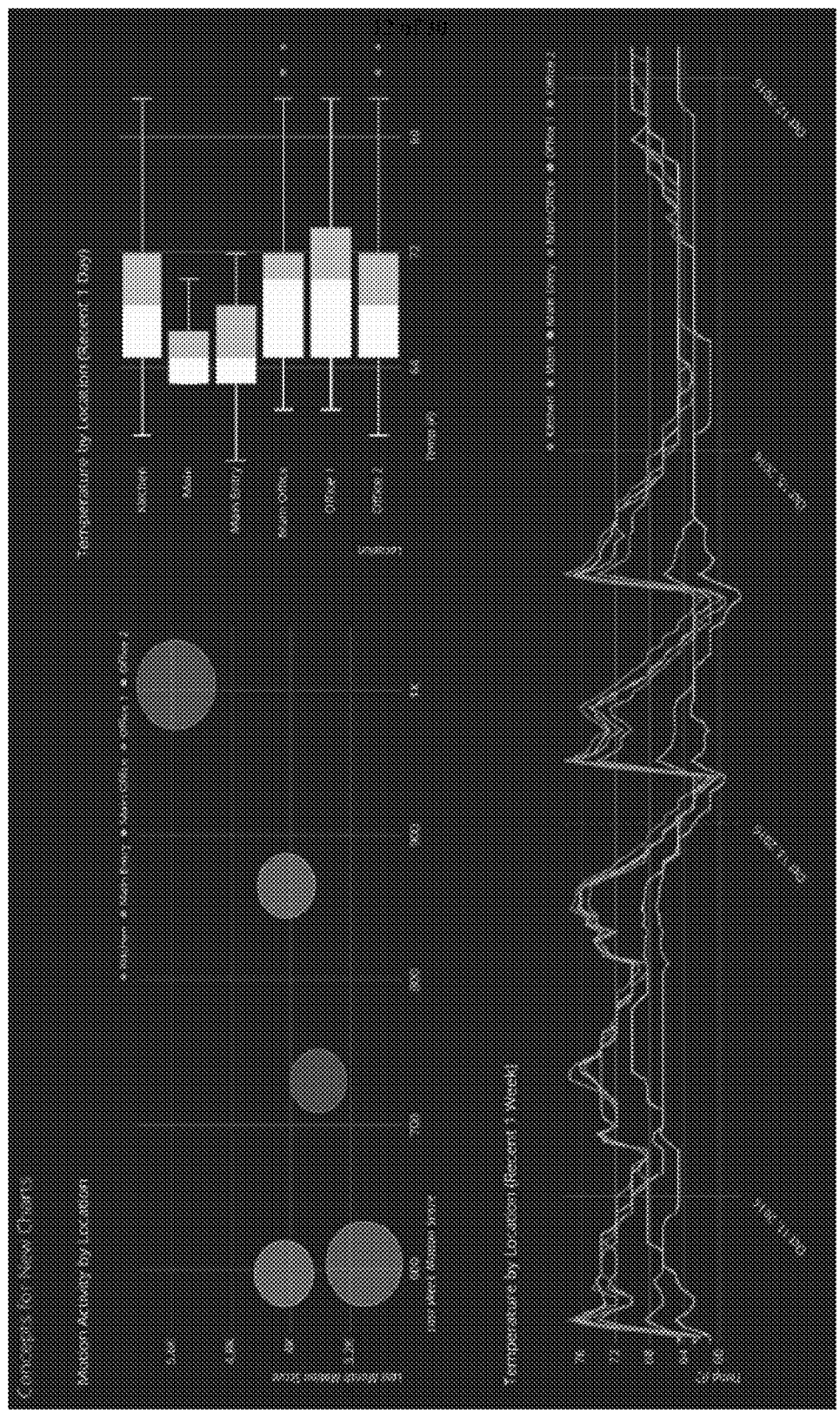

Reports 845, 850, and 855 of FIGS. 8C, 8D, and 8E, respectively, are similar to the reports 800 and 820 and have, thus, not been described again. In some embodiments, each of the reports 800, 820, 845, 850, and 855 may be accessed from a web interface or an online portal accessed using a computer, or using the customer mobile application. Thus, via the reports, the building monitoring system 100 provides for system administration and system health reporting functionalities for monitoring building comfort, building safety, building security, etc.

Figure 9:
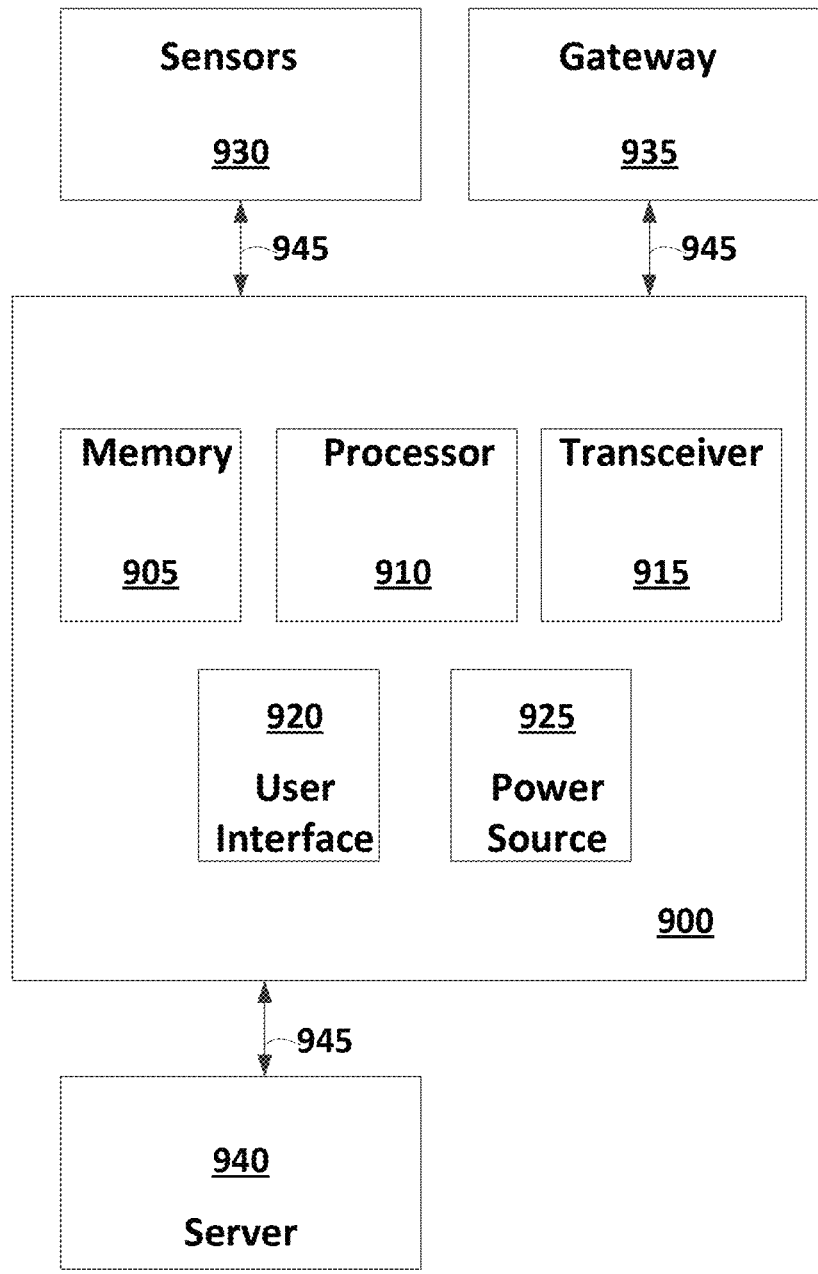
FIG. 9 is a block diagram of a monitoring computer used within the building monitoring system of FIG. 1, in accordance with some embodiments of the present disclosure.

A monitoring computer 900 is shown in FIG. 9, in accordance with some embodiments of the present disclosure. The monitoring computer 900 is similar to the monitoring computer 130 of FIG. 1. The monitoring computer 900 includes, in some embodiments, a memory 905, a processor 910, a transceiver 915, a user interface 920, and a power source 925. In alternative embodiments, additional, fewer, or different elements may be provided within the monitoring computer 900. The monitoring computer 900 may be a desktop computer, a laptop computer, a smartphone, another type of hand-held device, or a specialized computing device suitable for the functions described herein. The monitoring computer 900 may be used to implement one or more of the methods described herein.

In some embodiments, the memory 905 of the monitoring computer 900 is an electronic holding place or storage for information so that the information may be accessed by the processor 910. The memory 905 may include, but is not limited to, any type of random access memory (RAM), any type of read-only memory (ROM), dynamic random access memory (DRAM), programmable read only memory (PROM), erasable programmable read only memory (EPROM), electrically erasable programmable read only memory (EEPROM), any type of flash memory, such as magnetic storage devices (e.g., hard disk, floppy disk, magnetic strips, etc.), optical disks (e.g., compact disk (CD), digital versatile disk (DVD), etc.), smart cards, flash memory devices, etc. The monitoring computer 900 may also have one or more computer-readable media that use the same or different memory media technology. The monitoring computer 900 may have one or more drives that support the loading of a memory medium such as a CD, a DVD, a flash memory card, etc.

Furthermore, the memory may be in communication with the processor 910 that executes instructions. The instructions may be carried out by a special purpose computer, logic circuits, or hardware circuits. The processor 910 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processor 910 executes an instruction, meaning that it performs the operations called for by that instruction. The processor 910 operably couples with the user interface 920, the transceiver 915, the memory 905, etc. to receive, to send, and to process information and to control the operations of the monitoring computer 900. The processor 910 may retrieve a set of instructions from a permanent memory device such as a ROM device and copy the instructions in an executable form to a temporary memory device that is generally some form of RAM. The processor 910 may include multiple processors that use the same or a different processing technology. In an illustrative embodiment, the instructions may be stored in the memory 905.

With respect to the transceiver 915, the transceiver is configured to receive and/or transmit information to/from the monitoring computer 900. For example, the transceiver 915 may be configured to communicate with the server 120, the gateway 115, etc. In some embodiments, the transceiver 915 communicates information via a wired connection, such as an Ethernet connection, one or more twisted pair wires, coaxial cables, fiber optic cables, etc. In some embodiments, the transceiver 915 communicates information via a wireless connection using microwaves, infrared waves, radio waves, spread spectrum technologies, satellites, etc. The transceiver 915 may be configured to communicate with another device using cellular networks, local area networks, wide area networks, the Internet, etc. In some embodiments, one or more of the elements of the monitoring computer 900 communicate via wired or wireless communications. In some embodiments, the transceiver 915 provides an interface for presenting information from the monitoring computer 900 to external systems, users, or memory. For example, the transceiver 915 may include an interface to a display, a printer, a speaker, etc. In some embodiments, the transceiver 915 may also include alarm/indicator lights, a network interface, a disk drive, a computer memory device, etc. In other embodiments, the transceiver 915 may receive information from external systems, users, memory, etc.

The user interface 920, in some embodiments, is configured to receive and/or provide information from/to a user. The user(s) may be emergency response crew. The user interface 920 may be any suitable user interface. The user interface 920 may be an interface for receiving user input and/or machine instructions for entry into the monitoring computer 900. The user interface 920 may use various input technologies including, but not limited to, a keyboard, a stylus and/or touch screen, a mouse, a track ball, a keypad, a microphone, voice recognition, motion recognition, disk drives, remote controllers, input ports, one or more buttons, dials, joysticks, etc. to allow an external source, such as a user, to enter information into the monitoring computer 900. The user interface 920 may be used to navigate menus, adjust options, adjust settings, adjust display, etc.

The user interface 920 may also be configured to provide an interface for presenting information from the monitoring computer 900 to external systems, users, memory, etc. For example, the user interface 920 may include an interface for a display, a printer, a speaker, alarm/indicator lights, a network interface, a disk drive, a computer memory device, etc. The user interface 920 may include a color display, a cathode-ray tube (CRT), a liquid crystal display (LCD), a plasma display, an organic light-emitting diode (OLED) display, etc.

Furthermore, in some embodiments, the power source 925 is configured to provide electrical power to one or more elements of the monitoring computer 900. In some embodiments, the power source 925 includes an alternating power source, such as available line voltage (e.g., 120 Volts alternating current at 60 Hertz in the United States). The power source 925 may include one or more transformers, rectifiers, etc. to convert electrical power into power useable by the one or more elements of the monitoring computer 900, such as 1.5 Volts, 8 Volts, 12 Volts, 24 Volts, etc. The power source 925 may include one or more batteries.

In some embodiments, any of the operations described herein may be implemented at least in part as computer-readable instructions stored on a computer-readable memory. Upon execution of the computer-readable instructions by a processor, the computer-readable instructions can cause a node to perform the operations.

Furthermore, the monitoring computer 900 is configured to communicate with sensors 930, gateway 935, and server 940. The sensors 930 are equivalent to the sensors 110 and specifically to the sensors 140, 145, 150, 155, 160, and 165. Likewise, the gateway 935 is similar to the gateway 115, and the server 940 is similar to the server 120. The monitoring computer 900 is configured to receive sensor data from the sensors 930, the gateway 935, and the server 940 via communication links 945. The communication links 945 are similar to the communication links 185 and 195 of FIG. 1.

By virtue of communicating with the sensors 930, the gateway 935, and the server 940, the monitoring computer 900 (e.g., the processor 910 of the device) may receive information specific to the building 105, such as, the height and footprint of the building, floor-plan of the building, age of the building, any hazardous material in the building, any specific material used in the construction of the building, any safety features employed within the building, and any other feature that may aid the emergency response crew in devising an action plan. The monitoring computer 900 may also receive/view the reports (e.g., the protection overview report 700, the comfort overview report 705, the activity overview report 710, the building safety report 715) generated by the server 940. In some embodiments, such as when the sensor data is only periodically updated and transmitted to the monitoring computer 900, the monitoring computer may be configured to receive sensor data on-demand directly from the sensors 930. Thus, in those embodiments, the monitoring computer 900 may be configured to receive sensor data both automatically and on demand. In some embodiments, the emergency response crew may be able to simply connect to the server 940 (and/or to the gateway 935 and the sensors 930 if the gateway and sensors are within a connection range) to download the information.

Thus, the monitoring computer 900 may be used by an emergency response crew to receive, view, and monitor information about various conditions related to the building 105. The monitoring computer 900 may also be used for devising an emergency response plan based on the information in real-time (or substantially real-time), thereby achieving a faster and more effective rescue response.

Example interfaces of an installer mobile application are shown in FIGS. 10A-10E, in accordance with some embodiments of the present disclosure. The installer mobile application may be used by trained installation personnel, such as trained fire and security dealers, installers, trained electricians, trained plumbers, trained restoration professionals, and other trained personnel (referred collectively to "installer" herein) who may be qualified to install and manage the building monitoring system 100 within the building 105.

The installer mobile application may be installed on a user device (e.g., the first mobile device 190B). The installer mobile application may facilitate easy access to the various components (e.g., the sensors 110 and the gateway 115) of the building monitoring system 100 after installation. The installer mobile application may also be used to facilitate installation of the building monitoring system 100, as discussed in greater detail below. To install and/or manage the building monitoring system 100 via the installer mobile application, an installer may first download and install the installer mobile application on the installer's mobile device (e.g., the first mobile device 190B). The installer may be able to download the installer mobile application, for example, via a developer's website, digital marketplace, app store, text or e-mail message, or any other mechanism that the building monitoring system 100 may use to make the installer mobile application available to the installer for download and installation.

Furthermore, in some embodiments and as discussed above, the installer mobile application may be a stand-alone application provided by the building monitoring system 100. In other embodiments, the installer mobile application may be part of a larger building monitoring system application or portal provided by the building monitoring system 100. In yet other embodiments, the installer mobile application may be a web-based application that is maintained remotely by the building monitoring system 100 and that the installer may access via a web browser on the installer's mobile device (e.g., the first mobile device 190B). By virtue of using the installer mobile application, the installer may securely install and/or manage various features of the building monitoring system 100.

In some embodiments, the installer mobile application may be factory configured and provided to the installer by the manufacturer/provider of the building monitoring system 100. In other embodiments, the installer mobile application may be field configured (e.g., configured by the installer). Furthermore, in some embodiments, the installer's mobile device (e.g., the first mobile device 190B) may be provided by the manufacturer/provider of the building monitoring system 100, while in other embodiments, the installer's mobile device may be the installer's personal mobile device.

It is to be understood that only those features of the installer mobile application are shown and described herein that are necessary for a proper understanding of the present disclosure. Nevertheless, several other or different features, including aesthetic and functional features that may be needed or considered desirable to perform the operations described herein may be included in the installer mobile application. Furthermore, the arrangement, shape, size, and configuration of the various features of the installer mobile application may vary from one embodiment to another.

Figures 10A, 10B:
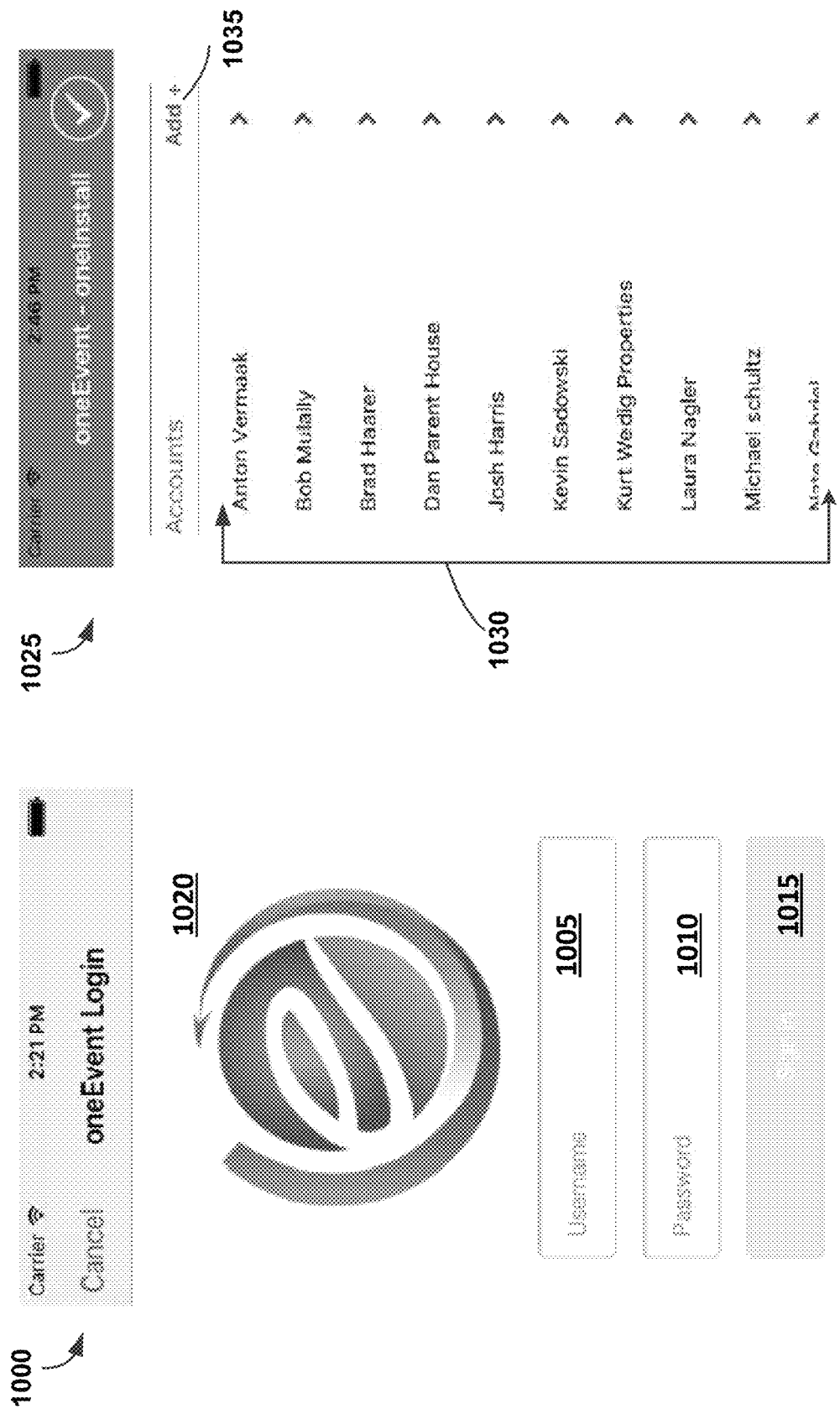

In FIG. 10A, interface 1000 presents a secure login view of the installer mobile application to the installer. Each installer of the installer mobile application may be assigned a unique username to securely access and setup various features related to installing and managing the building monitoring system 100. In other embodiments, instead of assigning a username/password to the installer, the installer may be directed to create an installer account upon accessing the installer mobile application for the first time. In those embodiments, the installer may pick a username, password, and provide additional personal details to create the installer account.

After being assigned a username/password, or after creating an installer account, the installer may log into the installer mobile application using the interface 1000. For example, the installer may enter the username in field 1005, password in field 1010, and actuate a sign-in button 1015 to log into the installer mobile application. In other embodiments, other or additional methods of authenticating the user may be used. For example, in some embodiments, access codes, identification pins, biometrics, such as fingerprint readers and eye scanners, pattern recognition, etc. may be used to authenticate the user. Additionally, although not shown, in some embodiments, the interface 1000 may include features such as a forget password link, create account link, change password link, captcha or other challenge-response tests, quick response codes, etc. Furthermore, in some embodiments, the interface 1000 may be personalized or customized to reflect the installer's information. For example, in some embodiments, area 1020 of the interface 1000 may include a logo or other indicia of the installer's business, in addition to or instead of the information related to the building monitoring system 100.

Additionally, in some embodiments, the "installer" may be a company or dealer that offers the building monitoring system 100 to consumers. In other embodiments, the "installer" may be a person (e.g., a manager of a company) who manages one or more particular subordinate installers to facilitate installation and management of the building monitoring system 100.

Upon logging into the installer mobile application, the installer is able to access interface 1025 of FIG. 10B. The interface 1025 lists all active accounts 1030 of the installer. Each active account in the list of active accounts 1030 corresponds to one or more specific building monitoring systems (e.g., the building monitoring system 100). For example, a company or manager installer may be responsible for managing one or more particular installers. The company or manager installer may create an account for each particular installer who is responsible for installing and/or managing a building monitoring system (e.g., the building monitoring system 100). By virtue of creating an account for each particular installer, the company or manager installer may keep track of the building monitoring system 100 that have been installed, and quickly determine which person is responsible for managing those building monitoring systems.

In some embodiments, each account within the list of active accounts 1030 may be an interactable link that the company or manager installer may interact with (e.g., click, highlight, hover on, etc.) to access and view additional information related to each account, as well as edit various details (e.g., contact information, demographic information, etc.) related to that account. The company or manager installer may also add new accounts using add button 1035 on the interface 1025.

The interface 1025 may include additional buttons not shown, such as a delete button to delete an account, an edit button to edit account details without having to go within a specific account, a search box to search for an account, etc. Other features that may be needed or considered desirable to have may be included within the interface 1025. In some embodiments, the interface 1025 may also provide the ability to view a listing of inactive accounts that correspond to building monitoring systems (e.g., the building monitoring system 100) that are no longer actively monitoring the building(s) (e.g., the building 105) in which they are installed.

By interacting with a particular account, the company or manager installer is able to access interface 1040. Within the interface 1040, all existing sites 1045 that are connected to the accessed account are listed. Each site may be composed of one or more buildings (e.g., the building 105) or an area or areas of the building where an instance of the building monitoring system 100 is installed. Thus, the number of buildings within a single site may vary. Also, in some embodiments, an account may be connected to a single site, while in other embodiments, an account may include multiple sites, with each site having one or more buildings.

For example, an account for a single family homeowner is likely to include a single site—the homeowner's single family residence where the building monitoring system 100 is installed. In contrast, an account for a university may include multiple sites, with each site corresponding to one or more specific buildings within the university. In some embodiments, it may be desirable to divide a single large building into multiple sites. For example, if a building includes a series of interconnected areas or phases, each area or phase may be installed with its own instance of the building monitoring system 100. In those cases, each area or phase of the single large building may be considered a separate site. Likewise, in some embodiments, a plurality of smaller buildings may be combined together into a single site. Thus, the configuration of a "site" may vary from one embodiment to another. Generally speaking, each site corresponds to an installed instance of one building monitoring system (e.g., the building monitoring system 100).

Within the interface 1040, each of the existing sites 1045 may be provided as an interactable link that the installer (whether company or manager installer, or a particular installer) may interact with to view or edit information related to that site. The interface 1040 may also provide an add button 1050 to add additional sites to the account. In some embodiments, the installer may also use the add button 1050 to edit various features of a particular one of the sites in the list of the existing sites 1045. For example, the installer may add or delete buildings from a given site, may add or delete floors and specific rooms from a given building in a site, add or edit sensors and gateways from various locations of a building in a site, etc.

In addition, the interface 1040 may include a tab 1055 that the installer may use to navigate through the account. For example, the installer may be able to go back to the interface 1025 using an account feature 1060, return to the interface 1040 from other interfaces using a site feature 1065, conduct a health check of each site using a health check feature 1070, and view/modify settings related to a particular account or a particular site within that account using a settings feature 1075. Additional or different features may be provided within the tab 1055. Further, in some embodiments, the shape, size, and arrangement of the tab 1055 may vary. In some embodiments, the add button 1050 may be provided within the tab 1055. Likewise, in some embodiments, one or more of account feature 1060, the site feature 1065, the health check feature 1070, and the settings feature 1075 may be provided outside of the tab 1055. Moreover, although not shown in the interface 1025, an instance of the tab 1055 (with modification to include appropriate features for that interface) may be included in the interface 1025.

Furthermore, the interface 1040 may include additional features, not shown in FIG. 10C. For example, in some embodiments, the interface 1040 may allow the user to add notes for each site (e.g., peculiarities in a building of a given site, etc.), attach and associate pictures and videos with a site, provide options to share information with others (e.g., with emergency response crew), etc.

In FIG. 10D, an interface 1080 is shown, in accordance with some embodiments of the present disclosure. The interface 1080 may be accessed by interacting with one of the existing sites 1045 of the interface 1040. Within the interface 1080, the installer may be able to access a list 1085 of sensors (e.g., the sensors 110) and gateways (e.g., the gateway 115) installed as part of the building monitoring system 100 of that site. Within the list 1085, each component may be identified as the type of component (e.g., whether a sensor or a gateway, and which type of sensor), the identification code of that component, as well as the status of that component (e.g., whether a particular sensor is sensing and reporting data to the gateway or not, whether the gateway is connected to the sensors or not, etc.). The list 1085 may also provide information as to which sensors (e.g., the sensors 110) are controlled by which gateway(s) (e.g., the gateway 115). This information may be particularly useful when the building monitoring system 100 includes multiple gateways.

As will be described below, the installer may also use the interface 1080 (and/or the interface 1040) to facilitate installation of the building monitoring system 100. For example, the installer may add and associate sensors and gateway(s) to the interface 1080 for each given site. In some embodiments, the interface 1080 (and/or the interface 1040) may include a code reader (e.g., a quick response code reader) that the installer may use to add and associate additional sensors and gateway(s) with a given site. In other embodiments, the installer may use a camera of the mobile device (e.g., the first mobile device 195B) to scan quick response codes from sensors and the gateway(s) and add the scanned sensors and gateway(s) to a given site.

The interface 1080 may also provide information related to signal strength of connection between various components. Any additional information that may be deemed useful or desirable to know about the components in the list 1085 may be included within the interface 1080. In some embodiments, each component in the list 1085 may be interactable, such that the installer may interact with that component to view additional details pertaining to that component. For example, for each sensor (e.g., the sensors 110) within the list 1085, the installer may view when the sensor last collected data, sent data to the gateway (e.g., the gateway 115), if the sensors experienced any disruption in communicating with the gateway (e.g., the gateway 115), etc. By virtue of being able to view the status of various components (e.g., the sensors 110 and the gateway 115) of the building monitoring system 100 within the interface 1080, the installer may quickly gauge the health of the building monitoring system, and whether any component of the building monitoring system needs attention. The installer may also be able to determine any specific problems in any of the components by connecting to the server 120.

Similar to the interface 1040, the interface 1080 may include the tab 1055 with the account feature 1060, the site feature 1065, the health check feature 1070, and the settings feature 1075 to navigate through the installer mobile application. Additional features that may be deemed useful to include in the interface 1080 may be provided in other embodiments.

Figure 10E:
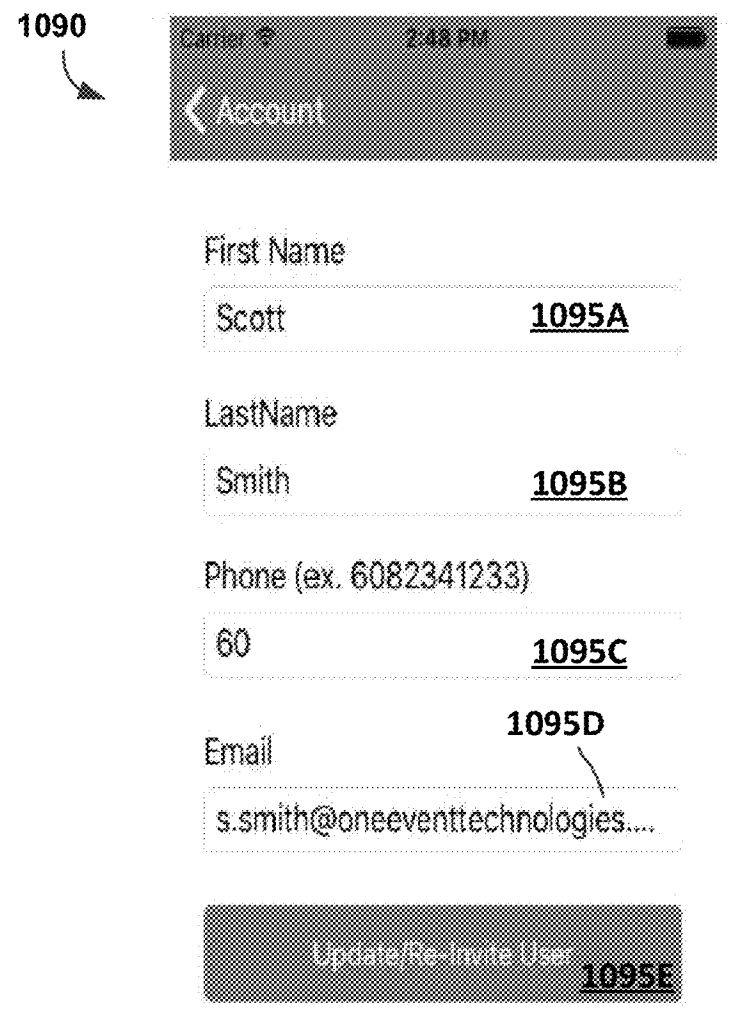

An interface 1090 is shown in FIG. 10E, in accordance with some embodiments of the present disclosure. The interface 1090 may be accessed by interacting with the settings feature 1075 on the tab 1055 or by interacting with the add button 1035 on the interface 1025. The interface 1090 provides the ability to manage a given account (e.g., the list of active accounts 1030), add a new account (e.g., add a new installer), and/or add/edit a customer's information related to an account. By using the interface 1090, the installer may view, add, delete, or modify account information using the installer's mobile device (e.g., the first mobile device 190B).

In some embodiments, the interface 1090 may include various fields, such as a first name field 1095A, a last name field 1095B, a phone field 1095C, and an email field 1095D. Using those fields, the installer may manage the information related to an account. By interacting with button 1095E, the installer may save the information entered into the first name field 1095A, the last name field 1095B, the phone field 1095C, and the email field 1095D. In other embodiments, the interface 1090 may include other or additional fields, such as a cancel field to cancel any changes to the account before saving, a middle name field to add a middle name of an installer/customer, multiple instances of the phone field 1095C to add personal, work, and/or cellular phone numbers, an address field to add an address of the installer/customer, a notes field to add any notes or specific directives of the installer/customer, etc.

Thus, by using the installer mobile application, an installer of the building monitoring system 100 may conveniently and quickly install an instance of the building monitoring system 100 in a building (e.g., the building 105), manage the various components (e.g., the sensors 110 and the gateway 115) of the building monitoring system, monitor the health of those components, and otherwise manage a plurality of accounts with ease.

Example interfaces of a customer mobile application are shown in FIGS. 11A-11E, in accordance with some embodiments of the present disclosure. The customer mobile application may be used by a customer to get a secure view of all metrics, alerts, alarms, health messages, reports, and other information generated by the server 120. The customer mobile application provides the ability to share the metrics, alerts, alarms, health messages, reports, and other information with other users, as well as generate and send notifications (e.g., emails, text messages phone calls, etc.) to other users. In some embodiments, the customer mobile application may also be configured to automatically and/or on-demand connect to an emergency response center when a threat is detected by the server 120. In some embodiments, the customer mobile application may also provide the ability to store the information received from the server 120 for use offline, print that information, or otherwise manage that information in varying ways. Other features of the customer mobile application that may be considered useful or desirable may be included in the customer mobile application.

The customer mobile application is configured to be used by a customer of the building monitoring system 100, such as a homeowner, business owner, property manager, and other people who may have one or more instances of the building monitoring system installed on their property or properties they manage. The customer mobile application may be configured in a variety of ways depending upon the needs of the customers using the customer mobile application. For example, in some embodiments, the customer mobile application may be configured to be shared by multiple customers. In those cases, an account may be created within the customer mobile application, and the account may be configured for access by multiple customers. In other embodiments, each account may be configured to be used by one customer only. Thus, the customer mobile application may be scaled depending upon the needs of the customer(s) using the customer mobile application. The customer mobile application may also be configured to include information pertaining to one, some, or all of the sites, buildings, floors, rooms on a floor, areas, locations, etc. Thus, the customer mobile application provides a convenient and easy to use virtual security panel for monitoring a variety of undesirable conditions and threats within the building 105.

Figure 11A:

An interface 1100 is shown in FIG. 11A, in accordance with some embodiments of the present disclosure. The interface 1100 may be accessed by installing the customer mobile application on a mobile device (e.g., the second mobile device 190C) of a customer (e.g., homeowner, property manager, etc.), and, in some embodiments, by logging into a customer account. To log into the customer account, the customer may be required to create the customer account the first time the customer accesses the customer mobile application after installation. In other embodiments, the customer account may be created by the manufacturer or installer of the building monitoring system 100, and the attributes (e.g., username, password) of the customer account may be provided to the customer by the manufacturer or installer.

In yet other embodiments, the customer mobile application may be configured to be accessed without a customer account. In such embodiments, the building monitoring system 100 may use another mechanism of authenticating the customer and for associating the customer to a specific building monitoring system. Furthermore, in some embodiments, the mobile device (e.g., the second mobile device 190C) may be either the customer's personal mobile device, or in some embodiments, it may be provided by the manufacturer or installer. It is also to be understood that in some cases, the manufacturer and the installer may be the same entity.

Upon logging in, the interface 1100 is configured to display a site view of the building monitoring system 100. For example, in some embodiments, the interface 1100 includes a list 1105 of all sites and all buildings within that site that are managed by the customer. Again, each site may include one or multiple buildings that are monitored by one or more instances of the building monitoring system 100. In some embodiments, the number of buildings that may be allowed within one site may be restricted (e.g., up to 10). Likewise, in some embodiments, the number of sites that may be linked to an account may be restricted (e.g., up to 7). In other embodiments, such restrictions (whether of the number of sites or number of buildings within a site) may not be imposed.

In some embodiments, the interface 1100 may also be configured to display site wide system health in a single view, and site wide alerts and alarms in a single view. For example, for each site and for each building within that site listed within the list 1105, the interface 1100 may display whether a fault has been detected in any sensors and, if any alerts or alarms were generated within a given period. Thus, site 1110 in the list 1105 shows that at least one sensor in that site is faulted, while site 1115 shows that all of the sensors within that site are functioning as intended.

Figure 11B:
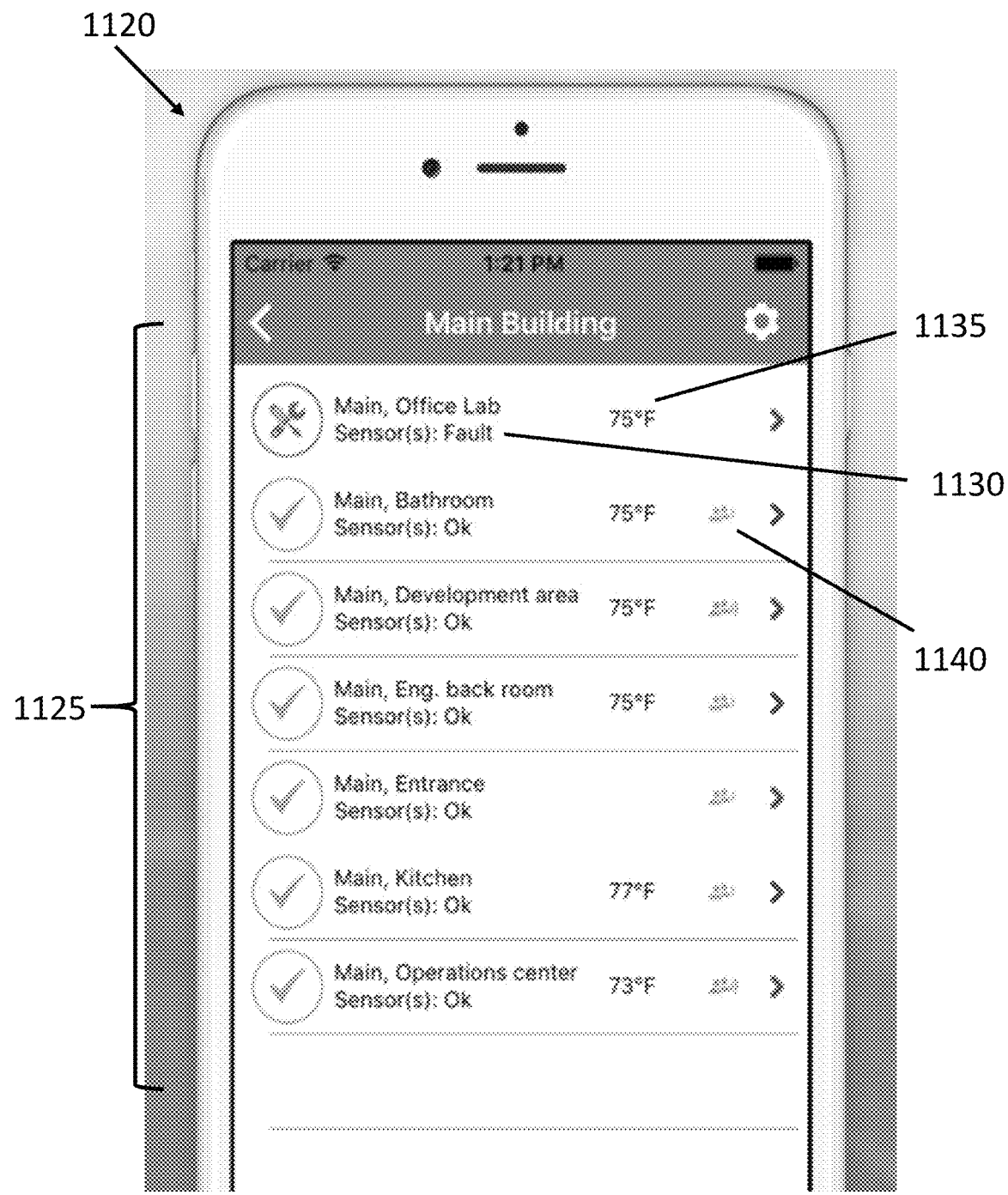

By interacting (e.g., by clicking, highlighting, hovering over, etc.) with the site 1110, for example, the customer may determine exactly which one of the sensors within the site is faulted using interface 1120 of FIG. 11B. In some embodiments, where the site includes a single building, the interface 1100 may or may not be provided. The single building may be listed in the list 1105 when the interface 1100 is provided, or in some embodiments, the customer may be taken directly to the interface 1120 when the site includes a single building. The interface 1120 is configured to reveal additional information (e.g., status information) about a site (e.g., the site 1110). For example, by interacting with the site 1110 on the interface 1100, the customer may access the interface 1120 to see the status of the site 1110. The interface 1120 provides a list 1125 indicating various areas of the site that are monitored using the building monitoring system 100.

For example, a building in the site 1110 may include one or more floors, and each floor may include one or more rooms. Thus, the list 1125 may be configured to display information by floors or by rooms of a building. In some embodiments, the customer may be able to switch between a floor level view and a room level view. By virtue of switching between floor and room level views, the customer may be able to exactly determine where a faulted one of the sensors 110 is located. For example, as shown, the interface 1120 shows a room level view and a quick glance of the interface 1120 reveals to the customer that the sensor in main office lab 1130 is faulted (e.g., by virtue of the icon next to the main office lab being grey, and not a green check mark; or by virtue of sorting the list 1125 such that the faulted sensors are listed first). Additionally, although not shown, the interface 1120 may also display, in some embodiments, any alarms or alerts generated from an area (e.g., each floor or each room on a floor).

In addition to determining the status of sensors, the interface 1120 may provide additional information for each area (e.g., each floor or each room on a floor) listed within the list 1125. For example, for each area listed within the list 1125, the interface 1120 may display an average room temperature 1135 within that area, as well as an occupancy level 1140. The occupancy level 1140 may be shown for each area (e.g., each floor or each room on a floor) where a motion sensor is installed, such that a quick glance of the occupancy level 1140 may reveal to the customer whether motion has been detected within that area in a given period. In some embodiments, the occupancy level 1140 may be color coded, such that a green occupancy level indicates motion within the last five minutes, an orange occupancy level indicates motion within the last thirty minutes, and a black occupancy level indicates no motion within the last thirty one minutes or more. In other embodiments, other colors, or other indications may be used for the occupancy level 1140.

Furthermore, in some embodiments, the interface 1120 may be configurable such that in addition to switching between a floor level view and a room level view, the customer may also choose between various indicators (e.g., the average room temperature 1135, occupancy level 1140) that the customer desires to display on the interface 1120. Additionally, although only two of the indicators (e.g., the average room temperature 1135, occupancy level 1140) in addition to the status of the sensors 110 are displayed for each area within the interface 1120, in other embodiments, the number of indicators may vary to be fewer than or greater than two.

Thus, the interface 1120 displays floor wide or room wide system health status (e.g., status of the sensors 110), alarms, and alerts, in a single view, as well as various indicators (e.g., the average room temperature 1135, occupancy level 1140) that may be important to the customer.

Figure 11E:
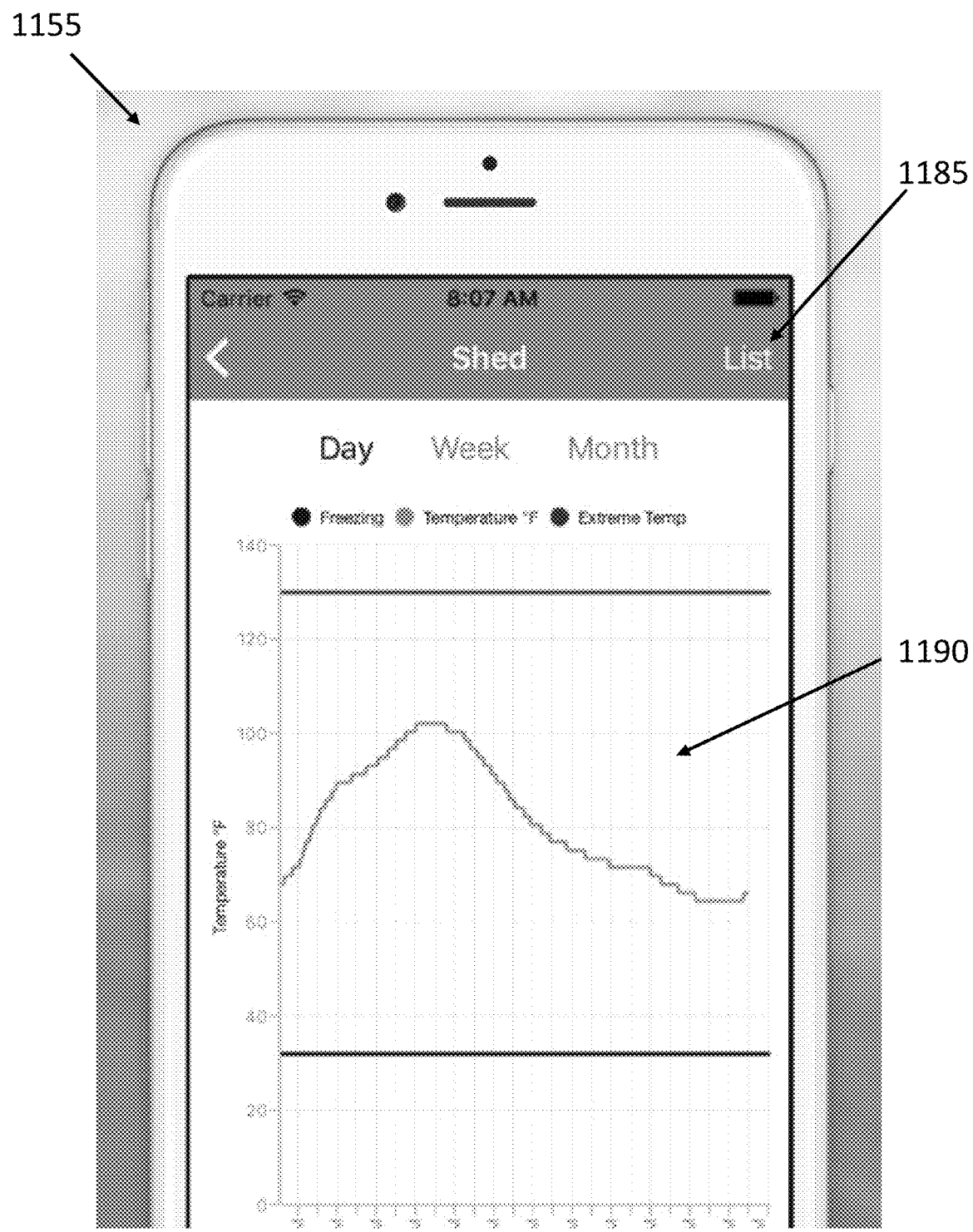

FIGS. 11C-11E display interfaces 1145, 1150, and 1155 that may be used to view additional information related to a building. For example, the interface 1145 of FIG. 11C includes a list 1160 of past and current alerts and alarms within a specified period of time. In some embodiments, the list 1160 may list all events (e.g., alerts and alarms) within a specified period of time (e.g., weekly, monthly, or within the last three months) in chronological order occurring with a building (e.g., a building of the site 1110). Furthermore, in some embodiments, each event may include a time stamp and a date stamp. The customer may view additional information about any of the event within the list 1160 by further interacting (e.g., clicking on, highlighting, hovering over, etc.) with that event. In some embodiments, each event in the list 1160 may be prefixed by an icon that may reveal in a quick glance to the customer whether that event is an alert or an alarm. In some embodiments, an alert may be further classified as a fault or a warning, with each being represented by a different type of icon.

For example, in some embodiments, icon 1165 may be used to identify an event as fault. A fault may indicate a problem with an installed one of the sensors 110 or the gateway 115. Icon 1170 may be used to identify an event as a warning. A warning may indicate significant deviations from normal operating conditions (e.g., temperature, humidity, etc.) within an area (e.g., a floor or room on a floor). For example, an abnormally high temperature within an area may generate a warning. In some embodiments, a warning may be preceded by an alarm. Icon 1175 may be used to identify an alarm. For example, the server 120 may first generate a warning (represented by the icon 1170) when temperature within an area of the building 105 is abnormally high, and then an alarm (represented by the icon 1175) when the server determines that the temperature is increasing at a rate indicative of a fire. Thus, by a quick glance of the icons 1165, 1170, and 1175, the customer may determine what types of events have occurred within the building 105.

It is to be understood that the icons 1165, 1170, and 1175 that are used to identify faults, warnings, and alarms, respectively, may vary in other embodiments. In other embodiments, other indicia to identify faults, warnings, and alarms may be used. Furthermore, the information that is displayed within each event may vary from one embodiment to another. In some embodiments, the specific period of time (e.g., weekly, monthly, within the last three months) within which the events are listed within the list 1160 may be configurable such that the specific period of time may be changed or customized. Thus, various variations of the interface 1145 are contemplated.

For each fault, warning, or alarm, the customer may view additional information about that fault, warning, or alarm by interacting with a particular event. For example, by interacting with event 1180 on the interface 1145, the customer may be directed to the interface 1150 of FIG. 11D. The interface 1150 is a detailed screen that displays a message description of the type of event (e.g., fault, warning, alarm), and provides the ability for a customer to include comments about that event. In some embodiments, the interface 1150 may also include a frequently-asked-questions or help feature to provide additional information on the event (e.g., what conditions lead to generation of that event, etc.), and an emergency contact information to allow the customer to contact an emergency response center (e.g., dial 911) from within the interface 1150.

In some embodiments, the interface 1150 may be easily and quickly accessed by the customer using the customer's mobile device (e.g., the second mobile device 190C). For example, the server 120 may issue a text on the customer's mobile device (e.g., the second mobile device 190C) when the alarm related to the event 1180 is generated. Within the text, the server 120 may include a link to the interface 1150. Thus, by interacting with the link (e.g., clicking on the link), the customer may be directly taken to the interface 1150 (assuming the customer mobile application is installed on the customer's mobile device).

The interface 1150 provides the necessary information to enable the customer to take further action (e.g., dial 911). The interface 1150 may also list, in some embodiments, the priority (e.g., high, medium, low) of the event 1180, the location of the event, and any other or different information that may be considered useful to provide to the customer. Thus, the interface 1150 provides a detailed view of any faults, warnings, or alerts that are issued by the server 120.

FIG. 11E shows the interface 1155 that provides a visual view of the various metrics (e.g., temperature, smoke, carbon monoxide, motion, etc.). In some embodiments, and as shown, the interface 1155 provides a graphical representation of the metrics within a specific period of time (e.g., past twenty four hours, one week, one month, etc.). In other embodiments, other methods of visually representing the data may be used. Furthermore, the metrics that are displayed within the interface 1155 may be chosen from a list 1185. The list 1185 may provide, in some embodiments, a chronological listing of all measurements from which the customer may choose. In some embodiments, the interface 1155, or at least a portion 1190 of the interface in which the metrics are displayed may be configured for zooming in and zooming out (e.g., using pinch zoom gestures, etc.) to obtain a closer view of the metrics.

Furthermore, in some embodiments, the metrics that are displayed within the interface 1155 correspond to the reports that the server 120 generates. In some embodiments, the server 120 may periodically update the reports that the customer may view on the interface 1155. In other embodiments, the interface 1155 may include an update feature that the customer may interact with to download the latest versions of the reports.

Thus, the interfaces 1100, 1120, 1145, 1150, and 1155 of the customer mobile application may be used by the customer to view, monitor, and take action related to various events that may occur within the building 105. It is to be understood that the configuration of each of the interfaces 1100, 1120, 1145, 1150, and 1155 may vary from one embodiment to another. For example, the arrangement, shape, size, color, and other attributes of the various features within each of the interfaces 1100, 1120, 1145, 1150, and 1155 may vary from one embodiment to another. In some embodiments, certain features may be configurable that the customer may customize. Additionally, the interfaces 1100, 1120, 1145, 1150, and 1155 may be used to display fewer, additional or different information from what has been discussed above, if such information is needed or considered desirable for the customer to have.

Figure 12:
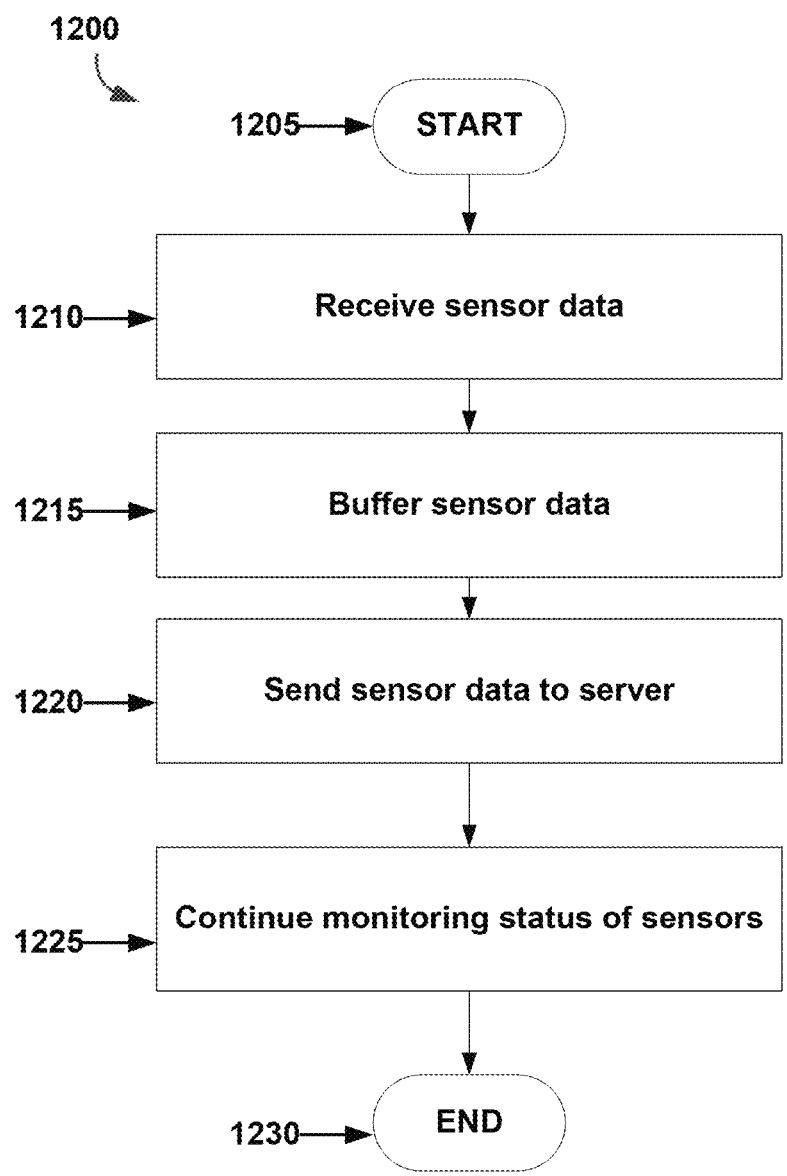
FIG. 12 is an example flowchart outlining operations performed by the gateway of the building monitoring system of FIG. 1 in monitoring the building, in accordance with some embodiments of the present disclosure.

A flowchart outlining a process 1200 performed by the gateway 115 in communicating sensor data from the sensors 110 to the server 120 is shown in FIG. 12, in accordance with some embodiments of the present disclosure. The process 1200 starts at operation 1205. After installing the building monitoring system 100 within the building 105, during normal operation of the sensors 110 and the gateway 115, the gateway receives sensor data from the sensors at operation 1210. As mentioned above, the gateway 115 may receive the sensor data from the sensors 110 periodically, continuously as the sensor sense conditions, or on demand by the gateway. Furthermore, the sensor data from the sensors 110 is sent to the gateway 115 via the communication link 170.

Upon receiving the sensor data from the sensors 110, the gateway 115 buffers the sensor data at operation 1215. In some embodiments, the gateway 115 may buffer the sensor data for a specific period of time, for example, until the gateway successfully transmits that sensor data to the server 120 via the communication link 175 at operation 1220. In other embodiments, the gateway 115 may buffer the sensor data for a given period of time (e.g., forty eight hours) even though the sensor data may have been successfully transmitted to the server 120. In yet other embodiments, the gateway 115 may be configured such that the sensor data is buffered only when the gateway is unable to establish a successful connection to the server 120 or unable to transmit the sensor data to the gateway after establishing a successful connection to the server. Thus, the buffering of the sensor data from the sensors 110 within the gateway 115 may vary from one embodiment to another.

Furthermore, the mechanism of buffering the sensor data within the gateway 115 may vary from one embodiment to another. For example, in some embodiments, the gateway 115 may be configured with a built-in buffering mechanism that the gateway may use to buffer the sensor data. In other embodiments, the gateway 115 may be configured to operate in combination or conjunction with an external buffering mechanism that the gateway may use to buffer the sensor data. In yet other embodiments, the gateway 115 may use a combination of built-in and external buffering mechanisms to buffer the sensor data.

At the operation 1220, the gateway 115 transmits the sensor data to the server 120. To transmit the sensor data to the server 120, in some embodiments, the gateway may first establish a communication link with the server. In other embodiments, the gateway 115 may have a continuous communication link with the server 120, even when the gateway is not transmitting the sensor data to the server. Furthermore, the gateway 115 may either transmit the sensor data substantially immediately to the server 120 as the gateway receives that sensor data from the sensors 110, or in some embodiments, the gateway may aggregate sensor data over a period of time (e.g., by buffering) and then transmit the aggregated sensor data periodically.

Upon successfully transmitting the sensor data to the server 120, the gateway 115 continues to monitor the sensors at operation 1225 for new sensor data. The gateway 115 may, in some embodiments, also clear (e.g., delete) the buffered sensor data once that sensor data has been successfully transmitted to the server 120, as mentioned above. The process 1200 ends at operation 1230.

Figure 13:
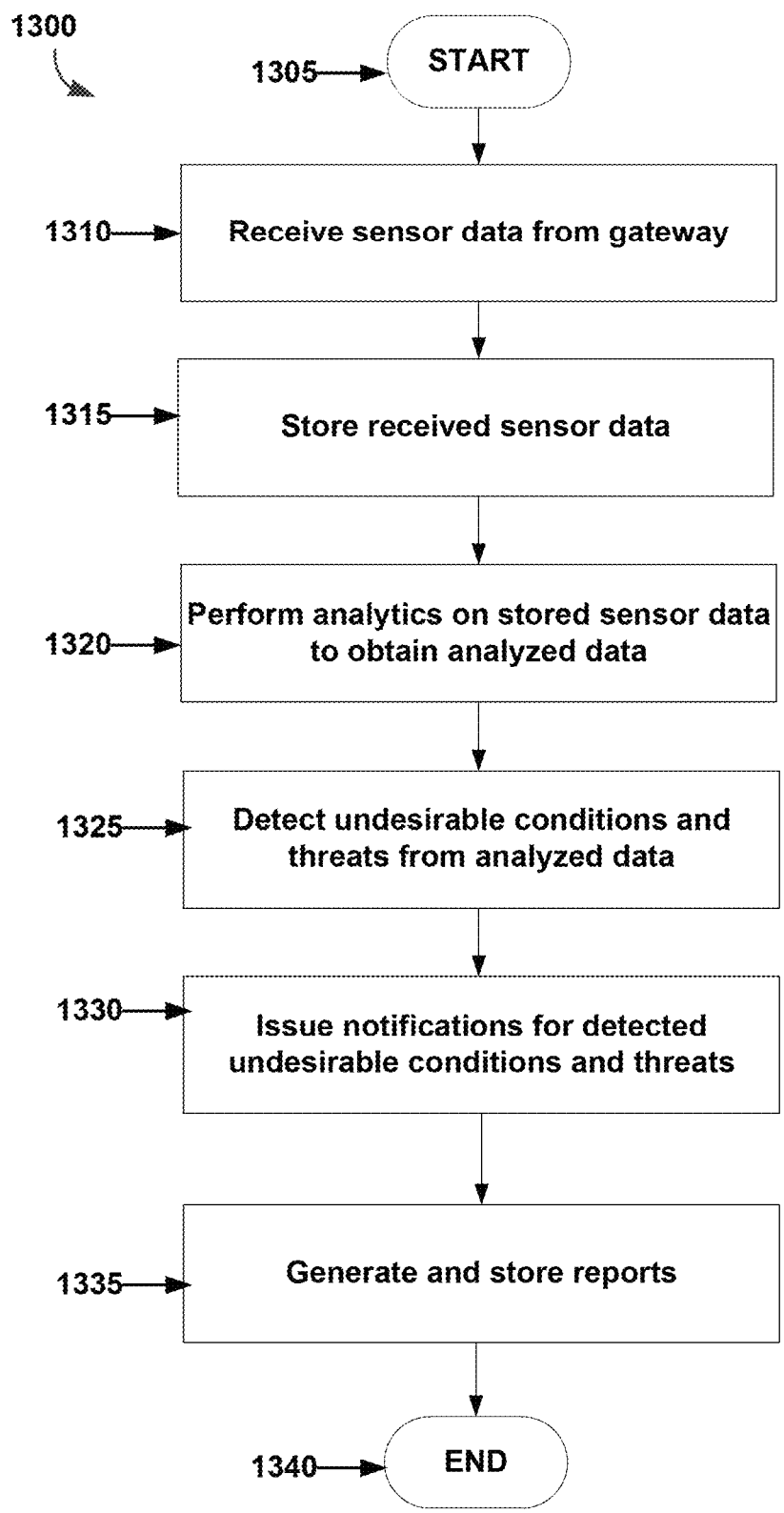
FIG. 13 is an example flowchart outlining operations performed by the server of the building monitoring system of FIG. 1 in monitoring the building, in accordance with some embodiments of the present disclosure.

A process 1300 outlining the operations performed by the server 120 in analyzing the sensor data is shown in FIG. 13, in accordance with some embodiments of the present disclosure. The process 1300 starts at operation 1305. At operation 1310, the server 120 receives the sensor data from the gateway 115, as described above with respect to the operation 1220. Upon receiving the sensor data from the gateway 115, the server 120 stores the sensor data for analysis at operation 1315. In addition to storing the sensor data, the server 120 provides that sensor data to the analytics system 355 for analyzing the sensor data for detecting any undesirable conditions and threats, as well as for creating and updating various reports.

Thus, at operation 1320, the server 120 analyzes the sensor data via the analytics system 355. Again, in some embodiments, the analytics system 355 may be a part of the server 120, while in other embodiments, the analytics system may be a separate component in communication with the server. The analytics system 355 may use a variety of mechanisms to analyze the sensor data. For example, as discussed above in FIGS. 4-5B, the analytics system may use neural or Bayesian networks to analyze the sensor data for detecting threats at operation 1325. Alternatively or additionally, in some embodiments and as discussed in FIGS. 6A-6B, the analytics system 355 may analyze sensor data individually (e.g., by sensors data type), and/or aggregate sensor data to detect undesirable conditions and/or predict a threatening condition at the operation 1325.

In some embodiments, detecting undesirable conditions and threats may include detecting hazardous conditions within the building 105. In other embodiments, detecting undesirable conditions and threats may include detecting malfunctions within the gateway 115 and/or the sensors 110. The malfunctions within the gateway 115 and/or the sensors 110 may be detected by the analytics system (e.g., by virtue of detecting anomalies in the sensor data) and/or by another component of the server (e.g., by virtue of failure to receive sensor data from the sensors 110 via the gateway 115).

If the analytics system 355 detects any undesirable conditions and/or threats at the operation 1325, the analytics system may notify the server 120 of those undesirable conditions and/or threats, and the server may issue appropriate notifications at operation 1330. The notifications that the server 120 issues may be dependent upon the type of undesirable condition and/or threat that is detected. In some embodiments, the notifications may include alerts when undesirable conditions are detected and alarms when threats are detected. Furthermore, in some embodiments, the server 120 may apply an escalation method, such that upon detecting an undesirable condition and/or threat, the server first notifies the customer (or installer, as the case may be). If the server 120 is unable to contact the customer/installer, the server may then contact an emergency response center. Thus, by first notifying the customer/installer, the server 120 avoids false alarms to the emergency response center.

Furthermore, the mode of the notifications may vary from one embodiment to another. In some embodiments, the notifications may be sent via text message, e-mail message, message via social media, multi-media or simple text message, phone call, audible and/or visual alarms, etc. In some embodiments, the server 120 may have the ability to override certain settings at the user interface 125 when issuing notifications. For example, in some embodiments, the server 120 may be configured to un-silence a customer's mobile device (e.g., the second mobile device 190C) when a notification is issued to the customer. Likewise, the server 120 may be able to override "do not disturb" settings, or other settings that may prevent the server 120 from delivering the issued notifications to the customer/installer.

Additionally, the conditions for which the server 120 issues alerts and alarms may be programmed within the server. For example, in some embodiments, the server 120 may be programmed to issue alerts for abnormally low temperatures, freezing temperatures, abnormally high or low humidity, abnormally high or low temperatures, abnormally high smoke levels, abnormally high carbon monoxide levels, doors left open that are normally closed, and doors left closed that are normally open. In other embodiments, other, fewer, or additional conditions may be programmed into the server 120 for issuing alerts.

Likewise, the conditions for which the server 120 issues an alarm may be programmed within the server. For example, in some embodiments, the server 120 may be programmed to issue alarms for when smoke alarms are activated, when a threshold is reached for a smoke heat alarm, when the smoke heat alarm is rising at a specific rate, freezing temperature alarm, and carbon monoxide alarm. Additional, fewer, or different alarms may be programmed within the server 120. Similarly, the server 120 may be programmed to issue maintenance alerts, such as sensor tamper alerts, sensor low battery alerts, sensor offline alerts, smoke alarm communication fault alerts, smoke alarm non-functional sounder alerts, smoke alarm test fault alerts, smoke alarm head fault alerts, smoke alarm end of life alerts, smoke alarm contamination alerts, gateway on battery power alerts, gateway hardware fault alerts, etc.

In addition to issuing notifications of detected undesirable conditions and/or threats at the operation 1330, the server 120 compiles various reports at operation 1335, as discussed above in FIGS. 7A-8E. In some embodiments, the server 120 may compile reports only when undesirable conditions and/or threats are detected. In other embodiments, the server 120 may compile reports every time new sensor data is received, or when the sensor data indicates undesirable conditions and/or threats.

The type and parameters of the reports may also vary from one embodiment to another. Further, in some embodiments, the server 120 may compile different types of reports based upon the reviewer of those reports. For example, the server 120 may compile one or more reports for the installer of the building monitoring system 100 that the installer may use to monitor the health of the building monitoring system. In other embodiments, the server 120 may compile reports for the customer that the customer may use to monitor the status of various conditions (e.g., temperature, humidity, etc.) within the building 105, as well as the status of the sensors 110 and the gateway 115. In yet other embodiments, the server 120 may compile reports that the emergency response crew may use to detect various threat patterns, etc. Furthermore, some of the reports generated by the server 120 may be configured to be shared by multiple types of reviewers, while other reports may be configured to not be shared with certain types of reviewers. For example, in some embodiments, the reports generated for use by the customer and the emergency response crew may be configured such that those reports are inaccessible by the installer. Thus, the reports generated by the server 120 may vary from one embodiment to another.

The process 1300 then ends at operation 1340 with the server 120 continuing to receive sensor data, analyzing the sensor data for threats, issuing appropriate notifications, and compiling various reports.

Figure 14:
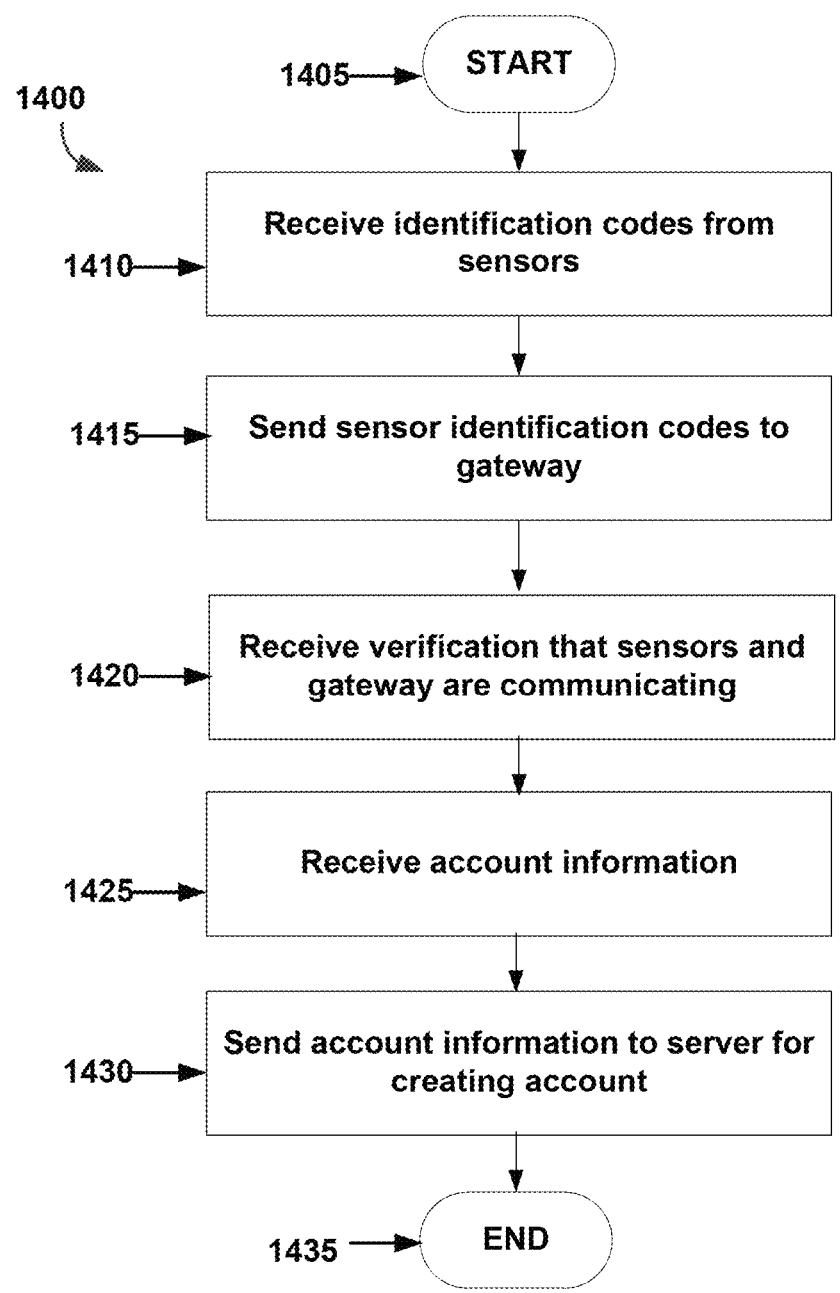
FIG. 14 is an example flowchart outlining operations performed by the installer mobile application in installing the building monitoring system of FIG. 1 within the building, in accordance with some embodiments of the present disclosure.

FIG. 14 is a flowchart outlining a process 1400 for installing the building monitoring system 100 within the building 105 using the installer mobile application is shown, in accordance with some embodiments of the present disclosure. The process 1400 of installing the building monitoring system 100 is facilitated by an installer using the installer mobile application upon starting at operation 1405. For example, to install the building monitoring system 100 within the building 105, the installer scans the identification codes (e.g., quick response code) of each of the sensors 110. In some embodiments, the installer may scan the identification codes using the camera or other feature of the mobile device (e.g., the first mobile device 190B) and/or the installer mobile application. In other embodiments, other methods of scanning the identification codes may be used.

Furthermore, the installer may scan the identification codes of the sensors 110 before or after installing (e.g., mounting) those sensors in various locations of the building 105. The scanned identification codes are received by the installer mobile application at operation 1410. Upon receiving the scanned identification codes of the sensors 110, the installer mobile application programs the gateway 115 with those identification codes at operation 1415. For example, programming the gateway 115 with the identification codes includes sending the scanned identification codes to the database (e.g., the account database 370 of FIG. 3). The server 310 (specifically the second server 330) then copies the database including the identification codes to the gateway 115. In other embodiments, the installer mobile application may be configured to directly save the identification codes within the gateway 115, along with sending those identification codes to the second server 330 for storing within the account database 370.

Additionally, in some embodiments, the installer mobile application may be configured to program the identification code one at a time within the gateway 115 by scanning the identification code, sending the identification code to the second server 330 to store in the account database 370, coping the account database within the gateway, and repeating the process for the next identification code. In other embodiments, the installer mobile application may additionally or instead be configured to scan all of the identification codes, send the identification codes in a single transaction to the account database 370, and copy the account database 370 into the gateway 115 in another single transaction, thereby programming the gateway in a single step. It is to be understood that "copying the account database 370" to the gateway includes copying only those portions of the account database that contain the identification codes. As discussed above, in some embodiments, the account database 370 may also include personal customer information, which need not be copied into the gateway 115.

At operation 1420, the installer mobile application receives verification that the newly installed sensors (e.g., the sensors 110) are communicating and sending sensor data to the gateway 115. In some embodiments, the installer mobile application receives verification in the form of a specific message (sent from either or both of the server 120 and the gateway 115) displayed within an interface of the installer mobile application. In other embodiments, the installer may see sensor data or other sensor information from the newly installed sensor listed within an interface (e.g., the interface 1080) of the installer mobile application.

Thus, by virtue of copying the identification codes of the sensors 110 within the gateway 115, the gateway may be programmed to start receiving sensor data from the sensors 110. Furthermore, in some embodiments, the gateway 115 may be installed (e.g., mounted) before or after programming the gateway with the identification codes of the sensors 110. Additionally, in some embodiments in which the building monitoring system 100 is first being installed, the gateway 115 may need additional programming to associate the gateway with a specific building monitoring system account. In other embodiments, and particularly in those embodiments in which the building monitoring system 100 is already installed and the process 1400 is used to add or replace sensors (e.g., the sensors 110), the gateway 115 may already be programmed with the building monitoring system account information and installed within the building 105. In those cases, merely programming the gateway 115 with the identification codes of the newly installed instances of the sensors 110 may be sufficient to install and link those sensors with the gateway, and with the building monitoring system account.

However, when the building monitoring system 100 is first installed, the installer creates a building monitoring system account for the customer and associates the gateway 115 with that account. The creation of the building monitoring system account and association of the gateway 115 with the building monitoring system account may occur either before or after programming the gateway with the identification codes of the sensors 110. To create the building monitoring system account, the installer mobile application receives account information at operation 1425 using an interface (e.g., the interface 1090) of the installer mobile application. Account information may include name, address, contact information, and any other information of the customer that may be needed or considered useful. At operation 1430, the installer mobile application transmits the account information to the server 310 and, particularly to the second server 330. The second server 330 creates the building monitoring system account for the customer, and stores the building monitoring system account within the account database 370.

Creating the building monitoring system account also includes associating the gateway 115 with the building monitoring system account. In some embodiments, the gateway 115 may be associated with the building monitoring system account by scanning an identification code of the gateway (e.g., using the installer mobile application), and sending that identification code to the second server 330. The second server 330 may then associate the gateway 115 with the building monitoring system account by associating the identification code of the gateway with the building monitoring system account. Again, the building monitoring system account may be created either before or after copying the identification codes of the sensors 110 into the gateway 115. Additionally, associating the gateway 115 with the building monitoring system account may occur either before or after copying the identification codes of the sensors 110 within the gateway.

Furthermore, in some embodiments in which the building monitoring system account already exists and the gateway 115 is already associated with the building monitoring system account (e.g., when the process 1400 is used to install a new sensor in an existing building monitoring system), the operations 1425 and 1430 may be skipped. Thus, the process 1400 may be used to install a new instance of the building monitoring system 100 within the building 105. The process 1400 may also be used to install new sensor(s) (e.g., the sensors 110) and new gateway(s) (e.g., the gateway 115) within an existing building monitoring system. New sensors may be installed by scanning the identification codes of the new sensors and programming the identification codes within the gateway 115. New gateways may be installed by associating the gateway with the existing building monitoring system account and programming the gateway with the identification codes of the sensors with which the gateway is to communicate and collect sensor data from.

Thus, by using the installer mobile application, an installer may easily and conveniently install new building monitoring systems, and/or upgrade existing building monitoring systems. The process 1400 ends at operation 1435.

Figure 15:
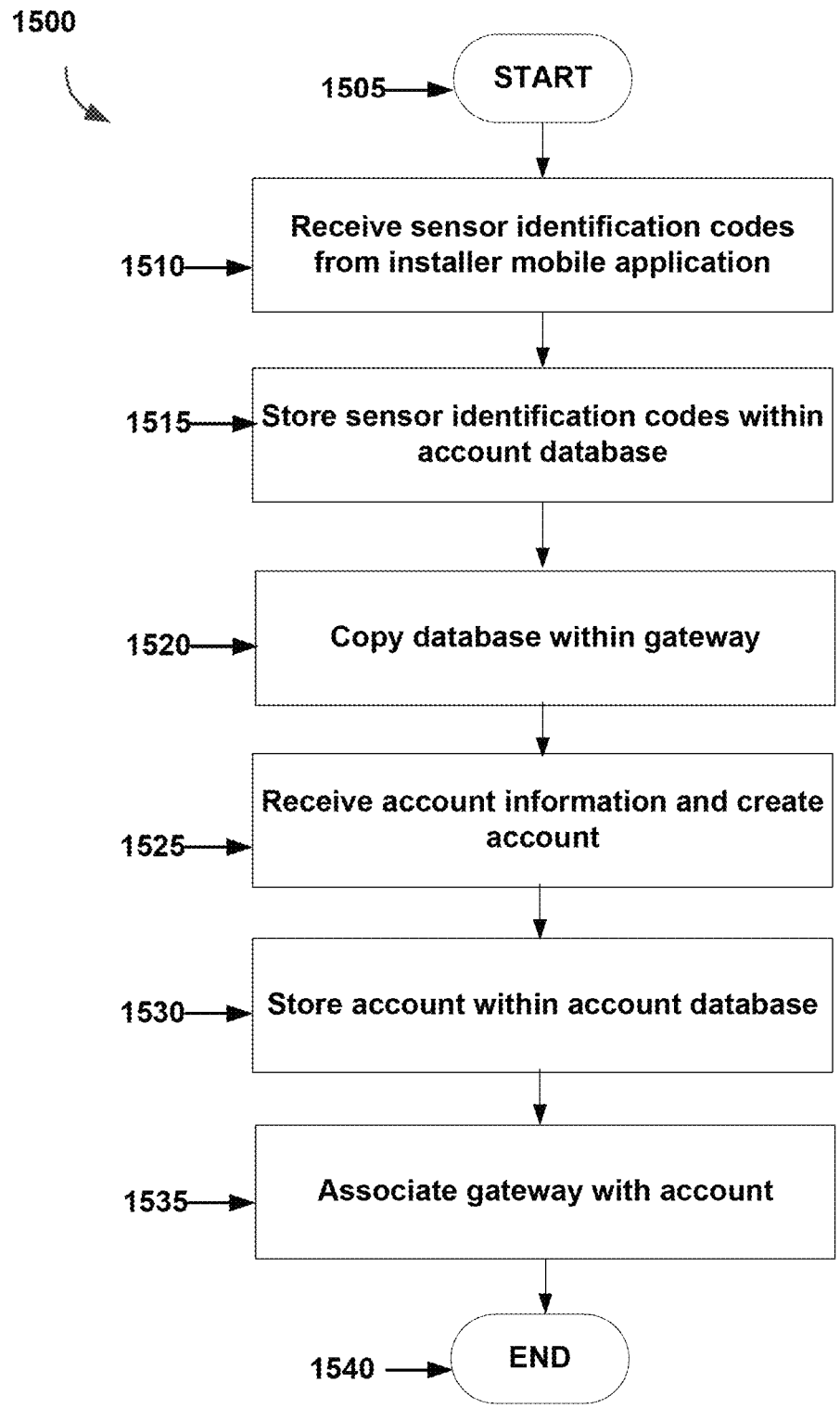
FIG. 15 is an example flowchart outlining operations performed by the server in installing the building monitoring system of FIG. 1 within the building, in accordance with some embodiments of the present disclosure.

FIG. 15 is a flow chart of a process 1500 for installing an instance of the building monitoring system 100 is outlined, in accordance with some embodiments of the present disclosure. The process 1500 outlines operations that are performed by the server 310, and particularly, the second server 330 in installing the building monitoring system 100. The process 1500 is triggered by the process 1400. The process 1500 starts at operation 1505. At operation 1510, the second server 330 receives the identification codes of the sensors 110 that are transmitted by the installer mobile application at the operation 1415. The second server 330 stores the identification codes within the account database 370 at operation 1515, and copies the account database (e.g., relevant portions of the account database) within the gateway 115 at operation 1520.

At operation 1525, the second server 330 receives the account information sent by the installer mobile application at the operation 1430 for creating a new building monitoring system account. The second server 330 creates the building monitoring system account and associates the account information with the building monitoring system account. At operation 1530, the second server 330 stores the building monitoring system account within the account database 370, and at operation 1535, the second server associates the gateway 115 with the building monitoring system account. Again, to associate the gateway 115 with the building monitoring system account, the second server receives an identification code of the gateway, and associates that identification code with the building monitoring system account.

It is to be understood that the operations 1525, 1530, and 1535 are performed only when a new building monitoring system account is created. In those cases where only new sensors are installed, a building monitoring system account may already exist and need not be created again. When new gateways are installed, the operations 1525 and 1530 may be skipped. Thus, the process 1400 is used in conjunction with the process 1500 for creating, managing, and updating the building monitoring system 100. In some embodiments, the process 1400 may be performed by the customer instead of the installer.

Thus, the present disclosure provides a building monitoring system (e.g., the building monitoring system 100) that easily and conveniently monitors for a variety of undesirable conditions and threats within a building (e.g., the building 105). The building monitoring system 100 also provides a convenient and effective mechanism to monitor the health and status of various components (e.g., the sensors 110 and the gateway 115) of the building monitoring system automatically and without human intervention.

The analytics system 355 of the building monitoring system 100 is configured for early detection of several kinds of threats. Thus, the building monitoring system 100 provides constant (twenty four hours a day, seven days a week) monitoring of a building (e.g., the building 105) at a fraction of cost, while reducing false alarms. Also, by detecting the threats early, the building monitoring system 100 may facilitate contact with the customers, installers, and/or emergency response centers early, thereby preventing or at least mitigating damage from those threats.

Additionally, in some embodiments, by issuing notifications of alerts and alarms to customers, the building monitoring system 100 may encourage people to understand and change their behaviors (e.g., not leaving kitchen unattended when cooking), thereby avoiding threats (e.g., fires). By reducing damages caused by the various threats, in some embodiments, losses from insured events may be greatly reduced.

Figure 16:
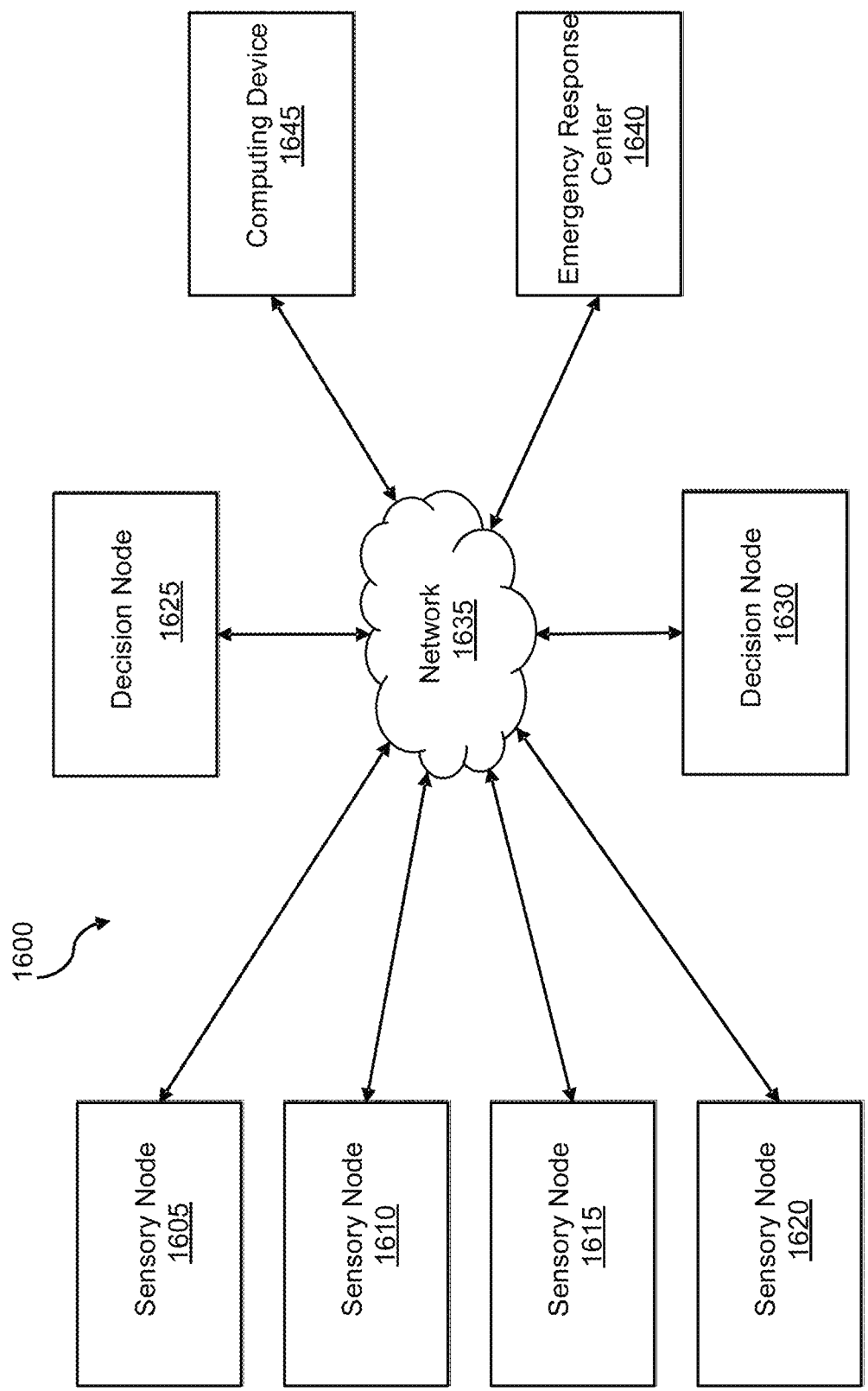
FIG. 16 is a block diagram of a monitoring system, in accordance with some other embodiments of the present disclosure.

Various embodiments described herein can be used to monitor conditions within a building, as discussed above. A building monitoring system similar to the monitoring system discussed above may also include a response system 1600 as shown in FIG. 16. The response system 1600 includes a sensory node 1605, a sensory node 1610, a sensory node 1615, and a sensory node 1620. In alternative embodiments, additional or fewer sensory nodes may be included. The response system 1600 also includes a decision node 1625 and a decision node 1630. Alternatively, additional or fewer decision nodes may be included. In alternative embodiments, the response system 1600 may include additional, fewer, and/or different components.

The sensory nodes 1605-1620 may sense one or more conditions of a building such as temperature, smoke obscuration, occupancy, motion, etc. The sensory nodes 1605-1620 and the decision nodes 16920 and 1625 may communicate with one another, as well as with a computing system 1645 and an emergency response center 1640 via a network 1635. As discussed in related U.S. Pat. No. 9,679,255, filed on Apr. 15, 2016, a combined average of a short-term sensor data, mid-term sensor data, and long-term sensor data can be used to determine a setpoint of the sensor data (e.g., a temperature of a room). Standard deviations from the combined average can be used to determine alarm setpoints that change over time (e.g., as the sensor data is updated).

Figure 17:
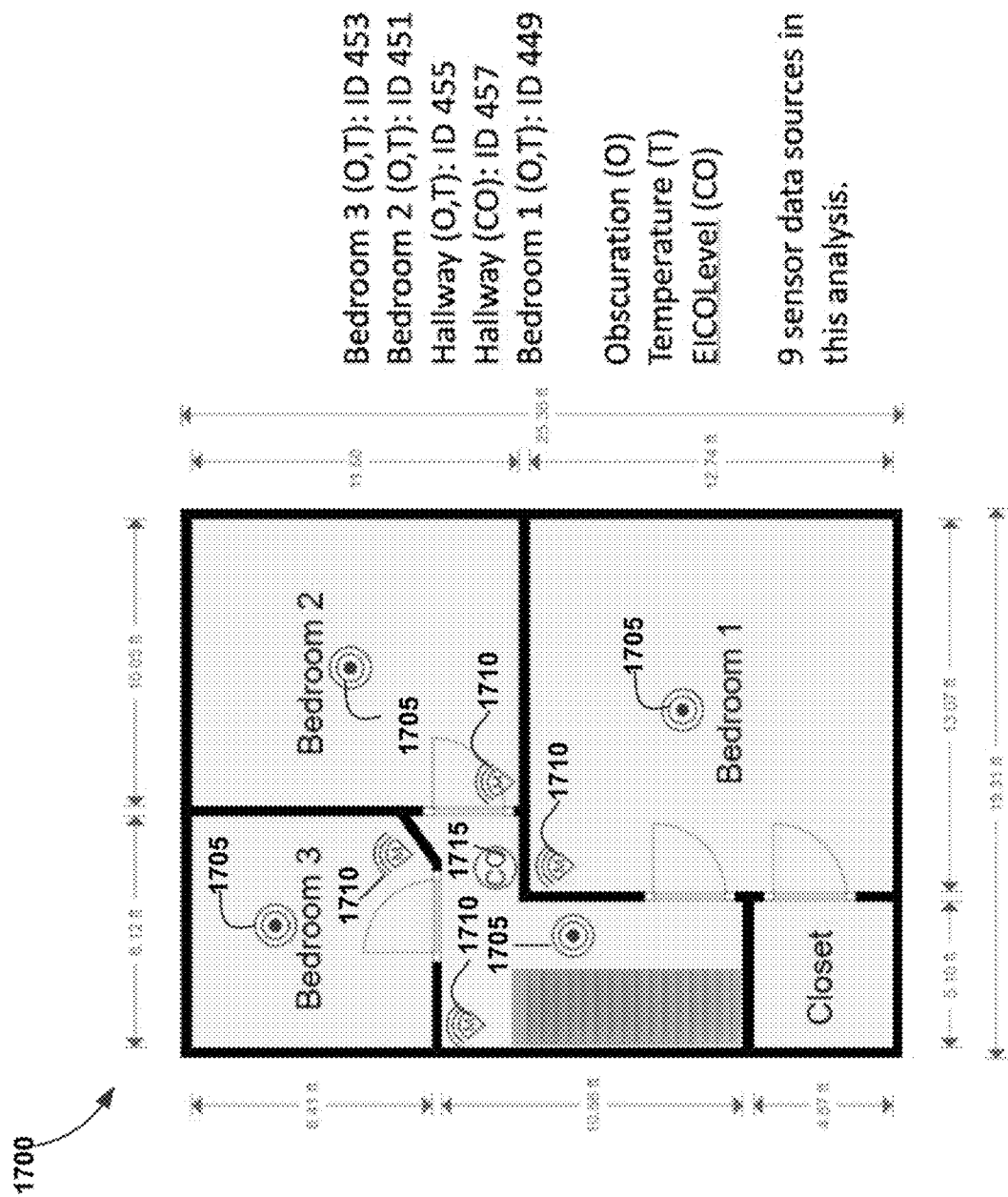
FIG. 17 is a map of a building in accordance with some embodiments of the present disclosure.

Turning now to FIG. 17, a map of a building 1700 is shown, in accordance with some embodiments of the present disclosure. The map shows various rooms of a house within the building 1700. Concentric circles 1705 show the location of smoke sensors, "M" sensors 1710 show the location of motion detectors, and "CO" sensor 1715 show the location of a carbon monoxide sensor. Readings from the various sensors 1705-1715 are transmitted to a central processing server that monitors the conditions of the building 1700 while the building is set on fire (or encounters another hazardous condition). Thus, in the building 1700, nine signals are monitored: four temperature level signals, four smoke obscuration level signals, and one carbon monoxide level signal. In other embodiments, the locations of the sensors 1705-1715 within the building 1700, as well as the number and type of sensors may vary. Similarly, the number of areas (e.g., bedrooms, etc.) that are monitored by the various sensors may vary from one embodiment to another.

Figure 18A:
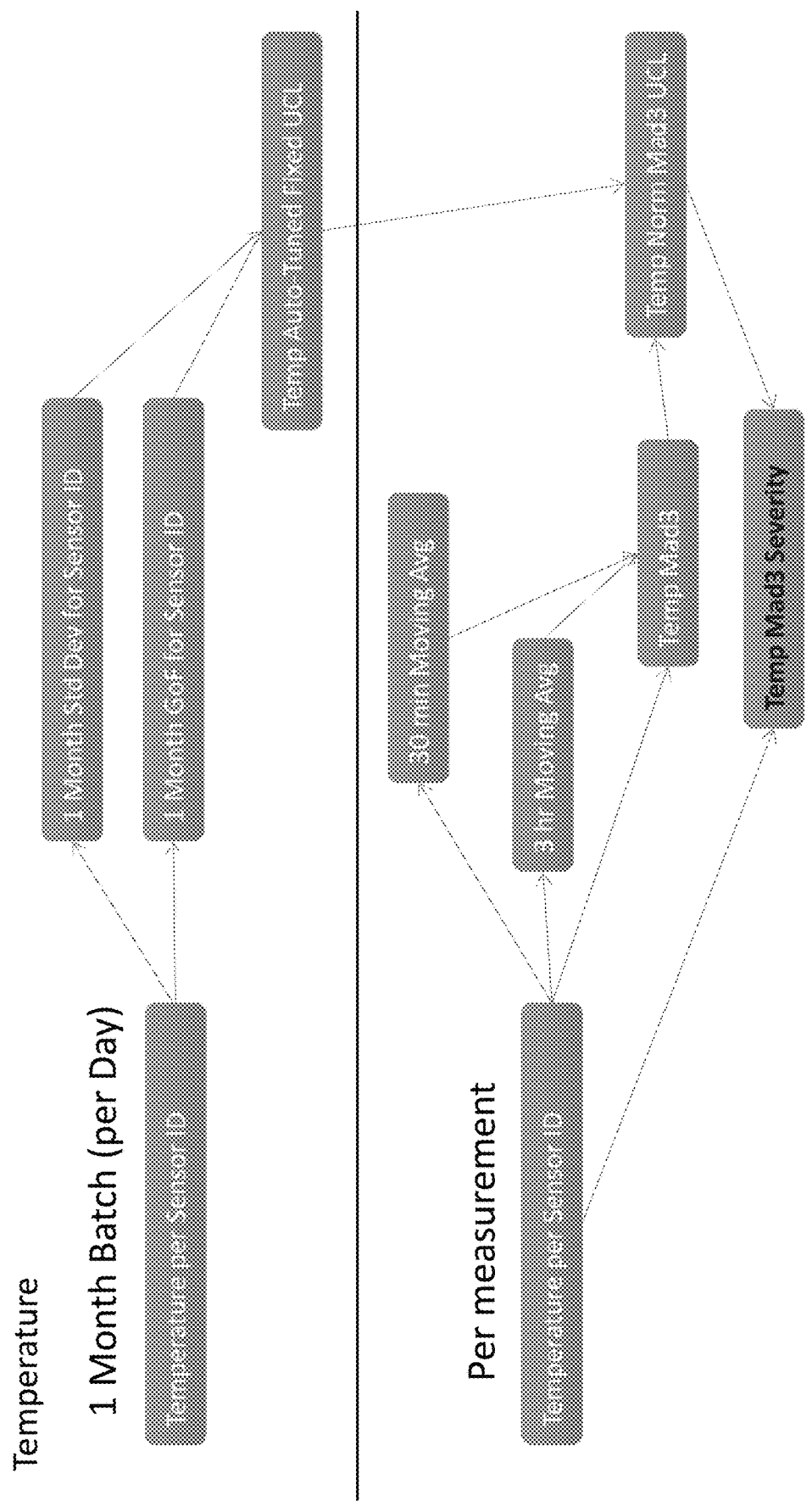
FIGS. 18A-18D are flow charts for a method of monitoring a building in accordance with some embodiments of the present disclosure.

FIGS. 18A-18D are flow charts outlining operations for monitoring a building in accordance with an illustrative embodiment. "Mad3" refers to the combined average of the short-term sensor data, mid-term sensor data, and long-term sensor data (or similar), as described in U.S. application Ser. No. 15/099,786. As in FIG. 18A, one month of temperature data is used to determine a standard deviation and a goodness of fit (GoF). A fixed upper control limit (UCL) can be determined based on the goodness of fit, the standard deviation, the long term average, etc. For each measurement, a 30-minute moving average and a 3-hour moving average are determined, which can be used (e.g., along with the month-long average) to determine the Mad3 number. The Mad3 can be used to determine the upper control limit. If the current measurement is above the upper control limit, the severity of the measurement can be determined to be adverse. FIG. 18A shows use of temperature data, but in alternative embodiments, any suitable type of data can be used (e.g., measurements from other types of sensors). The severity can be determined by dividing the current value by the upper control limit. The severity can be monitored to determine an abnormal condition. For example, although a severity of less than 1 is not above the UCL, as the severity approaches 1, it may indicate that the condition of the building is approaching an abnormal condition.

Figure 18B:
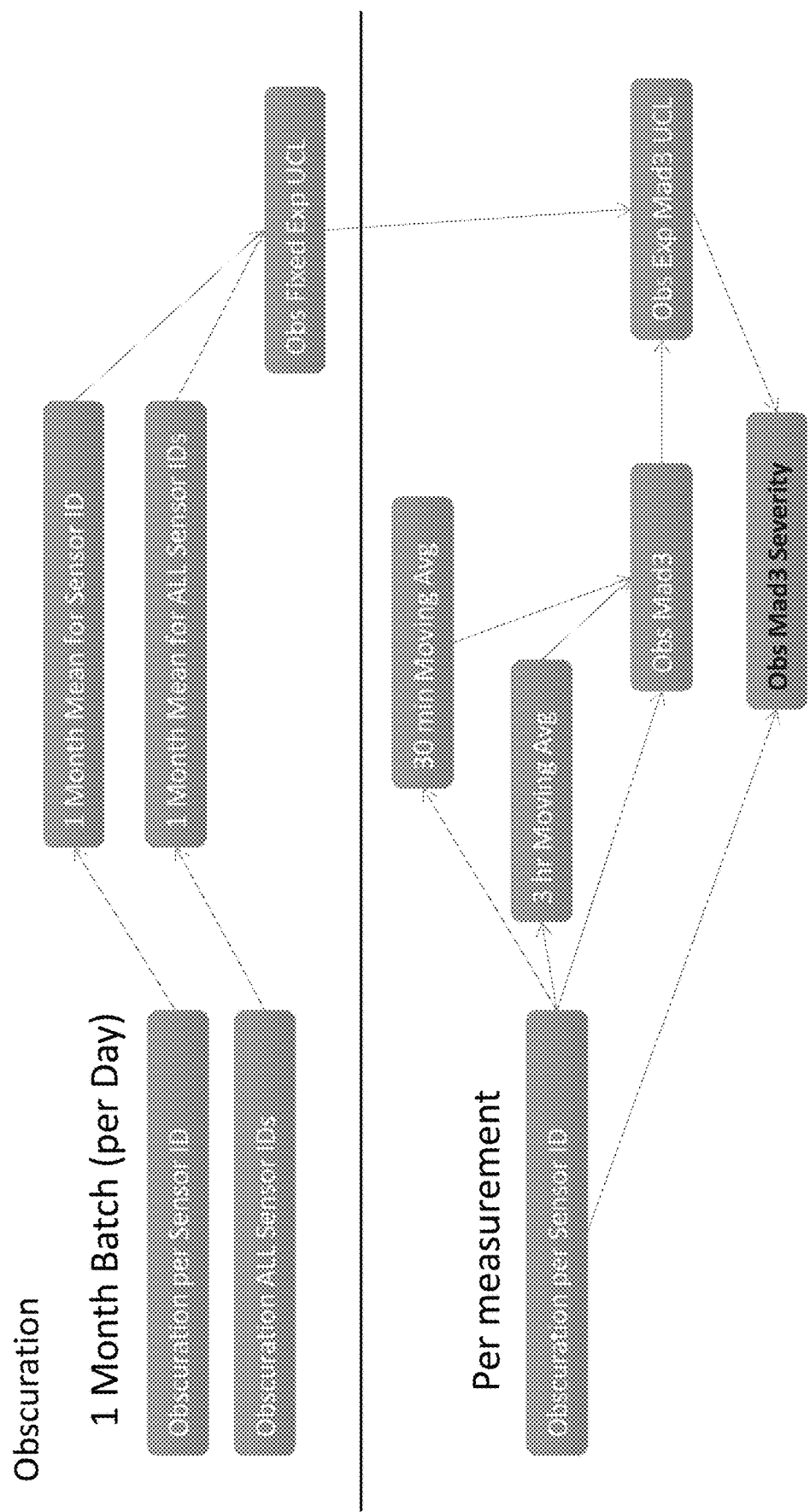
Figure 18C:
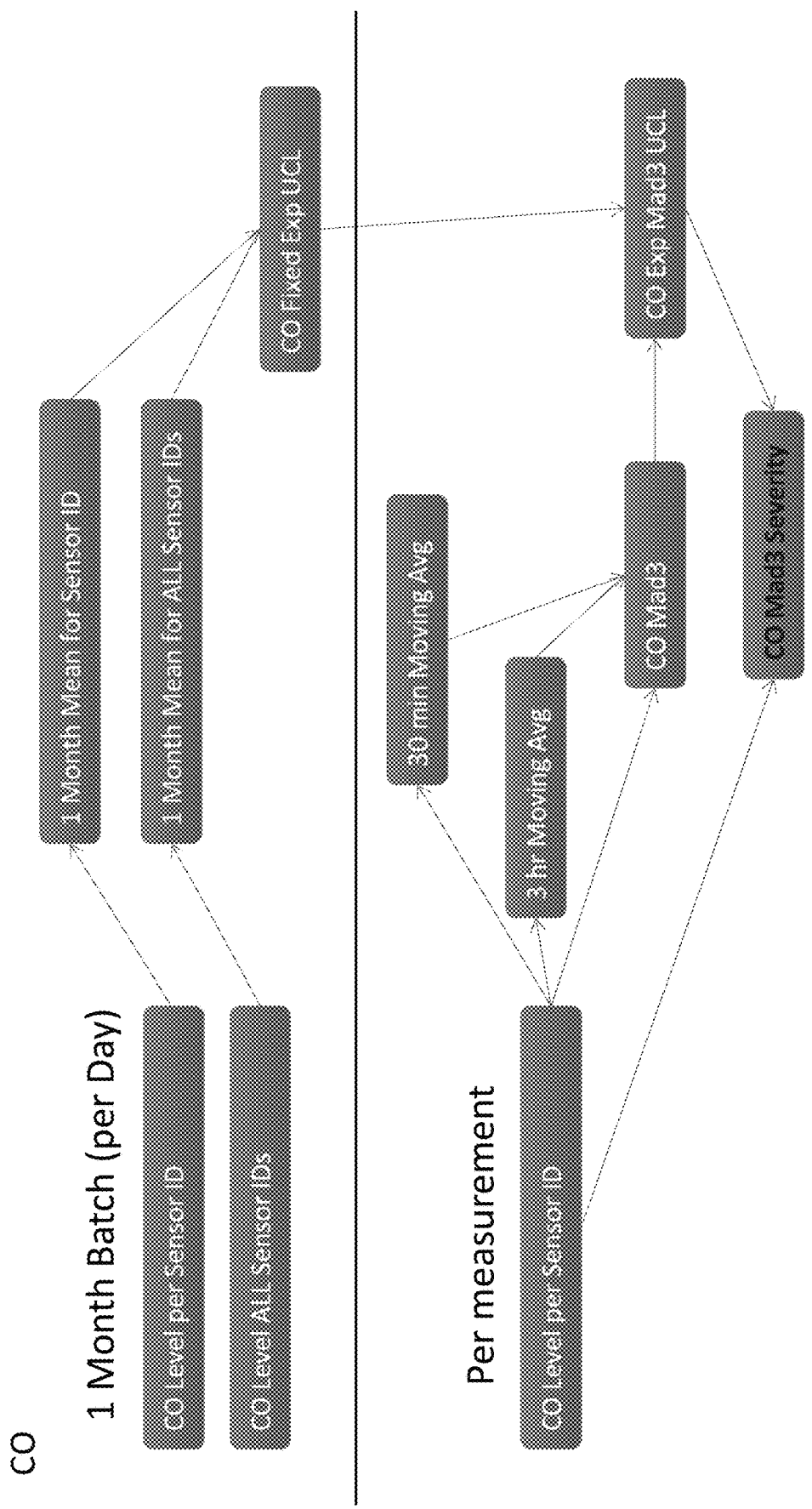

FIG. 18B is a flow chart similar to that of FIG. 18A, but shows a flow chart that can be used with smoke obscuration data. As shown in FIG. 18B, a one-month mean for each sensor and for all of the smoke sensors can be determined, and those means can be used to determine an obscuration fixed upper-control limit (e.g., similar to that of FIG. 18A). Further, for each measurement, the Mad3 can be determined and used to set an upper control limit and determine when the smoke obscuration is at an abnormal level. FIG. 18C is a flow chart similar to that of FIG. 18B, but can be used for carbon monoxide.

Figure 18D:
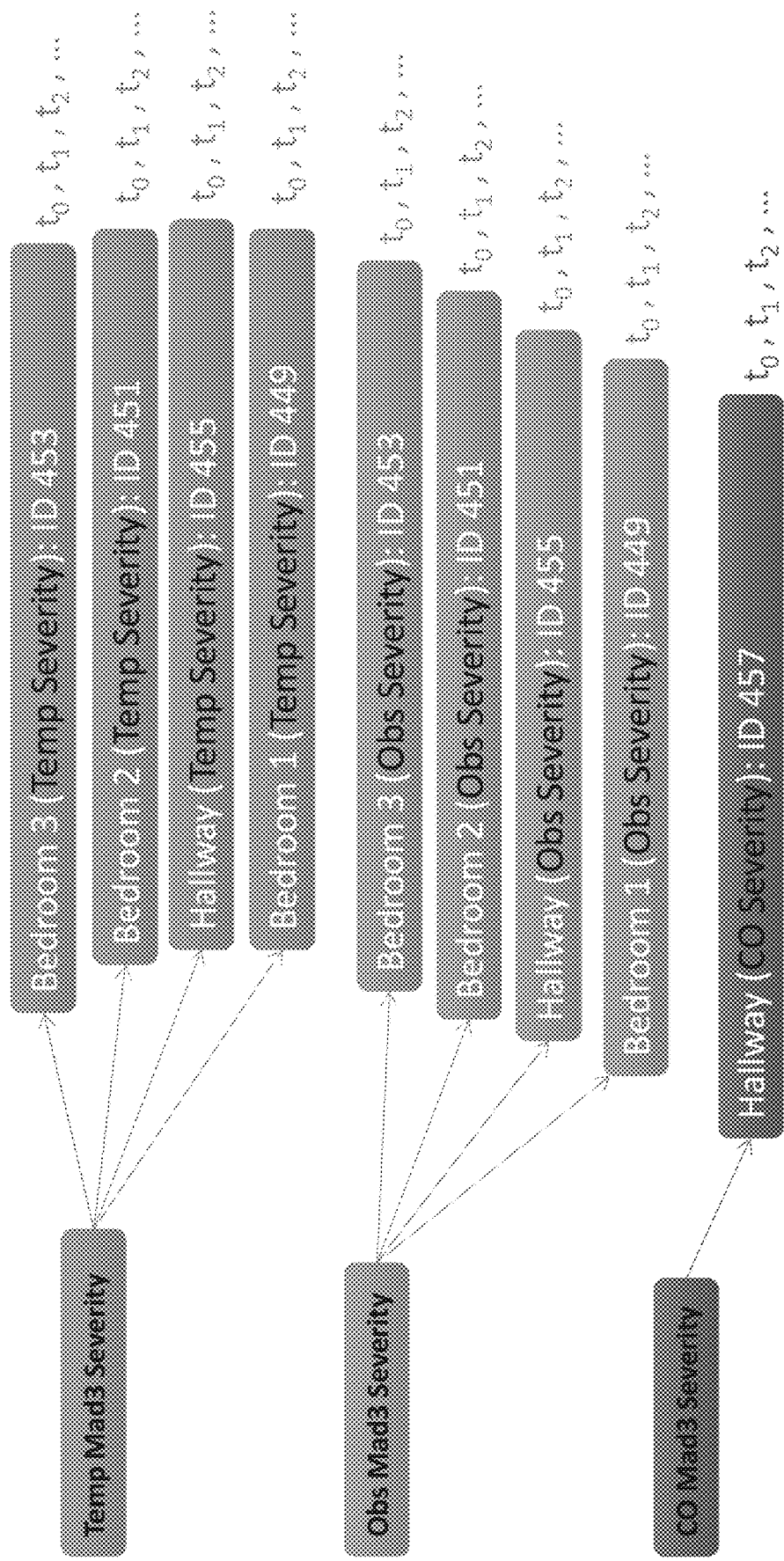

FIG. 18D is a flow chart that shows how the various severity of the various sensors can be used in combination to determine an overall severity (e.g., determine whether an abnormal condition exists in the building). Although FIG. 18D is for the data of the map of FIG. 17, the method can be adapted to more or different sensors. FIG. 18D shows that each severity determination can be used as an input into a "neuron."

Figure 19:
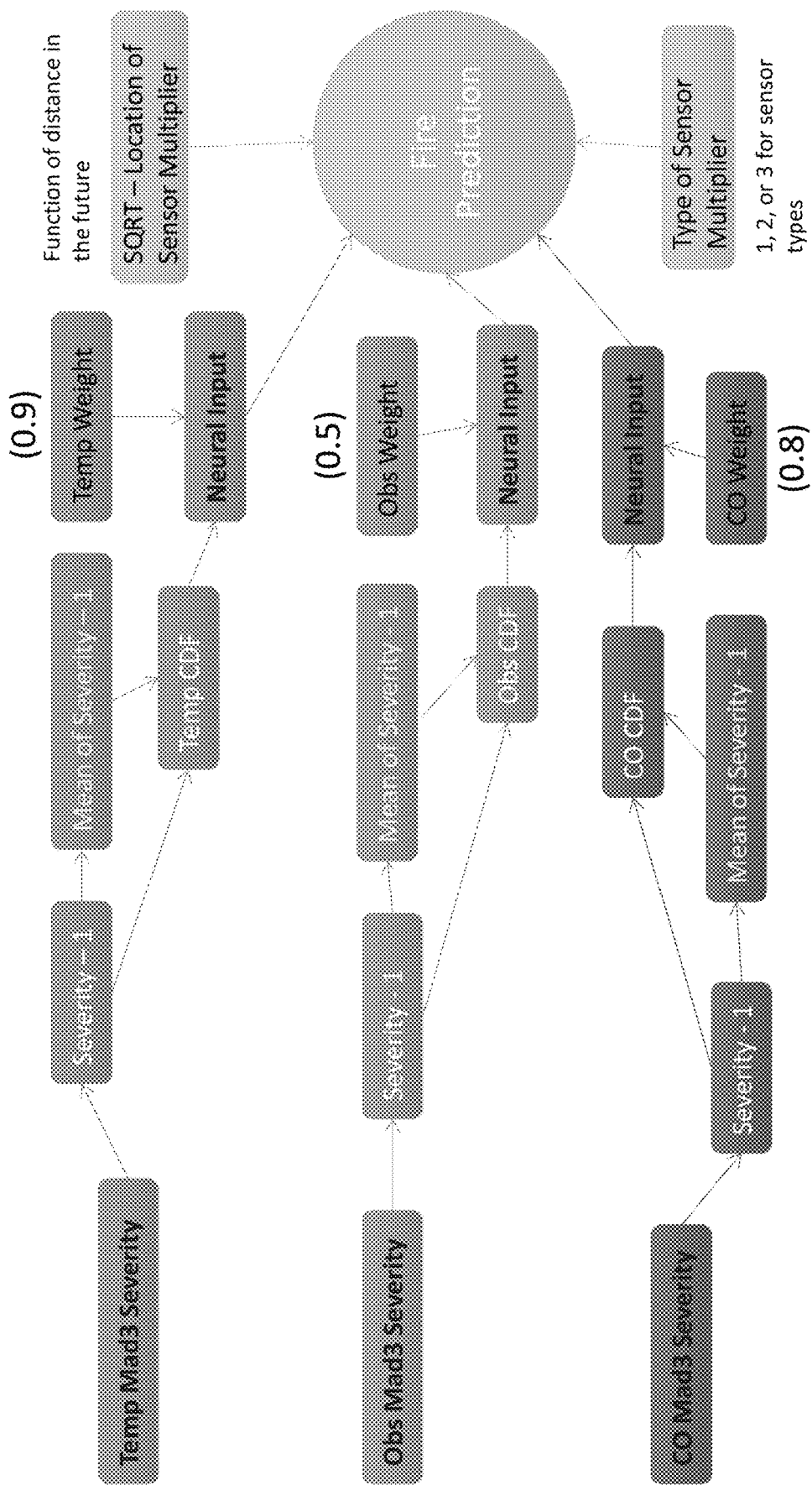
FIG. 19 is a flow chart for a neuron for determining a chance of fire in accordance with some embodiments of the present disclosure.

FIG. 19 is a flow chart for a neuron for determining a chance of fire in accordance with an illustrative embodiment. Although FIG. 19 is a flow chart for the specific building, the method can be adapted for any other building with any suitable number or types of sensors. As shown in FIG. 19, the severity for each sensor type can be combined and subtracted from the mean severity (e.g., the Mad3 for that sensor type) and input into a cumulative distribution function (CDF) to convert the severity to a 0-1 value. The output from the CDF can be multiplied by a corresponding weight to determine a neural input. The weight for the various sensor type can be determined using any suitable method such as by experiment, etc. The neural input from each sensor type (or each sensor) can be input along with a multiplier associated with a location of the sensor and the type of sensors (e.g., "3" if three types of sensors are used) to determine a fire prediction number. For example, the location sensor multiplier can be a weight that adjusts for the location of the sensors. In one example, an indication of smoke in the kitchen is less indicative of an emergency than smoke in a bedroom because the kitchen may receive more false alarms (e.g., due to burned pizza rather than an emergency). In an illustrative embodiment, the location of sensor multiplier can be performed at the sensor or applied to the number received from the sensor and can be based on observations from numerous sensors from other buildings.

The fire prediction node of FIG. 19 can look at any suitable time frame such as 3, 6, 12 minutes, etc. In one embodiment, the time window can be adjusted. For example, the fire prediction node can look at all sensor data received since one of the sensor seventies became greater than 1. In an illustrative embodiment, the sensitivity of the sensors can be adjusted (e.g., increased) once the severity of another sensor became greater than 1. In an illustrative embodiment, the sensitivity of the sensors can be reduced once per 3 minutes (e.g., eventually back to a "normal" state) or increased once per 4 seconds (e.g., while a severity is greater than 1).

A summary of one embodiment of FIG. 19 is provided below: The method "wakes up" when any sensor in the building measures a Mad3 severity greater than 1. As sensors detect more seventies greater than 1 (e.g., as the fire or other emergency spreads), the probability that there is an emergency increases. A set of "activation functions" can be used to scale the severities to be from 0 to 1 (e.g., via the CDF) because the severity number can be from 0 to a number higher than 1 that can be used in an exponential probability density function. In FIG. 19, the smoke, carbon monoxide, and the temperature severities can be modeled by an exponential fit, which can, in turn, be used to generate a CDF. In an illustrative embodiment, the CDF for an exponential fit is:

$$1 - e^{\left(-\frac{Severity-1}{Mean\ of\ [Severity-1]}\right)}$$

As mentioned above, the sensitivity (e.g., rate of sensing) can be increased when an abnormal condition exists (e.g., sensitivity>1). For example, the normal measurement rate can be one to three measurements per minute that is sent for processing. In the embodiment of FIG. 17, the normal amount of measurements can be 9-27 inputs per minute. During an alarm condition, each sensor can take a measurement once per four seconds, which increases the number of measurements processed per minute to from 45 and 180 inputs into the neuron of FIG. 19. In the embodiment of FIG. 19, emergency services can be called once the fire prediction number (e.g., the combined weighted number) is greater than 8.

In an illustrative embodiment, a fire probability function can be:

$$FirePrediction = 1 - e^{-(BuildingSeverity)/(FireProbabilityFactor)}$$

where the BuildingSeverity can be the number from the method of FIG. 19, and the FireProbabilityFactor can be a set (or adjustable) number such as "3." In an illustrative embodiment, once the FirePrediction is greater than 0.8 (e.g., 80%), it can be determined that a fire probably exists.

In an illustrative embodiment, the determined severity factors from multiple locations and from multiple incidents may be helpful for analysis by insurance companies to more determine how abnormal conditions arise. Similarly, firefighters may be interested to look at the data to determine how bad/severe a fire in a building is as they fight a building's fire. The severity can be standardized so that, for example, a fire fighter knows that a "1,000 fire" is a very severe fire, but a "10 fire" is relatively minor. The neural network can be used to provide an appraisal of a condition (e.g., a fire), not just the data. That is, the neural network can process all of the sensor data into a number or an indication that is helpful to humans. For example, if given the raw data, a fire fighter may not be able to process all of the data to determine what is happening within a building. But, the described methods can synthesize the data into a useable number that can be quickly understandable by a human.

In other embodiments, the sensory nodes 1605-1620 can be used for any other suitable purposes. For example, the sensors can be used to monitor one or more people within a house to allow someone to "age-in-place." As people get older, they often require assistance. For example, assisted living facilities provide some assistance to elderly people who do not need to be in a nursing home, but do need some monitoring. Some embodiments can monitor people for abnormal conditions, thereby allowing them to live in their homes longer (e.g., without having to move to an assisted living facility). For example, motion sensors can track a person within their house. The system can use a learning algorithm to learn the typical or normal situations. The system can then compare the present conditions to the "normal" conditions to determine that something is not normal. For example, if a person typically showers for ten minutes each morning, and the person has been in the shower for twenty minutes this morning, an alarm can be sent with an indication that the person may be in trouble (e.g., fell in the shower). In another example, if a person typically leaves the house once per week for groceries, and the person hasn't left the house for two weeks, the system can send an alert to have another person check in to see if the person forgot to go to the grocery store (e.g., and does not have food to eat). Motion sensors, infrared sensors, humidity detectors, carbon monoxide detectors, power detectors, etc. can be used to monitor normal conditions in a house over time.

For example, people can be identified based on their movements, infrared signature, etc. using a machine learning algorithm. Further, quality of life measurements can be determined based on the amount/type of movement. For example, if it takes a person 30 minutes to move from a chair to a bathroom, it may be determined that the person should have assistance moving around. In some instances, the people can be tracked using the sensory nodes 1605-1620. For example, people with Alzheimer's can be prone to wandering off while confused. The sensory nodes 1605-1620 can track such people and determine when someone should be called to assist the person (e.g., as they begin to wander off of a premises in the middle of the night). Such systems can be used to produce reports for doctors to determine a course of treatment (or whether patients should be more or less confined, moved to a more or less restrictive environment, etc.). For example, a mobility score can be produced for doctors as an indication of a person's ability to move around the house.

Similarly, in some instances, location of people can be monitored in emergency situations. For example, active shooters can be determined based on the movements of the active shooter (e.g., different than the rest of the crowd that is running away, etc.), sounds (e.g., gunshots), etc. The shooters can be tracked as they move though a building, and their location can be communicated to emergency personnel (e.g., police). Further, the location of other individuals (e.g., victims, people running or hiding, etc.) can be determined and communicated to emergency personnel as the situation progresses.

In some embodiments, the response system 1600 can be integrated with other systems. For example, the system can be integrated with an alarm system to automatically arm or disarm the alarm system. For example, mobile devices of household residents can communicate with the system of FIG. 16 and/or the alarm system. Once one person arms the system, the other household members can be notified as such via their respective mobile devices. Similarly, once an alarm condition exists, and one member acknowledges the alarm, the other members can be notified that the one member acknowledged the alarm. In some embodiments, the various commands can be verbal. For example, microphones in smoke detectors (or other sensors) can be used to monitor for commands. In one instance, a household member can open a door, thereby setting off a security alarm, and the household member can audibly say, for example, "Oh, sorry, it's just me again." Various microphones can record the household member, compare the voice/words to a database and determine that the alarm should be disabled (e.g., via voice recognition or matching the words to a stored passcode).

In one embodiment, one or more of the sensors 1605-1620 can be used to monitor water usage of a building. The response system 1600 can include one or more water valves (e.g., a main water shutoff, valves in water pipes of a house, etc.). The system can use motion detectors to determine that nobody is home (or active), that a water sensor determines an abnormal condition (e.g., a sump pump turns on, a water level is too high, a water flow in a pipe is too high, etc.), and the response system 1600 can automatically turn off the water supply (e.g., via the water valves)

In some embodiments, the response system 1600 can alert users via unique sounds. For example, many people have become desensitized to alarms from their mobile phones. Thus, unique sounds can be used to alert a user that the mobile phone is trying to notify the user of a serious event. For example, a text message can be sent to users of a house once an abnormal condition arises. But, a normal text message alert may be ignored. Thus, when the mobile phone receives a text message from the response system 1600 (e.g., based on number that sent the message), the mobile phone can use a unique sound to alert the user that the text message is of greater importance than a typical text message. In some embodiments, the sounds can escalate with the severity of the condition. For example, if the first text message is ignored, a more urgent sound or notification can be sent. If the second message is also ignored, an even more urgent sound can be used (e.g., increase volume, type of sound, sharpness of the sound, uniqueness of the sound, etc.)

In some embodiments, the response system 1600 includes the sensory nodes 1605-1620 that monitor a cooling system such as a refrigerator or a freezer. Some cooling systems are used to maintain safe conditions (e.g., for food, for biological samples, antibiotics, etc.). The sensory nodes 1605-1620 can monitor conditions such as the temperature inside the cooled environment, whether a door is opened or closed, a motion sensor around the cooler (e.g., to determine whether someone is still around the cooler), a power sensor (e.g., to monitor the duty cycle of a motor of the cooler), etc. For example, the duty cycle of the motor of a cooler can be monitored to determine the efficiency of the cooler and determine whether maintenance (e.g., preventative maintenance) may be needed. For example, if the cooler motor is running more often or longer with no change in setpoint temperature, it may be determined by the system 100 that the cooler may need to be checked, the motor replaced, etc. Similarly, if a door is left open for a predetermined period and no motion is detected in the area (e.g., no active loading/unloading), it can be determined that the door of the cooler was accidentally left open and an appropriate notification can be sent out. In some embodiments, humidity sensors within the cooler can be used to monitor conditions. Humidity can be monitored to determine that a door has been left open, a seal is not functioning correctly, etc. Similarly, constant or periodic monitoring of the temperature (or other aspects) can be recorded. The recordings can be used to assist in audits or inspections (e.g., to comply with regulations, laws, procedures, etc.).

Such a system can also be used for security purposes. For example, learning algorithms can be used to learn "normal" conditions over time. Sensed conditions that are outside of the "normal" range can be used to alert users to such conditions. For example, if a door is normally only opened during normal business hours, and a door is opened at 3:00 am, such a condition can be included in a notification to a user (e.g., as an indication that someone has broken in).

Related U.S. application Ser. No. 15/728,629, filed on Oct. 10, 2017, which is incorporated herein by reference in its entirety, includes a description of some embodiments that monitor an uninterrupted power supply (UPS). A UPS system may require to be available 100% of the time with no downtime. Thus, such systems may require better monitoring than is currently available. For example, monitoring of outgassing of batteries can be helpful to determine when to replace batteries. However, most such sensors are expensive. In an illustrative embodiment, a typical carbon monoxide detector may be used to monitor Hz. That is, the sensing component of a typical carbon monoxide (CO) detector can react similar to concentrations of hydrogen (Hz) as it does for CO. Such carbon monoxide detectors can be more accurate than industrial Hz sensors (which are also much more expensive than typical carbon monoxide sensors). Thus, by using a cheaper, more effective sensor for monitoring Hz, more sensors can be used for the same (or lower cost) thereby increasing the effectiveness and reliability of the system In some embodiments, the response system 1600 can be used to monitor buried systems. For example, at road intersections, many crosswalks have treads that are used by the visually disabled to indicate the location/direction/conditions of the crosswalk. Underneath the treads or plates can be stored equipment for monitoring or managing the crosswalk. For example, electronics can be stored under the treads or plates that manages lights, crosswalk indicators, cameras, speeding indicators, etc. IN some instances, the electronics can provide a wireless (e.g., WiFi) communication network to users above (e.g., on the surface, walking by, etc.). The system 100 can be used to monitor the housing that encases the electronics. For example, the system 100 can include water sensors, water level indicators, humidity sensors, temperature sensors, tampering sensors, power consumption, battery (UPS) quality, etc. The response system 1600 can be used to ensure that the equipment is in a suitable environment. If the response system 1600 detects abnormal conditions, the response system can notify users using any suitable means. For example, the system 100 and/or the electronics being monitored can communicate via WiFi, wireless cellular network, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising the steps of:
    receiving first data representing conditions at each of the plurality of sensors, the plurality of sensors comprising at least a first sensor and a second sensor;
    determining a plurality of averages using data from each sensor, each of the plurality of averages determined using data received over an interval of time;
        repeatedly combining the plurality of averages to obtain a plurality of combined averages for each sensor;
        determining a distribution of the plurality of combined averages for each sensor;
        using the distribution, determine an upper control limit and a lower control limit for each sensor;
        receiving second data from the plurality of sensors representing conditions at each of the plurality of sensors;
        comparing the received second data from a first sensor with the upper control limit and lower control limit for the first sensor and identify an undesirable condition if the second data falls outside of a range defined between the upper control limit for the first sensor and the lower control limit for the first sensor;
        determining a severity value of an undesirable condition at the first sensor by dividing the received second data from the first sensor representing the undesirable condition by the upper control limit for the first sensor;
        determining the cumulative severity of detected undesirable conditions by performing the steps of:
            combining the severity value of the undesirable condition at the first sensor with a severity value of an undesirable condition from at least one additional sensor into a mean severity value;
            applying a cumulative distribution function to the resulting mean severity values determined over a period of time; and
            applying a sensor location multiplier to a result of the cumulative distribution function; and
        triggering an alert as the result of the identified undesirable condition.

2. The method of claim 1, wherein the distribution of the plurality of combined averages is determined from a standard deviation and the upper control limit is determined using a goodness of fit technique.

3. The method of claim 1, wherein the step of determining the plurality of averages for each sensor is performed using a moving average calculation method.

4. The method of claim 1, wherein the step of determining the plurality of averages for each sensor is performed using a weighted average calculation method.

5. The method of claim 1, further comprising:
determining a probability of a damaging condition by determining the result of $$1 - e^{\left(-\frac{Severity-1}{Mean\ of\ [Severity-1]}\right)}.$$

6. A system comprising:
a plurality of sensors configured to monitor one or more ambient conditions; and
a processing system coupled to the plurality of sensors, wherein the processing system comprises instructions which when executed by the processing system causes the processing system to:
receive first data representing conditions at each of the plurality of sensors, the plurality of sensors comprising at least a first sensor and a second sensor;
determine a plurality of averages using data from each sensor, each of the plurality of averages determined using data received over an interval of time;
repeatedly combine the plurality of averages to obtain a plurality of combined averages for each sensor;
determine a distribution of the plurality of combined averages for each sensor;
using the distribution, determine an upper control limit and a lower control limit for each sensor;
receive a second data from the plurality of sensors representing conditions at each of the plurality of sensors;
compare the received second data from a first sensor with the upper control limit and lower control limit for the first sensor and identify an undesirable condition if the second data falls outside of a range defined between the upper control limit for the first sensor and the lower control limit for the first sensor;
determine a severity value of an undesirable condition at the first sensor by dividing the received second data from the first sensor representing the undesirable condition by the upper control limit for the first sensor; and
trigger an alert as the result of the undesirable condition.

7. The system of claim 6, wherein the processing system determines the distribution of the plurality of combined averages from a standard deviation and the upper control limit is determined using a goodness of fit technique.

8. The system of claim 6, wherein the step of determining the plurality of averages for each sensor is performed using a moving average calculation method.

9. The system of claim 6, wherein the step of determining the plurality of averages for each sensor is performed using a weighted average calculation method.

10. The system of claim 6, wherein the processing system further comprises instructions which when executed by the processing system causes the processing system to:
determine the cumulative severity of detected undesirable conditions by performing the steps of:
combine the severity value of the undesirable condition at the first sensor with a severity value of an undesirable condition from at least one additional sensor into a mean severity value;
applying a cumulative distribution function to the mean severity values determined over a period of time; and
applying a sensor location multiplier to a result of the cumulative distribution function.

11. The system of claim 6, wherein the processing system comprises:
a communication gateway in electronic communication with a least a portion of the plurality of sensors; and
a server in communication with the communications gateway.

12. A real time severity notification system comprising:
a plurality of sensors configured to monitor one or more ambient conditions; and
a processing system coupled to the plurality of sensors, wherein the processing system comprises instructions which when executed by the processing system causes the processing system to:
receive first data representing conditions at each of the plurality of sensors, the plurality of sensors comprising at least a first sensor and a second sensor;
determine a plurality of averages using data from each sensor, each of the plurality of averages determined using data received over an interval of time;
repeatedly combine the plurality of averages to obtain a plurality of combined averages for each sensor;
determine a distribution of the plurality of combined averages for each sensor;
determine an upper control limit and a lower control limit for each sensor from the distribution;
receive second data from the plurality of sensors representing conditions at each of the plurality of sensors;
compare the received second data from a first sensor with the upper control limit and lower control limit for the first sensor and identify an undesirable condition if the second data falls outside of a range defined between the upper control limit for the first sensor and the lower control limit for the first sensor;
determine a severity value of an undesirable condition at the first sensor by dividing the received second data from the first sensor representing the undesirable condition by the upper control limit for the first sensor;
determine the cumulative severity of detected undesirable conditions by performing the steps of:
combine the severity value of the undesirable condition at the first sensor with a severity value of an undesirable condition from at least one additional sensor into a mean severity value;
applying a cumulative distribution function to the resulting mean severity values determined over a period of time;
applying a sensor location multiplier to result of the cumulative distribution function;
determine a probability of a damaging condition by determining the result of:

$$1 - e^{\left(-\frac{Severity-1}{Mean\ of\ [Severity-1]}\right)};$$

a portable electronic device comprising:
a receiver configured to receive the transmitted probability of a damaging condition;
a user interface; and a processor that comprises instructions which when executed, cause the processor to:
receive the transmitted probability of a damaging condition from the receiver; and
using the user interface, communicate the probability of a damaging condition to a user.

13. The system of claim 12, wherein the processing system comprises:
a communication gateway in electronic communication with a least a portion of the plurality of sensors; and
a server in communication with the communications gateway.

14. The system of claim 6, wherein the processing system further comprises instructions which when executed by the processing system causes the processing system to:
determine a probability of a damaging condition by determining a result of:

$$1 - e^{\left(-\frac{Severity-1}{Mean\ of\ [Severity-1]}\right)}.$$

* * * * *